(12) United States Patent
Petito et al.

(10) Patent No.: US 7,707,153 B1
(45) Date of Patent: Apr. 27, 2010

(54) AUTOMATED WORK-FLOW MANAGEMENT AND DOCUMENT GENERATION SYSTEM AND METHOD

(75) Inventors: Karen M. Petito, Victor, NY (US); Carl P. Petito, Victor, NY (US)

(73) Assignee: eSys Technologies, LLC, Rochester, NY (US)

( * ) Notice: Subject to any disclaimer, the term of this patent is extended or adjusted under 35 U.S.C. 154(b) by 1766 days.

(21) Appl. No.: 09/971,516

(22) Filed: Oct. 5, 2001

Related U.S. Application Data

(60) Provisional application No. 60/238,827, filed on Oct. 6, 2000.

(51) Int. Cl.
*G06F 17/00* (2006.01)
(52) U.S. Cl. .................. 707/101; 707/102; 707/104.1
(58) Field of Classification Search .................. 705/1, 705/38; 707/100–102, 104.1, 1, 8–10; 706/50; 709/202–203
See application file for complete search history.

(56) References Cited

U.S. PATENT DOCUMENTS

| | | | |
|---|---|---|---|
| 5,615,268 A | 3/1997 | Bisbee et al. | |
| 5,631,828 A * | 5/1997 | Hagan | 705/4 |
| 5,664,115 A | 9/1997 | Fraser | |
| 5,748,738 A | 5/1998 | Bisbee et al. | |
| 5,826,250 A * | 10/1998 | Trefler | 706/50 |
| 5,852,811 A * | 12/1998 | Atkins | 705/36 |
| 5,953,012 A | 9/1999 | Veghte | |
| 5,978,804 A * | 11/1999 | Dietzman | 707/10 |
| 6,185,576 B1 * | 2/2001 | McIntosh | 707/200 |
| 6,321,202 B1 * | 11/2001 | Raveis, Jr. | 705/1 |
| 6,654,788 B1 * | 11/2003 | Chance et al. | 709/206 |
| 6,684,196 B1 * | 1/2004 | Mini et al. | 705/26 |
| 6,694,315 B1 * | 2/2004 | Grow | 707/10 |
| 6,711,554 B1 | 3/2004 | Salzmann et al. | |
| 6,823,319 B1 * | 11/2004 | Lynch et al. | 705/38 |
| 7,085,735 B1 * | 8/2006 | Hall et al. | 705/26 |
| 7,162,635 B2 | 1/2007 | Bisbee | |
| 2001/0005829 A1 | 6/2001 | Raveis | |
| 2003/0187756 A1 | 10/2003 | Klivington | |

FOREIGN PATENT DOCUMENTS

WO    WO 9957847    11/1999

OTHER PUBLICATIONS

Unofficial file history for U.S. Appl. No. 10/664,486 between Sep. 18, 2008 and May 18, 2009.

(Continued)

*Primary Examiner*—Sana Al-Hashemi
(74) *Attorney, Agent, or Firm*—Duane C. Basch; Basch & Nickerson LLP

(57) ABSTRACT

The present invention is a method and apparatus for a work-flow management and document generation system and more particularly a system and method, employing a database accessible by networked computers, for automating the operation of transaction processes such as those of a law office or legal services provider, including a real estate closing process. The system and method rely on intelligent agent processing, in accordance with rules that are incorporated within the database, to monitor and control the process, including such features as automatic status notification to the transaction participants.

26 Claims, 71 Drawing Sheets

OTHER PUBLICATIONS

Guardian Mortgage Documents;web.archive.org/web/20011211185234/www.gmd.com/products_services.htm; WayBack: gmd.com.

gmd.com. Guardian Mortgage Documents: web.archive.org/web/20020602033143/gmd.com/products_services.htm web.archive.org/web/20021017224826/gmd.com/training-faq.asp01/17/08.htm.

* cited by examiner

| Closing | Closing2 |
|---|---|
| FileID | FileID |
| InHouseFileNumber | AbstractSearchNumber |
| ProgramID | TitleCompanyNameFull |
| LenderFileNumber | TitleInsuranceNumber |
| InvestorFileNumber | TitleInsuranceCompanyAddrOneLi |
| GovernmentLoanNumber | TitleInsuranceCompanyPhone |
| BorrowerAttorneyID | BorrowerBuyDownDeposit |
| SellerAttorneyID | MonthlyBuydown1To12 |
| ClosingDate | MonthlyBuydown13To24 |
| ClosingOfficerID | BorrowerPortion1To12 |
| ClosingLocation | BorrowerPortion13To24 |
| ClosingCityID | CEMNewMoneyAmount |
| ClosingCountyID | CEMExistingMtg1Date |
| ClosingStateID | CEMExistingMortgagee1 |
| PropertyStreetAddress | CEMExistingMtg1OrigPrincplAmt |
| PropertyTownID | CEMExistingMtg1RecordedDate |
| PropertyVillageID | CEMExistingMtg1Liber |
| PropertyCityVillageID | CEMExistingMtg1Page |
| PropertyCountyID | CEMExistingMtg1CurrPrincplAmt |
| PropertyMailingPOID | CEMExistingMtg1MtgTaxPd |
| PropertyZIPCode | CEMExistingMtg2Date |
| PropertyTypeCode | CEMExistingMortgagee2 |
| DisbursementDate | CEMExistingMtg2OrigPrincplAmt |
| RecissionDate | CEMExistingMtg2RecordedDate |
| DueToInvestor | CEMExistingMtg2Liber |
| LoanTypeID | CEMExistingMtg2Page |
| LoanNumber | CEMExistingMtg2CurrPrincplAmt |
| ARMTypeID | CEMExistingMtg2MtgTaxPd |
| ARMMargin | OilGasLeasee |
| ARMChangeRate | OilGasLeaseDate |
| ARMCeiling | OilGasLeaseRecordingDate |
| ARMFloor | OilGasLeaseRecordingLiber |
| ARM5yearCap | OilGasLeaseRecordingPage |
| ARMFirstChange | CompletionEscrowDepositBorrwr |
| TILAmountFinanced | CompletionEscrowDepositSeller |
| MortgageAmount | CompletionEscrowSameWork |
| MortgageInterestRate | CompletionWorkX |

FROM FIG. 2A

| 202 | 203 |
|---|---|
| PurchasePrice | CompletionEscrowDate |
| MortgagePI | CompletionEscrowAgentTypeB |
| MortgageTermInYears | CompletionEscrowReleaseToB |
| MortgageExpirationDate | CompletionEscrowReleaseAddrL1B |
| MortgageMaturityDate | CompletionEscrowReleaseAddrL2B |
| SchoolDistrictID | CompletionEscrowReleaseCSZB |
| AnnualCountyTax | CompletionEscrowReleaseToPhonB |
| AnnualSchoolTax | CompletionEscrowAgentTypeS |
| ReportNumber | CompletionEscrowReleaseToS |
| LoanPolicyNumberX | CompletionEscrowReleaseAddrL1S |
| StatusState | CompletionEscrowReleaseAddrL2S |
| LoanPolicyCEM | CompletionEscrowReleaseCSZS |
| FeePolicyAmount | CompletionEscrowReleaseToPhonS |
| OwnerPremiumX | CompletionItemsTotal |
| TotalPremium | RecordingInfoReceivedDate |
| TitlePolicyTypeID | RecordingInfoReceivedFrom |
| PolicyDate | RecordedMortgageSentDate |
| CheckNumbers | RecordedMortgageReceiptDate |
| UnderwriterID | RecordedAssignementSentDate |
| ExaminerID | RecordedAssignementReceiptDate |
| TitleExaminerFeeX | FinalTitlePolicySentDate |
| ExaminerFeePaid | FinalTitlePolicyReceiptDate |
| UnderwriterFee | NewConstructEstFullTaxes |
| UnderwriterFeePaid | NewConstructEstFullAssessment |
| TitleAgencyFee | NewConstructFullAssessmentYear |
| TitleAgencyFeePaid | ProceedsToSeller |
| ExamineRequestByID | Other1 |
| ExamineRequestDate | Other2 |
| ExamineReturnDate | AbstractCoName |
| TitleCancelled | AbstractCoAddressL1 |
| TitleCancelledDate | AbstractCoAddressL2 |
| OwnerPolicyOnly | AbstractCoAddressCSZ |
| OpenedBy | Ten99StatusID |
| OpenedByDate | Ten99DeliveryID |
| ClosedBy | Ten99FiledWithIRS |
| ClosedByDate | Ten99CorrectionFiled |

FROM FIG. 2B

| 202 | | 203 |
|---|---|---|
| | MortgagePurpose | AddressForTitleX |
| | ContactProcessorID | EstateOrInterestInsuredX |
| | FHA | InsuredLessee |
| | VA | OwnerPolicyDate |
| | PropertyStateID | OwnerPolicyNumber |
| | RefiContactID | OwnerPremium |
| | Status | LeaseholdReportPolicyAmount |
| | LenderID | LoanPolicyDate |
| | InvestorID | LoanPolicyNumber |
| | WorkupProcessorID | LoanPolicyOnlyAtSimulRate |
| | SchedulerID | LoanPremium |
| | PropertySectionBlockLotNumber | PremiumCheckNumbers |
| | PropertyPUD | ReportDate |
| | PropertyPUDName | TitleExaminerFee |
| | PropertyPUDDescription | TitleExaminerNameID |
| | PropertyDescription | TitleInHouseFileNumber |
| | PropertyCondo | TitleInsuredLender |
| | PropertyCondoName | TitleMortgagorAll |
| | PropertyOwnerOccupied | TitlePolicyTypeCode |
| | PropertyNumberOfDwellings | TitleRequestedByID |
| | PropertyNewConstruction | TitleRequestedDate |
| | CertLocationAddlDescription | TitleSellerNameAllX |
| | OutOfOfficeClosing | PayoffAmount |
| | LenderNotified | ApplyDiscountOnRefi |
| | TitleReady | EndorsementFeesTotal |
| | ContractSalesPrice | TitleCompanyID |
| | AssessedValue | CompletionEscrowFundsDisbursed |
| | AppraisalValue | MINumber |
| | PropExemptVetAmt | CurrentDeedTypeID |
| | PropExemptAgedAmt | CurrentDeedDate |
| | PropExemptSTARAmt | CurrentDeedRecordingDate |
| | EscrowTaxes | CurrentDeedRecordingLiber |
| | CityVillageEscrowedX | CurrentDeedRecordingPage |
| | CityVillageAnnual | FirstMtgInvestorFileNumber |
| | CityVillageMonthDue | FirstMtgAmount |
| | CityVillageLastPaidAmt | OwnerPremium111 |
| | CityVillageLastPaidYear | LoanPremium315 |
| | CityVillageEstAmt | LoanPremium211 |

FROM FIG. 2C

| 202 | 203 |
|---|---|
| CityVillageUnpaidCurYearAmt | ArchivePath |
| CityVillageDelinquentAmt | ExternalTitle |
| CountyAnnual | ClosingDateTentative |
| CountyMonthDue | TO_TitleInsuredLender |
| CountyLastPaidAmt | TO_TitleAssigneeNameFull |
| CountyLastPaidYear | TO_LenderNameFull |
| CountyEstAmt | TO_BankAttorneyNameL1 |
| CountyUnpaidCurYearAmt | TO_BankAttorneyNameL2 |
| CountyDelinquentAmt | TO_BankAttorneyStreetAddress |
| SchoolAnnual | TO_BankAttorneyAddressCSZ |
| SchoolMonthDue | TO_ClosingDate |
| SchoolLastPaidAmt | TO_ReferenceFileNumber |
| SchoolLastPaidYear | e0_UTN |
| SchoolEstAmt | NotaryName |
| SchoolUnpaidCurYearAmt | NotaryState |
| SchoolDelinquentAmt | NotaryCounty |
| SWAnnual | NotaryExpiration |
| SWMonthDue | TransactionDate |
| SWLastPaidAmt | CEMExistingMtg3Date |
| SWLastPaidYear | CEMExistingMortgagee3 |
| SWEstAmt | CEMExistingMtg3OrigPrincplAmt |
| SWUnpaidCurYearAmt | CEMExistingMtg3RecordedDate |
| SWDelinquentAmt | CEMExistingMtg3Liber |
| H1008Desc | CEMExistingMtg3Page |
| H1008Annual | CEMExistingMtg3CurrPrincplAmt |
| H1008MonthDue | CEMExistingMtg3MtgTaxPd |
| H1008LastPaidAmt | CEMExistingMtg1Borrower |
| H1008LastPaidYear | CEMExistingMtg1Assignee |
| H1008EstAmt | CEMExistingMtg1AssignDate |
| H1008UnpaidCurYearAmt | CEMExistingMtg1AssignRecorded |
| H1008DelinquentAmt | CEMExistingMtg1AssignLiber |
| EscrowHazard | CEMExistingMtg1AssignPage |
| HazardInsurancePremium | CEMExistingMtg2Borrower |
| HazardInsuranceMonthDue | CEMExistingMtg2Assignee |
| HazardInsuranceInceptionDate | CEMExistingMtg2AssignDate |
| HazardInsuranceExpirationDate | CEMExistingMtg2AssignRecorded |
| HazardInsurancePaid | CEMExistingMtg2AssignLiber |
| HazardInsuranceCoverage | CEMExistingMtg2AssignPage |

FROM FIG. 2D

| 202 | | | 203 |
|---|---|---|---|
| | HazardInsurancePolicyNumber | CEMExistingMtg3Borrower | |
| | HazardInsuranceCompanyName | CEMExistingMtg3Assignee | |
| | HazardInsuranceAgentName | CEMExistingMtg3AssignDate | |
| | HazardInsuranceAgentAddrL1 | CEMExistingMtg3AssignRecorded | |
| | HazardInsuranceAgentAddrL2 | CEMExistingMtg3AssignLiber | |
| | HazardInsuranceAgentAddrCSZ | CEMExistingMtg3AssignPage | |
| | EscrowFlood | CEMNewMoneyPIAmount | |
| | FloodInsurancePremium | eRecord | |
| | FloodInsuranceMonthDue | PeriodicRateCap | |
| | FloodInsuranceInceptionDate | OrigDisclosureReceiptAckDate | |
| | FloodInsuranceExpirationDate | AbstractRedated | |
| | FloodInsurancePaid | CEMLenderOfficer | |
| | FloodInsuranceCoverage | CEMLenderAckState | |
| | FloodInsurancePolicyNumber | CEMLenderAckCounty | |
| | FloodInsuranceCompanyName | CEMLenderAckNotaryName | |
| | FloodInsuranceAgentName | CEMLenderAckNotaryState | |
| | FloodInsuranceAgentAddrL1 | CEMLenderAckNotaryCounty | |
| | FloodInsuranceAgentAddrL2 | CEMLenderAckNotaryExpiration | |
| | FloodInsuranceAgentAddrCSZ | CEMLenderOfficerTitle | |
| | MortgageInsured | CEMLenderAckDate | |
| | PMIAnnualProgram | OptInDate | |
| | PMIMonthDue | RateLockExpDate | |
| | PMIFirstYearPremium | DocumentExpDate | |
| | PMIMonthlyAmt | PotentialConsolidation | |
| | PMIMonths | POARecordingDate | |
| | PMITo | POARecordingLiber | |
| | MortgageInsured | CEMLenderAckDate | |
| | PMIAnnualProgram | OptInDate | |
| | PMIMonthDue | RateLockExpDate | |
| | PMIFirstYearPremium | DocumentExpDate | |
| | PMIMonthlyAmt | PotentialConsolidation | |
| | PMIMonths | POARecordingDate | |
| | PMITo | POARecordingLiber | |
| | PMICompanyName | POARecordingPage | |
| | MIPMonthlyPayment | ClosingPackageIncomplete | |
| | MIPOneTimePremium | ErrorInClosingDocuments | |
| | MIPFinancedPortion | ClosingAgentNotifiedOfIssues | |
| | MIPCashPortion | ClosingIssuesResolveByDate | |

FROM FIG. 2E

| 202 | 203 |
|---|---|
| MIPTo | ClosingIssuesResolved |
| VAFFeeAmount | TitlePackageIncomplete |
| VAFFinancedPortion | ErrorInTitleDocuments |
| VAFCashPortion | TitleAgentNotifiedOfIssues |
| VAFTo | TitleIssuesResolveByDate |
| MortgageInsurancePremium | TitleIssuesResolved |
| FirstPaymentDate | PCO_CityVillageName |
| EscrowInitialBalance | PCO_TownName |
| PrevMtgAdditionalDeedInfo | PCO_CountyName |
| PrevMtgTypeOfDeedID | PCO_SchoolDistrictName |
| PrevMtgDateOfDeed | CountyEstActualAmt |
| PrevMtgRecordingDateOfDeed | CountyEstDatePaid |
| PrevMtgRecordingLiber OfDeed | CountyEstReceiptRecvd |
| PrevMtgRecordingPageOfDeed | CountyEstRefundAmt |
| RateImprovementRiderFlag | CountyEstRefundDate |
| MortgageRiderOtherFlag | SchoolEstActualAmt |
| DateBorrowerTookTitle | SchoolEstDatePaid |
| SurveyorName | SchoolEstReceiptRecvd |
| SurveyDate | SchoolEstRefundAmt |
| PurchContractDated | SchoolEstRefundDate |
| PurchContractAmendDates | CityVillageEstActualAmt |
| PurchContractClsgDate | CityVillageEstDatePaid |
| OKdToClose | CityVillageEstReceiptRecvd |
| DateOKdToClose | CityVillageEstRefundAmt |
| TitlePapersRecvdComplete | CityVillageEstRefundDate |
| TitlePapersRecvdMissing | SWEstActualAmt |
| HazardInsRecvd | SWEstDatePaid |
| AssignmentSigner | SWEstReceiptRecvd |
| AssignmentSignerTitle | SWEstRefundAmt |
| NoClosingRequired | SWEstRefundDate |
| NoClosingRequiredByDate | OtherEstAmt |
| AdditionalDocuments | OtherEstActualAmt |
| HoldHarmlessWell | OtherEstDatePaid |
| HoldHarmlessSeptic | OtherEstReceiptRecvd |
| HoldHarmlessOther | OtherEstRefundAmt |
| HoldHarmlessConditionCode | OtherEstRefundDate |
| FirstChangeDate | PCO_StateAbrev |
| PercentPntsAddedToIndex | ClosingAgentID |
| MaximumRateOnFirstChangeDate | TitleAgentID |

FROM FIG. 2F

| 202 | 203 |
|---|---|
| MinimumRateOnFirstChangeDate | AllMortgageFundsDisbursed |
| MaximumRate | FileReceivedDate |
| MinimumRate | OtherUnpaidCurYearAmt |
| ConversionFeeDollarAmt | OtherDelinquentAmt |
| MortgageRecordingDate | Ten99DeliveryDate |
| MortgageRecordingLiber | CountyUnpaidCurYearRcptRecvd |
| MortgageRecordingPage | CountyDelinquentRcptRecvd |
| AssignmentRecordingDate | SchoolUnpaidCurYearRcptRecvd |
| AssignmentRecordingLiber | SchoolDelinquentRcptRecvd |
| AssignmentRecordingPage | CityVillageUnpaidCurYrRcptRcvd |
| ConsolidationRecordingDate | CityVillageDelinquentRcptRcvd |
| ConsolidationRecordingLiber | SWUnpaidCurYearRcptRecvd |
| ConsolidationRecordingPage | SWDelinquentRcptRecvd |
| AssignmentRecordingDate | OtherUnpaidCurYearRcptRecvd |
| AssignmentRecordingLiber | OtherDelinquentRcptRecvd |
| AssignmentRecordingPage | SchoolUnpaidCurYearRcptRecvd |
| ConsolidationRecordingDate | SchoolDelinquentRcptRecvd |
| ConsolidationRecordingLiber | CityVillageUnpaidCurYrRcptRcvd |
| ConsolidationRecordingPage | CityVillageDelinquentRcptRcvd |
| SpecialHandling | SWUnpaidCurYearRcptRecvd |
| BankAttorneyFee | SWDelinquentRcptRecvd |
| SpecialHandling | OtherUnpaidCurYearRcptRecvd |
| BankAttorneyFee | OtherDelinquentRcptRecvd |
| FundingFromLender | FinalRecordedDocsSent |
| AdditionalFundingFromLender | Mortgage |
| CompletionWorkB | Assignment |
| CompletionWorkS | CEM |
| AdjustableRateRiderFlag | Subordination |
| BalloonRiderFlag | Deed |
| OneTo4FamilyRiderFlag | POA |
| AddressForTitle | RecordedMortgageReceived |
| EstateOrInterestInsured | RecordedAssignmentReceived |
| TitleMortgagorNameAll | RecordedCEMReceived |
| TitleSellerNameAll | RecordedSubordinationReceived |
| PrevDeedGrantor | RecordedDeedReceived |
| PrevDeedGrantee | RecordedPOAReceived |
| AddlPrevDeedInfo | FloodInsuranceReq |
| SurveyAffidavitException | OtherMonthDue |
| InstructionsToAbstractCo | UpdatedBy |

| 310 | 312 | 314 | 316 |
|---|---|---|---|
| HUD1 | HUD2 | HUD2b | HUDDisb |
| FileID | FileID | FileID | FileID |
| H0102Desc | H0700Amt | H1101Amt | H0703BE |
| H0102Amt | H0700Calc | H1101PFB | H0703SE |
| H0103Amt | H0700Per | H1101PFS | H0703Chk |
| H0104Desc | H0701Amt | H1101POC | H0704BE |
| H0104Amt | H0701To | H1101To | H0704SE |
| H0105Desc | H0702Amt | H1101Calc | H0704Chk |
| H0105Amt | H0702To | H1102Amt | H0801BE |
| H0106From | H0703Amt | H1102PFB | H0801SE |
| H0106To | H0703PFB | H1102PFS | H0801Chk |
| H0106Amt | H0703PFS | H1102POC | H0802BE |
| H0404Desc | H0703To | H1102To | H0802SE |
| H0404Amt | H0704Amt | H1103Amt | H0802Chk |
| H0405Desc | H0704Desc | H1103PFB | H0803BE |
| H0405Amt | H0704PFB | H1103PFS | H0803SE |
| H0106Desc | H0704PFS | H1103POC | H0803Chk |
| H0406Desc | H0704POC | H1103To | H0804BE |
| H0406From | H0704To | H1103Calc | H0804SE |
| H0406To | H0801Amt | H1104Amt | H0804Chk |
| H0406Amt | H0801Calc | H1104PFB | H0805BE |
| H0107Desc | H0801PFB | H1104PFS | H0805SE |
| H0107From | H0801PFS | H1104POC | H0805Chk |
| H0107To | H0801POC | H1104To | H0806BE |
| H0107Amt | H0801Per | H1105Amt | H0806SE |
| H0407Desc | H0801To | H1105PFB | H0806Chk |
| H0407From | H0802Amt | H1105PFS | H0807BE |
| H0407To | H0802Calc | H1105POC | H0807SE |
| H0407Amt | H0802PFB | H1105To | H0807Chk |
| H0108Desc | H0802PFS | H1106Amt | H0808BE |
| H0108From | H0802POC | H1106PFB | H0808SE |
| H0108To | H0802Per | H1106PFS | H0808Chk |
| H0108Amt | H0802To | H1106POC | H0809BE |
| H0408Desc | H0803Amt | H1106To | H0809SE |
| H0408From | H0803PFB | H1107To | H0809Chk |
| H0408To | H0803PFS | H1107Calc | H0810BE |
| H0408Amt | H0803POC | H1107Amt | H0810SE |

| 310 | 312 | 314 | 316 |
|---|---|---|---|
| H0109Desc | H0804Amt | H1107POC | H0810Chk |
| H0109From | H0804PFB | H1107PFB | H0811BE |
| H0109To | H0804PFS | H1107PFS | H0811SE |
| H0109Amt | H0804POC | H1108To | H0811Chk |
| H0409Desc | H0804To | H1108Amt | H0812BE |
| H0409From | H0805Amt | H1108POC | H0812SE |
| H0409To | H0805PFB | H1108PFB | H0812Chk |
| H0409Amt | H0805PFS | H1108PFS | H0901BE |
| H0110Desc | H0805POC | H1109To | H0901SE |
| H0110From | H0805To | H1109Amt | H0901Chk |
| H0110To | H0806Amt | H1109POC | H0902BE |
| H0110Amt | H0806PFB | H1109PFB | H0902SE |
| H0410Desc | H0806PFS | H1109PFS | H0902Chk |
| H0410From | H0806POC | H1110To | H0903BE |
| H0410To | H0806To | H1110Amt | H0903SE |
| H0410Amt | H0807Amt | H1110POC | H0903Chk |
| H0111Desc | H0807Desc | H1110PFB | H0904BE |
| H0111From | H0807PFB | H1110PFS | H0904SE |
| H0111To | H0807PFS | H1111To | H0904Chk |
| H0111Amt | H0807POC | H1111Amt | H0905BE |
| H0411Desc | H0807To | H1111POC | H0905SE |
| H0411From | H0806POC | H1111PFB | H0905Chk |
| H0410To | H0806To | H1110Amt | H0903SE |
| H0410Amt | H0807Amt | H1110POC | H0903Chk |
| H0111Desc | H0807Desc | H1110PFB | H0904BE |
| H0111From | H0807PFB | H1110PFS | H0904SE |
| H0111To | H0807PFS | H1111To | H0904Chk |
| H0111Amt | H0807POC | H1111Amt | H0905BE |
| H0411Desc | H0807To | H1111POC | H0905SE |
| H0411From | H0808Amt | H1111PFB | H0905Chk |
| H0411To | H0808Desc | H1111PFS | H1001BE |
| H0411Amt | H0808PFB | H1112Desc | H1001SE |
| H0112Desc | H0808PFS | H1112To | H1001Chk |
| H0112From | H0808POC | H1112Amt | H1002BE |
| H0112To | H0808To | H1112POC | H1002SE |
| H0112Amt | H0809Amt | H1112PFB | H1002Chk |

FROM FIG. 3A

| 310 | 312 | 314 | 316 |
|---|---|---|---|
| | | | FROM FIG. 3C |
| H0507Desc | H0902Calc | H1207Calc | H1106BE |
| H0507To | H0902CalcMos | H1207Desc | H1106SE |
| H0507Amt | H0902CalcTo | H1207PFB | H1106Chk |
| H0508Desc | H0902Mos | H1207PFS | H1107BE |
| H0508To | H0902PFB | H1207POC | H1107SE |
| H0508Amt | H0902PFS | H1207To | H1107Chk |
| H0509Desc | H0902POC | H1208Amt | H1108BE |
| H0509To | H0902To | H1208Calc | H1108SE |
| H0509Amt | H0903Amt | H1208Desc | H1108Chk |
| H0210Desc | H0903Calc | H1208PFB | H1109BE |
| H0210From | H0903CalcYrs | H1208PFS | H1109SE |
| H0210To | H0903PFB | H1208POC | H1109Chk |
| H0210Amt | H0903PFS | H1208To | H1110BE |
| H0211Desc | H0903POC | H1209Amt | H1110SE |
| H0211From | H0903To | H1209Calc | H1110Chk |
| H0211To | H0903Y | H1209Desc | H1111BE |
| H0211At | H0903Amt | H1209PFB | H1111SE |
| H0210Desc | H0903Calc | H1208PFB | H1109BE |
| H0210From | H0903CalcYrs | H1208PFS | H1109SE |
| H0210To | H0903PFB | H1208POC | H1109Chk |
| H0210Amt | H0903PFS | H1208To | H1110BE |
| H0211Desc | H0903POC | H1209Amt | H1110SE |
| H0211From | H0903To | H1209Calc | H1110Chk |
| H0211To | H0903Yrs | H1209Desc | H1111BE |
| H0211Amt | H0904Amt | H1209PFB | H1111SE |
| H0212Desc | H0904Calc | H1209PFS | H1111Chk |
| H0212From | H0904CalcYrs | H1209POC | H1112BE |
| H0212To | H0904PFB | H1209To | H1112SE |
| H0212Amt | H0904PFS | H1210Amt | H1112Chk |
| H0213Desc | H0904POC | H1210Calc | H1113BE |
| H0213From | H0904To | H1210Desc | H1113SE |
| H0213To | H0904Yrs | H1210PFB | H1113Chk |
| H0213Amt | H0905Amt | H1210PFS | H1201DBE |
| H0510Desc | H0905Desc | H1210POC | H1201DSE |
| H0510From | H0905PFB | H1210To | H1201DChk |
| H0510To | H0905PFS | H1211Amt | H1201MBE |

|  310  |  312  |  314  |  316 FROM FIG. 3D |
|---|---|---|---|
| H0510Amt | H0905POC | H1211Calc | H1201MSE |
| H0511Desc | H0905Quan | H1211Desc | H1201MChk |
| H0511From | H0905To | H1211PFB | H1201RBE |
| H0511To | H0905Unit | H1211PFS | H1201RSE |
| H0511Amt | H1001Amt | H1211POC | H1201RChk |
| H0512Desc | H1001CalcAmt | H1211To | H1202DBE |
| H0512From | H1001CalcMos | H1212Amt | H1202DSE |
| H0512To | H1001CalcPMo | H1212Calc | H1202DChk |
| H0512Amt | H1001Mos | H1212Desc | H1202MBE |
| H0513Desc | H1001PFB | H1212PFB | H1202MSE |
| H0513From | H1001PFS | H1212PFS | H1202MChk |
| H0513To | H1001PMo | H1212POC | H1203BE |
| H0513Amt | H1001POC | H1212To | H1203SE |
| H0214Desc | H1002Amt | H1213Amt | H1203Chk |
| H0214From | H1002CalcAmt | H1213Calc | H1204BE |
| H0214To | H1002CalcMos | H1213Desc | H1204SE |
| H0214Amt | H1002CalcPMo | H1213PFB | H1204Chk |
| H0514Desc | H1002Mos | H1213PFS | H1205BE |
| H0514From | H1002PFB | H1213POC | H1205SE |
| H0514To | H1002PFS | H1213To | H1205Chk |
| H0514Amt | H1002PMo | H1214Amt | H1206BE |
| H0215Desc | H1002POC | H1214Calc | H1206SE |
| H0215From | H1002DDN | H1214Desc | H1206Chk |
| H0215To | H1003Amt | H1214PFB | H1207BE |
| H0215Amt | H1003CalcAmt | H1214PFS | H1207SE |
| H0515Desc | H1003CalcMos | H1214POC | H1207Chk |
| H0515From | H1003CalcPMo | H1214To | H1208BE |
| H0515To | H1003Mos | H1301To | H1208SE |
| H0515Amt | H1003PFB | H1301Amt | H1208Chk |
| H0216Desc | H1003PFS | H1301POC | H1209BE |
| H0216From | H1003PMo | H1301PFB | H1209SE |
| H0216To | H1003POC | H1301PFS | H1209Chk |
| H0216Amt | H1003DDN | H1302Desc | H1210BE |
| H0516Desc | H1004Amt | H1302To | H1210SE |
| H0516From | H1004CalcAmt | H1302Amt | H1210Chk |
| H0516To | H1004CalcMos | H1302POC | H1211BE |

FROM FIG. 3E

| 310 | 312 | 314 | 316 |
|---|---|---|---|
| H0516Amt | H1004CalcPMo | H1302PFB | H1211SE |
| H0217Desc | H1004Mos | H1302PFS | H1211Chk |
| H0217From | H1004PFB | H1303Desc | H1212BE |
| H0217To | H1004PFS | H1303To | H1212SE |
| H0217Amt | H1004PMo | H1303Amt | H1212Chk |
| H0517Desc | H1004POC | H1303POC | H1213BE |
| H0517From | H1004DDN | H1303PFB | H1213SE |
| H0517To | H1005Amt | H1303PFS | H1213Chk |
| H0517Amt | H1005CalcAmt | H1304Desc | H1301BE |
| H0218Desc | H1005CalcMos | H1304To | H1301SE |
| H0218From | H1004PFS | H1304Amt | H1301Chk |
| H0217Amt | H1004PMo | H1303Amt | H1212Chk |
| H0517Desc | H1004POC | H1303POC | H1213BE |
| H0517From | H1004DDN | H1303PFB | H1213SE |
| H0517To | H1005Amt | H1303PFS | H1213Chk |
| H0517Amt | H1005CalcAmt | H1304Desc | H1301BE |
| H0218Desc | H1005CalcMos | H1304To | H1301SE |
| H0218From | H1005CalcPMo | H1304Amt | H1301Chk |
| H0218To | H1005Mos | H1304POC | H1302BE |
| H0218Amt | H1005PFB | H1304PFB | H1302SE |
| H0518Desc | H1005PFS | H1304PFS | H1302Chk |
| H0518From | H1005PMo | H1305Desc | H1303BE |
| H0518Amt | H1005POC | H1305To | H1303SE |
| H0219Desc | H1005DDN | H1305Amt | H1303Chk |
| H0219From | H1006Amt | H1305POC | H1304BE |
| H0219To | H1006CalcAmt | H1305PFB | H1304SE |
| H0219Amt | H1006CalcMos | H1305PFS | H1304Chk |
| H0519Desc | H1006CalcPMo | H1306Desc | H1305BE |
| H0519From | H1006Mos | H1306To | H1305SE |
| H0519To | H1006PFB | H1306Amt | H1305Chk |
| H0519Amt | H1006PFS | H1306POC | H1306BE |
| H0518To | H1006PMo | H1306PFB | H1306SE |
| H0220Amt | H1006POC | H1306PFS | H1306Chk |
| H0520Amt | H1007Amt | H1307Desc | H1307BE |
| H0301Amt | H1007CalcAmt | H1307To | H1307SE |
| H0601Amt | H1007CalcMos | H1307Amt | H1307Chk |

FROM FIG. 3F

| | | | |
|---|---|---|---|
| H0302Amt | H1007CalcPMo | H1307POC | H1308BE |
| H0602Amt | H1007Mos | H1307PFB | H1308SE |
| H0303FT | H1007POC | H1307PFS | H1308Chk |
| H0303Amt | H1007PFB | H1308Desc | H1309BE |
| H0603FT | H1007PFS | H1308To | H1309SE |
| H0603Amt | H1007PMo | H1308Amt | H1309Chk |
| H0401Amt | H1008Desc | H1308POC | H1310BE |
| H0402Amt | H1008Mos | H1308PFB | H1310SE |
| H0106CalcFrom | H1008PMo | H1308PFS | H1310Chk |
| H0106CalcTo | H1008CalcAmt | H1309Desc | HLndrMtgTxChk |
| H0107CalcFrom | H1008Amt | H1309To | H0813BE |
| H0107CalcTo | H1008POC | H1309Amt | H0813SE |
| H0108CalcFrom | H1008DDN | H1309POC | H0813Chk |
| H0108CalcTo | H1008PFB | H1309PFB | H0814BE |
| H0109CalcFrom | H1008PFS | H1309PFS | H0814SE |
| H0109CalcTo | H1009PFB | H1310Desc | H0814Chk |
| H0210CalcFrom | H0813Amt | H1310To | H0815BE |
| H0210CalcTo | H0813Desc | H1310Amt | H0815SE |
| H0211CalcTo | H0813PFB | H1310POC | H0815Chk |
| H0211CalcFrom | H0813PFS | H1310PFB | H0816BE |
| H0212CalcTo | H0813POC | H1310PFS | H0816SE |
| H0212CalcFrom | H0813To | H1201dPages | H0816Chk |
| H0402Desc | H0814Amt | H1201dCalc | H0817BE |
| | H0814Desc | H1201dAmt | H0817SE |
| | H0814PFB | H1201mPages | H0817Chk |
| | H0814PFS | H1201mCalc | H0818BE |
| | H0814POC | H1201mAmt | H0818SE |
| | H0814To | H1201rCalc | H0818Chk |
| | H0815Amt | H1201rAmt | |
| | H0815Desc | H1201tCalc | |
| | H0815PFB | H1201tAmt | |
| | H0815PFS | H1201PFB | |
| | H0815POC | H1201PFS | |
| | H0815To | H1202dCalc | |
| | H0816Amt | H1202dAmt | |
| | H0816Desc | H1202mCalc | |

FROM FIG. 3G

| 312 | 314 |
|---|---|
| H0816PFB | H1202mAmt |
| H0816PFS | H1202tCalc |
| H0816POC | H1202tAmt |
| H0816To | H1202PFB |
| H0815POC | H1202PFS |
| H0815To | H1202dCalc |
| H0816Amt | H1202dAmt |
| H0816Desc | H1202mCalc |
| H0816PFB | H1202mAmt |
| H0816PFS | H1202tCalc |
| H0816POC | H1202tAmt |
| H0816To | H1202PFB |
| H0817Amt | H1202PFS |
| H0817Desc | H1400PFB |
| H0817PFB | H1400PFS |
| H0817PFS | H1201dPFB |
| H0817POC | H1201dPFS |
| H0817To | H1201mPFB |
| H0818Amt | H1201mPFS |
| H0818Desc | H1201rPFB |
| H0818PFB | H1201rPFS |
| H0818PFS | H1202dPFB |
| H0818POC | H1202dPFS |
| H0818To | H1202mPFB |
|  | H1202mPFS |
|  | HLndrMtgTx |

*FIG. 3H*

FROM FIG. 4A

| 412 | 414 |
|---|---|
| CustomerContactPhone<br>BankAttorneyFee<br>LenderLoginID<br>LenderEMail<br>TitleOnly<br>Ten99Only<br>BankAttorneyEFee | LineItemCushionMonths<br>EstimatedTaxMonths<br>BiWeeklyEvenOdd<br>BiWeeklyDOW<br>CushionMonths<br>InclideMIInCushion<br>ExtraMonthOfReserve<br>AddMonthForEstTaxes<br>PropertyAddressFormatForNote<br>PropertyAddressFormatForMort<br>PropertyAddressFormatForRider<br>PropertyAddressFormatForAss<br>NoteEndorsement<br>CustomerContactName<br>ExtraMonthOfReserve<br>AddMonthForEstTaxes<br>PropertyAddressFormatForNote<br>PropertyAddressFormatForMort<br>PropertyAddressFormatForRider<br>PropertyAddressFormatForAss<br>NoteEndorsement<br>CustomerContactName<br>CustomerContactPhone<br>PaymentServicingAgent<br>PaymentServicingAgentContact<br>PaymentServicingAgentAddrL1<br>PaymentServicingAgentAddrL2<br>PaymentServicingAgentAddrCSZ<br>PaymentServicingAgentPhone<br>TaxServicingAgent<br>TaxServicingAgentAddrL1<br>TaxServicingAgentAddrL2<br>TaxServicingAgentAddrCSZ<br>TaxServicingAgentPhone<br>Brokered<br>AssigneeNameFull<br>AssigneeAddressL1<br>AssigneeAddressL2<br>AssigneeAddressCSZ<br>NumberCalDaysToLateFeeOO<br>NumberCalDaysToLateFeeNOO<br>BankAttyFeeHUDLine<br>PMIMonthsEscrow<br>PMIAnnualMonthsEscrow<br>SkipSatRecission<br>HazardMortgageeClause<br>LateFeePercentageOO<br>LateFeePercentageNOO<br>SurveyCertification |

FROM FIG. 9A

PhoneBusiness
FAX
NoAtty
TaxIDType
IRSReportable
AdjRealEstateTax
Veteran
Ten99Amount
eMail
FKA
TitleAsFKA
FKA
TitleAsFKA

AUTOMATED WORK-FLOW MANAGEMENT AND DOCUMENT GENERATION SYSTEM AND METHOD

CROSS REFERENCE

The following related application is hereby incorporated by reference for its teachings:

"AUTOMATED LEGAL WORK-FLOW MANAGEMENT AND DOCUMENT GENERATION SYSTEM AND METHOD," K. Petito et al., U.S. Provisional Application No. 60/238,827, filed Oct. 6, 2000.

This invention relates generally to an automated work-flow management and document generation system and more particularly to systems and methods, employing computers, for automating the operations of a law office, including a real estate closing process.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

A computer program listing Appendix submitted on one compact disc(s) is included and the material thereon is hereby incorporated-by-reference. The total number of compact discs is two, including one original(s) and one duplicate(s), each of which include three directories/folders (CodeDocumentation, DatabaseDocumentation and WebDocumentation) that include the following files:

| Name | Size | Created |
| --- | --- | --- |
| CodeDocumentation | | |
| LenderRes1099.vbw | 51 | 05/04/2001 04:32a |
| LenderRes1099.vbp | 1,355 | 01/28/2001 08:15a |
| Ten99.ctl | 31,001 | 01/28/2001 08:15a |
| Blob.vbp | 916 | 12/07/2000 03:17a |
| Blob.ctl | 10,361 | 12/02/2000 04:42p |
| Escrow.cls | 6,350 | 11/05/2000 02:40p |
| General.cls | 1,159 | 07/13/1999 08:17a |
| MortCalcs.vbp | 916 | 11/29/2000 07:33p |
| Escrow.rtf | 12,364 | 07/09/1999 07:26a |
| Escrow.ctl | 64,788 | 12/27/2000 02:10p |
| LenderResEscrow.vbp | 1,438 | 12/29/2000 06:02a |
| modMain.bas | 212,654 | 05/07/2001 06:02p |
| HUD.ctl | 137,221 | 05/04/2001 01:05p |
| LenderResHUD.vbp | 1,088 | 06/10/2001 07:45a |
| frmNote.frm | 13,398 | 02/20/2001 07:17p |
| LederResNotes.vbp | 1,219 | 02/21/2001 04:14a |
| Notes.ctl | 15,430 | 02/20/2001 07:17p |
| dlgPropertyAddress.frm | 3,637 | 01/28/1999 05:22p |
| dlgCopyInfo.frm | 2,365 | 02/01/1999 06:16p |
| LenderResParty.vbp | 1,565 | 05/31/2000 03:23p |
| modAutoErrHandler.bas | 1,008 | 12/19/1999 03:24p |
| Parties.ctl | 48,889 | 04/26/2000 09:21a |
| LenderResPrevMtg.vbp | 1,404 | 12/29/2000 06:02a |
| PrevMtg.ctl | 47,929 | 12/29/2000 06:02a |
| Report.ctl | 4,904 | 04/18/2001 11:19a |
| Reports.vbp | 892 | 04/15/2001 06:56p |
| LenderResStatus.vbp | 1,428 | 06/10/2001 07:44a |
| Status.ctl | 23,949 | 05/02/2001 03:46p |
| Title.ctl | 34,536 | 02/20/2001 06:27p |

-continued

| Name | Size | Created |
| --- | --- | --- |
| Title.vbp | 1,069 | 02/21/2001 04:14a |
| ErrHandler.vbp | 1,008 | 05/22/2001 06:51p |
| clsErrHandler.cls | 5,854 | 04/03/2000 07:18p |
| frmErrHandler.frm | 7,827 | 04/22/2000 11:37a |
| Main.bas | 2,881 | 10/23/2000 03:54p |
| frmClosingCalendarAdd.frm | 8,981 | 09/27/1998 05:27p |
| MExceptionHandler.bas | 15,562 | 04/29/2001 08:58p |
| modErrorHandling.bas | 2,143 | 04/17/2001 06:13p |
| modFormat.bas | 13,223 | 04/17/2001 06:24p |
| modMath.bas | 15,967 | 04/05/2001 07:13p |
| modPrinterSupport.bas | 5,143 | 04/29/2001 09:57a |
| modStrings.bas | 3,257 | 02/07/2001 05:31p |
| modTitle.bas | 24,382 | 11/29/2000 05:57p |
| modXML.bas | 1,030 | 02/22/2001 04:58p |
| tokencalls.bas | 2,161 | 03/03/2001 01:04p |
| clsDocList.cls | 1,837 | 04/17/2001 04:57p |
| clsEscrow.cls | 10,422 | 02/19/2001 05:57a |
| clsFAX.cls | 5,732 | 02/19/2001 05:57a |
| clsFAXStatus.cls | 2,201 | 02/19/2001 05:57a |
| clsWord.cls | 15,318 | 03/21/2001 06:43p |
| eOriginal.cls | 30,873 | 03/19/2001 07:40a |
| SaxDownloadFile.cls | 1,322 | 03/03/2001 03:45p |
| saxuploadfile.cls | 1,643 | 03/27/2001 05:27a |
| TextFile.cls | 6,208 | 02/19/2001 05:57a |
| token.cls | 2,591 | 02/19/2001 05:57a |
| ucLenderRes.Dsr | 111,014 | 05/04/2001 07:08p |
| frmAbout.frm | 10,492 | 05/06/2001 03:10p |
| frmBrowser.frm | 10,633 | 05/03/2001 05:19p |
| frmCancel.frm | 1,755 | 05/06/2001 07:04p |
| frmCardInput.frm | 12,421 | 12/05/1998 05:30p |
| frmCheckDocFields.frm | 31,586 | 05/06/2001 11:12a |
| frmClosing3_.frm | 285,427 | 05/06/2001 07:18p |
| frmClosingCalendar3.frm | 62,008 | 03/10/2001 12:38p |
| base64calls.bas | 368 | 01/22/2001 02:06p |
| frmDocPackage.frm | 45,959 | 05/06/2001 11:11a |
| frmDocument.frm | 966 | 06/21/1998 08:14a |
| frmFindClosing.frm | 11,394 | 03/02/2001 08:36p |
| frmHUDSetup.frm | 5,414 | 05/06/2001 11:11a |
| frmLogin.frm | 3,337 | 05/05/2001 09:14a |
| frmLoginTCU.frm | 4,195 | 03/22/2001 07:30a |
| frmMain.frm | 52,529 | 05/06/2001 03:10p |
| frmODBCLogon.frm | 9,686 | 08/17/1998 06:57p |
| frmOpenNewFile.frm | 5,210 | 05/06/2001 10:12a |
| frmOptions.frm | 13,187 | 02/14/2001 07:49a |
| frmOptionsReports.frm | 5,059 | 10/11/1998 12:43p |
| frmParty.frm | 15,059 | 08/23/1998 08:55a |
| frmPassword.frm | 2,616 | 04/16/2001 12:34p |
| frmPreview.frm | 1,345 | 05/03/2001 05:19p |
| frmPrint.frm | 24,570 | 12/09/2000 05:22a |
| frmPrograms.frm | 26,387 | 05/05/2001 09:14a |
| frmSplash.frm | 7,518 | 02/14/2001 07:51a |
| frmTest.frm | 9,496 | 12/29/1998 04:49a |
| frmViews.frm | 11,675 | 05/06/2001 07:07p |
| tstRTF.frm | 1,032 | 02/09/1999 06:16p |
| LenderRes.vbp | 5,415 | 06/10/2001 08:59a |
| Folder.frm | 6,331 | 10/18/2000 07:02p |
| EZVB.BAS | 13,258 | 03/05/1997 07:10a |
| frmScanArchive.frm | 13,440 | 10/26/2000 06:42p |
| Globals.bas | 2,120 | 10/23/2000 06:49p |
| Options.frm | 6,550 | 10/18/2000 07:02p |
| PPTLnk.vbp | 1,749 | 10/26/2000 06:42p |
| Send.frm | 6,611 | 10/18/2000 07:02p |
| VBSIMPLE.INI | 266 | 10/26/2000 06:15p |
| DatabaseDocumentation | | |
| AllViews.sql | 28,936 | 08/02/2001 10:57a |
| AllStoredProcedures.sql | 1,251,484 | 08/02/2001 06:26a |
| ListOfTables.sql | 5,882 | 08/02/2001 05:24p |
| WebDocumentation | | |
| ClientServicesLogin.asp | 2,819 | 09/20/2001 07:03a |
| ClientServicesCalMonth.asp | 1,699 | 09/20/2001 07:03a |
| ClientServicesCreateFile.asp | 8,128 | 09/20/2001 07:03a |
| ClientServicesEPortfoiio.asp | 1,566 | 09/20/2001 07:02a |
| ClientServicesFindFile.asp | 5,805 | 09/21/2001 09:15a |
| ClientServicesForms.asp | 3,138 | 09/20/2001 07:03a |
| addNoteWindow.asp | 3,140 | 09/20/2001 07:03a |

-continued

| Name | Size | Created |
|---|---|---|
| ClientServicesReports.asp | 3,269 | 09/20/2001 07:03a |
| ClientServicesViewFile.asp | 5,282 | 09/25/2001 12:49p |
| ClientServicesWelcome.asp | 2,461 | 09/20/2001 07:03a |
| global.asa | 3,023 | 09/20/2001 07:04a |
| global.css | 3,823 | 09/21/2001 07:18a |
| helpWindow.asp | 722 | 09/20/2001 07:03a |
| logout.asp | 371 | 09/20/2001 07:02a |
| redirector.asp | 1,719 | 09/25/2001 12:30p |
| saveWindow.asp | 2,754 | 09/21/2001 07:07p |
| storeFileData.asp | 7,984 | 09/22/2001 06:07a |
| storeFileData_copy(1).asp | 5,936 | 09/20/2001 07:02a |
| storeFileData_copy(2).asp | 6,059 | 09/20/2001 07:02a |
| storeFileData_copy(3).asp | 6,738 | 09/20/2001 07:02a |
| storeIssueData.asp | 3,381 | 09/20/2001 07:03a |
| storeTransmittalData.asp | 2,504 | 09/20/2001 07:03a |
| verifyLogin.asp | 2,027 | 09/20/2001 07:02a |
| generateFileData_copy(1).asp | 4,701 | 09/20/2001 07:25a |
| callSP.asp | 181 | 09/20/2001 07:25a |
| controls.htm | 4,683 | 09/20/2001 07:25a |
| conversionFunctions.asp | 6,103 | 09/21/2001 07:10a |
| conversionFunctions_copy(1).asp | 7,778 | 09/20/2001 07:02a |
| displayForm.asp | 1,238 | 09/20/2001 07:25a |
| displayReport.asp | 1,552 | 09/20/2001 07:25a |
| divResizer.htm | 2,976 | 09/20/2001 07:25a |
| exitPage.asp | 408 | 09/23/2001 01:34p |
| generateArchivedDocs.asp | 876 | 09/25/2001 12:47p |
| generateCalendarMonth.asp | 4,487 | 09/20/2001 07:25a |
| generateError.htm | 1,508 | 09/20/2001 07:25a |
| generateFileData.asp | 4,039 | 09/24/2001 02:58p |
| adojavas.inc | 10,209 | 09/20/2001 07:25a |
| generateFileStatus.asp | 869 | 09/25/2001 12:46p |
| generateGrid.asp | 3,919 | 09/25/2001 01:07p |
| generateGridx.asp | 9,358 | 09/20/2001 07:25a |
| generateHTMLobject.asp | 4,033 | 09/25/2001 12:18p |
| generateIssues.asp | 5,945 | 09/20/2001 07:25a |
| generateNotes.asp | 1,321 | 09/25/2001 12:48p |
| generateTransmittal.asp | 2,915 | 09/21/2001 10:10a |
| globalInclude.htm | 384 | 09/25/2001 12:18p |
| gridHighlight.htm | 1,931 | 09/20/2001 07:25a |
| header.htm | 450 | 09/20/2001 07:25a |
| menubar.htm | 3,692 | 09/25/2001 01:37p |
| menubar_copy(1).htm | 3,607 | 09/23/2001 07:46a |
| openPopWindow.htm | 389 | 09/21/2001 09:56a |
| popupMenu.htm | 6,055 | 09/21/2001 11:03a |
| recentFiles.htm | 2,575 | 09/20/2001 07:25a |
| SessionArrays.asp | 829 | 09/20/2001 07:04a |
| goodStorage.asp | 1,274 | 09/20/2001 07:04a |
| messageWindow.asp | 374 | 09/21/2001 09:32a |
| messwin.htm | 786 | 09/20/2001 07:04a |
| RSmanipulation.asp | 860 | 09/20/2001 07:04a |
| dates.asp | 1,145 | 09/20/2001 07:04a |
| SessionRS.asp | 621 | 09/20/2001 07:02a |
| StickyHighlight.htm | 5,393 | 09/20/2001 07:04a |
| TypeChange.asp | 1,139 | 09/20/2001 07:02a |
| X.asp | 342 | 09/20/2001 07:02a |

BACKGROUND AND SUMMARY OF THE INVENTION

The advancement of computer and network systems offer opportunities for automation (e.g., computer driven) of traditional legal tasks such as contract generation and real estate closings. However, in many cases, computers and networks have simply expedited the transmission of information. Take for example, the negotiation of a contract. It is currently possible, and in many areas common, for the various parties to the contract, including their legal counsel, to share electronic drafts of the agreement via electronic mail or e-mail. Edits may be made to the electronic document attached to the e-mail and rerouted to the parties for to review. Recipients may also print hard copies of such electronic documents for review and editing purposes. While such systems and processes have eliminated the traditional transmission time for contract documents (mailing, faxing, overnight delivery, etc.), the uncontrolled proliferation of electronic documents raises numerous concerns, including: version control, unauthorized disclosure, unauthorized modification, and interruptions in an approval process.

Currently, a gap exists in data exchange and party/process interfaces between on-line or paper-based origination and on-line or paper-based transaction, particularly real estate closings. It is such interfaces where closing agent and title agent processing, tasks and communications occur, all or many of which are still paper-based, time-consuming, inefficient, and error prone. Similarly, the follow-up or post-closing tasks that must occur after the closing and after recordation by various participants, is also currently without the benefit of overall centralized process management, integrated tracking and history, continuity of shared data, and auto-notifications and cross task reporting.

Various software products have also been introduced to assist attorneys and paralegals in contracts and other legal documents. Such products typically provide boilerplate legal phrasing from which a user may select a number of choices for "fill-in-the-blank" provisions depending upon the circumstance. An example of such a product is Intuit Inc.'s Quicken Family Lawyer Deluxe. In that product, answers to a series of questions are used to select and combine provisions and terms appropriate for the circumstance.

Unfortunately, the approaches currently available for automating or improving the legal profession have focused on only a single aspect or small portion of an overall process of providing legal services (e.g., improved transmission speed or document generation), and have not focused on automation of an entire legal services process, or other transactional or reporting services. Accordingly, there is a need for an integrated and automated work-flow management and document generation system providing scheduling and process control features, collaboration mechanisms, version control, and workflow management. For example, a need exists for an automated real estate closing system capable of applying defined legal and business constraints to expedite the approval and closing of real estate contracts therein. The present invention is, accordingly, directed to such a system.

The present invention further contemplates the application of such a system to facilitate a virtual closing or similar legal, financial or accounting services. In particular, the various features and functions of the present invention, including rule-based data access, could be applied to enable a digital signature being applied to complete the transaction. The system may also be used with mandated government reporting systems so as to enable the efficient generation of reports, and digital filing thereof (e.g., employee pension plan reporting).

In accordance with the present invention, there is provided a system for managing work-flow during the provision of services to a client, including: a network accessible by a plurality of users involved in the provision of the services; a database, accessible via said network, said database allowing controlled access by the plurality of users and storing data related to said client, said database further including at least one table having embedded rules wherein the rules define a work-flow for the services being provided; and a user interface that provides access to said database for said plurality of users, including the ability to obtain documents automatically generated by the system.

In accordance with another aspect of the present invention, there is provided a method for managing work-flow during the provision of services to a client, including the steps of: providing a network accessible by a plurality of users involved in the provision of the services; creating a database, accessible via the network, the database allowing controlled access by the plurality of users and storing data related to the client, the database further including at least one table having rules embedded therein, where the rules define at least a portion of a work-flow for the services being provided; and providing access to the database for the plurality of users via a user interface, including the ability to obtain documents automatically generated by the system.

In accordance with yet another aspect of the present invention, there is provided a method for managing work-flow during a real estate transaction, including the steps of: providing a network accessible by a plurality of users involved in the provision of the services during at least initial, closing, title and post-closing phases of the real estate transaction; creating a database, accessible via the network, the database allowing controlled access by the plurality of users and storing data related to the client, the database further including at least one table having rules embedded therein, where the rules define at least a portion of a work-flow for the services being provided, and at least one record having information pertaining to a real estate transaction where the information was entered by a user in the initial phase; and providing access to the database for the plurality of users via a user interface, including the ability to obtain documents automatically generated by the system.

One aspect of the invention deals with a basic problem of bringing overall process management and connectivity to all processes, participants and data involved in a transaction, for example a mortgage lending transaction. This aspect is further based on the discovery of a technique that alleviates this problem. The present invention employs techniques designed to manage a process from inception through closure, including all follow-up tasks, and to enable all parties involved in the process to interact with and keep the process moving forward via rules and controlled web-based access to a transaction's Virtual File Folder™ (containing, for example, all file specific data, documents, notes, status and history) and client/type/status driven auto-notifications.

BRIEF DESCRIPTION OF THE DRAWINGS

FIGS. 2-14 depict portions of an exemplary database schema employed in accordance with an aspect of the present invention;

FIGS. 15-45 and 48-51 are illustrative user interface screens depicting features and functions of the system depicted in FIG. 1 operating in accordance with the database embodiment of FIGS. 2-14; and FIGS. 18B, 46 and 47 are illustrative maintenance screens used to modify/control the operation of the lender programs, views and document packages generated by the system.

Figure 1:
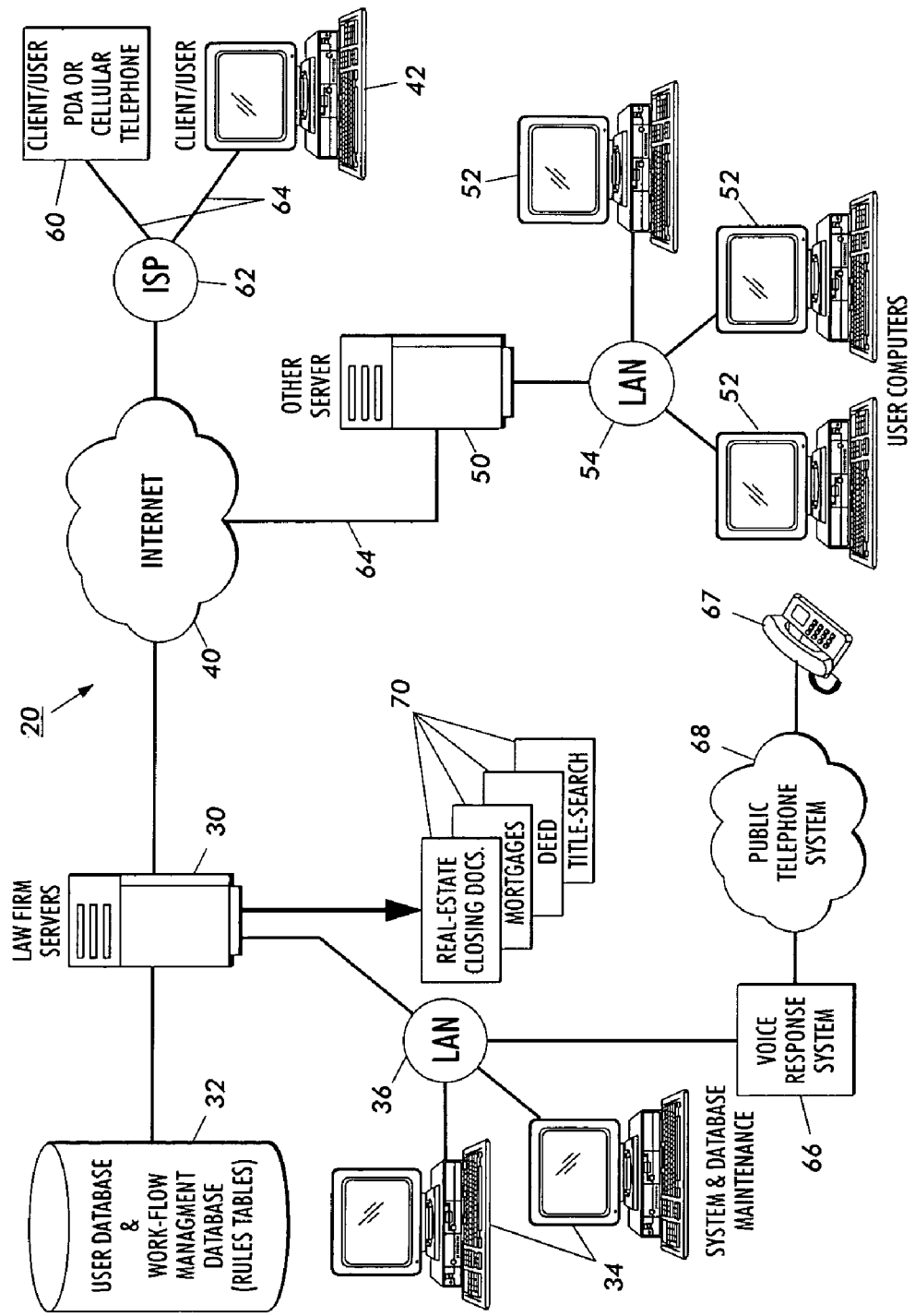
FIG. 1 is a schematic illustration of an embodiment of the present invention.
Figure 3C:
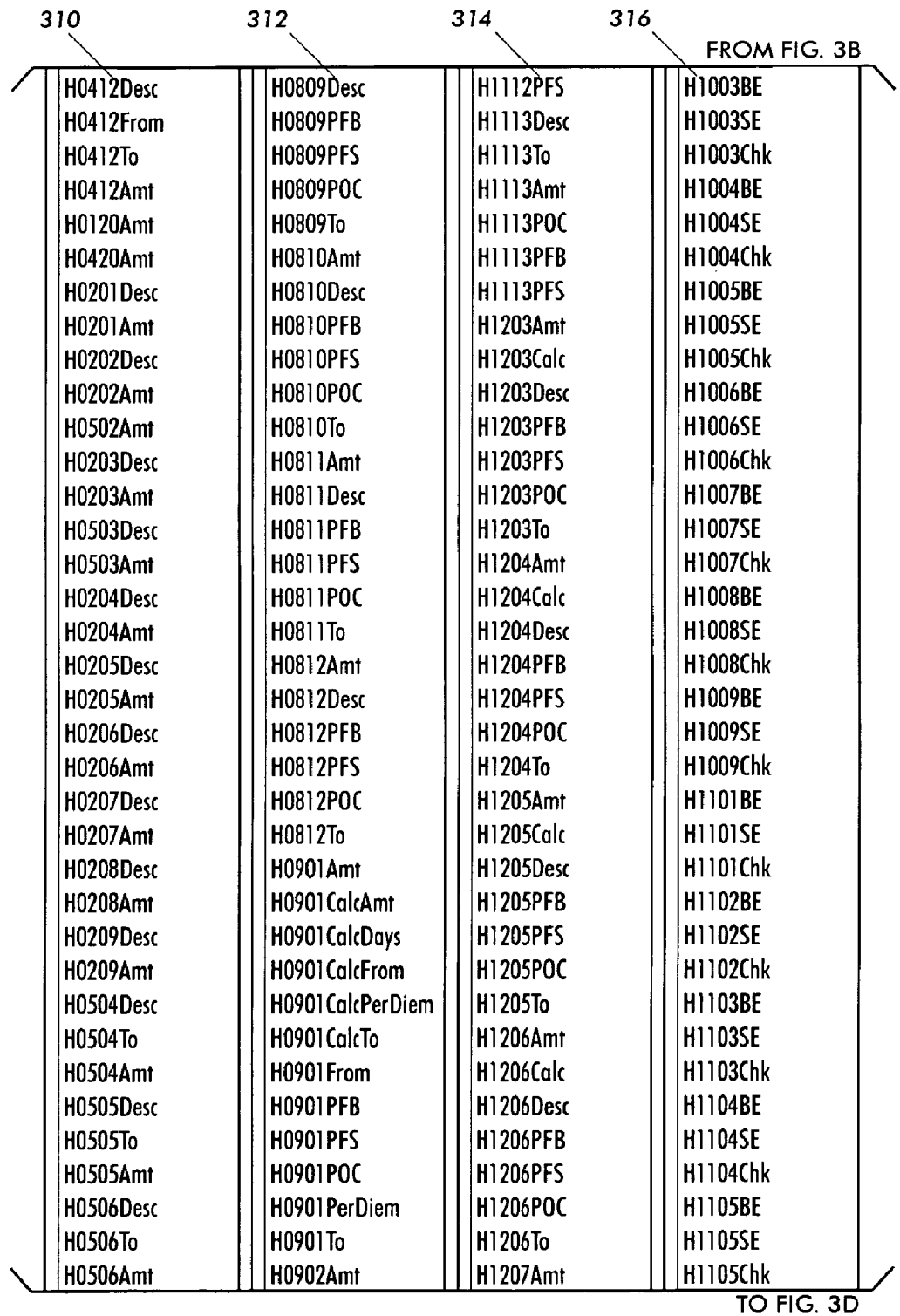

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. A "document" as used herein refers to a medium of communication, including, but not limited to: digital media in the form of bitmap image representations of hardcopy materials, electronically composed pages (e.g., ASCII or portable document language (PDL) formats such as Interpress™ and PostScript™), word processing documents, e-mail or similarly transmitted messages, and equivalent manifestations of digital information. Documents may also contain images, text, graphics, sound, media clips and other elements therein.

System Overview

The following description will utilize an exemplary real estate closing embodiment of the present invention for purposes of description and teaching herein. However, the present invention is not intended to be limited by such an embodiment.

eSys Mortgage Centerware™, as the system is presently characterized and referred to herein, is designed to facilitate and automate a real estate closing, including the various interactions with lenders, sellers, buyers and other users and service providers that need to be involved in the process. In accordance with a preferred embodiment, the present system, as depicted in FIG. 1, may be built on an open architecture Microsoft SQL Server and Internet Information Server and File Server 30 (or equivalent servers/database software systems) and Database 32. Database 32 will be the centralized repository for all data that will feed and integrate the closing modules described below. Integration of such modules in accordance with a defined, or rule-based, work-flow is key to an efficient process, particularly with the elimination of redundant data entry that is costly both in time and the potential for errors. Database 32 is also the repository for the rules that determine the work flow for the system—in the form of rules tables, stored procedures and algorithms.

Referring to FIG. 1, there is illustrated a system 20 that includes servers 30, for example servers in or hosted on behalf of a law firm or real estate transaction company. Servers 30 are interconnected with the database 32 as well as a plurality of users 34 (or clients in a client-server configuration) via a network such as a local area network, LAN 36. It will be further appreciated that other network configurations may be employed to accomplish the present invention. Similarly, servers 30 are also interconnected, via the Internet 40 to a plurality of additional users, including clients 42, mortgage companies, real estate agents, financial and lending institutions, service providers, etc. as represented by server 50 and users 52, which may also be interconnected via a wired or wireless network represented as LAN 54.

As is well known in telecommunications, connections to Internet-hosted information and systems may also be accomplished via wireless communications devices 60 that are interconnected or linked via an Internet Service Provider (ISP) 62 and wired or wireless communication channels 64. Similarly, the system may be accessed via voice recognition and response systems 66 that are interfaced to a user telephone 67 via a public telephone system (PTS) 68. As will be appreciated from the following description, system 20 may be employed, under the control of a rule-based software application, to manage the flow of work or process information, recording such information in database 32. Moreover, the system is capable of generating, as required, documents (hard copy and/or digital) necessary to document or facilitate the process. For example, real estate closing documents 70 may be generated by system 20, via database 32 and servers 30 in preparation for a scheduled real estate closing. The generated documents may include hard copy mortgage and deed documents necessary for recordation of the transaction. It is also possible for the system depicted in FIG. 1 to be implemented using electronic documents and electronic signatures, wherein the creation, execution and recording/storage of such documents is accomplished with little (hybrid closing) or no hard copy document output (electronic closing).

The eSys Mortgage Centerware™ system will preferably archive, on-line, all records created during the process so as to provide a semi-permanent or permanent, accessible archive that is accessible to users who must interact with the system during the process. From the moment a closing matter is initiated, throughout the entire pre-closing, closing, and post-closing process and beyond to mandated records storage, all data, documentation and information will be available to everyone in the closing department on-line and at their fingertips. This will streamline all phases of processing a file by eliminating the need to search for information in various forms and locations as well as the expense of sending paper files offsite for storage. This on-line review of the Virtual File Folder™ could be extended to all parties involved in the transaction via the Internet or other network connections.

The proposed system, via software associated with the servers 30, will accommodate data interchange via extensible markup language (XML) or equivalent interface, for example, Electronic Data Interface/Exchange (EDI/E) as opportunities arise in our area to electronically obtain as well as supply data and services. Current plans include the ability to interface eSys Mortgage Centerware™ software with Lender's loan-origination software as well as data collected at the earliest opportunity in a transaction, perhaps by brokers at the point where a property is put up for sale as such systems come on-line. The potential exists to greatly reduce the cost of messengering documents and re-entering, with potential for error, information already entered into either the loan origination software or eSys Mortgage Centerware™ system. This could significantly reduce file processing time and allow the closing system to handle a larger volume with existing staff.

Matrix Driven Workflow Process

Based on the requirements of each closing program, and loan type for multiple lenders with multiple investors, tables of customizable rules, and algorithms stored in SQL procedures or Visual Basic procedures, govern data entry, calculations, data selection, document selection, and an event driven tickler system. Included on the Computer Program Listing Appendix incorporated herein are three directories or folders of code, divided between CodeDocumentation (including visual basic and other code types), DatabaseDocumentation (including SQL code), and WebDocumentation (including active server page or ASP files). The CodeDocumentation directory includes at least the following elements:

LR4—main rich client application;

ActiveX__1099—this component encapsulates the logic to present/input 1099 data in a summary grid and details card;

ActiveX_Blob—this component encapsulates the logic to present/input 1 to n text Binary Large Objects for large (>255 character) text fields as required for a data view;

ActiveX_Calcs—this component encapsulates the logic for various calculations;

ActiveX_Escrow—this component encapsulates the logic to present an escrow analysis;

ActiveX_HUD—this component encapsulates the logic to present an interactive HUD-1 statement with the following features: color coding, display of calculated fields, allowing user overwrite of selected fields, summary of accounting/check disbursements, etc.;

ActiveX_Notes—this component encapsulates the logic to present/input notes with the following features: time stamp, originator, priority, etc.;

ActiveX_Party—this component encapsulates the logic to present/input Party (borrower, seller, attorney) data in a summary grid and details card;

ActiveX_PrevMtg—this component encapsulates the logic to present/input Previous Mortgage data in a summary grid and details card/grid;

ActiveX_Status—this component encapsulates the logic to display the status of a file and to allow the user to advance the status per database driven state transition logic;

ActiveX_Title—this component encapsulates the logic to present/input Title data;

ErrHandler—this component encapsulates the logic to handle errors; and

PPTLnk—this component encapsulates the logic to interface with third party scanning.

An example of a database schema employed to implement such a system is depicted in FIGS. 2A-14. In particular, the schema includes tables that drive the operation of the system, tables that support the completion of documents, tables that contain information relative to particular municipalities, tables that include rules, and tables that control the layout and display of information in the user-interface.

Figure 6A:
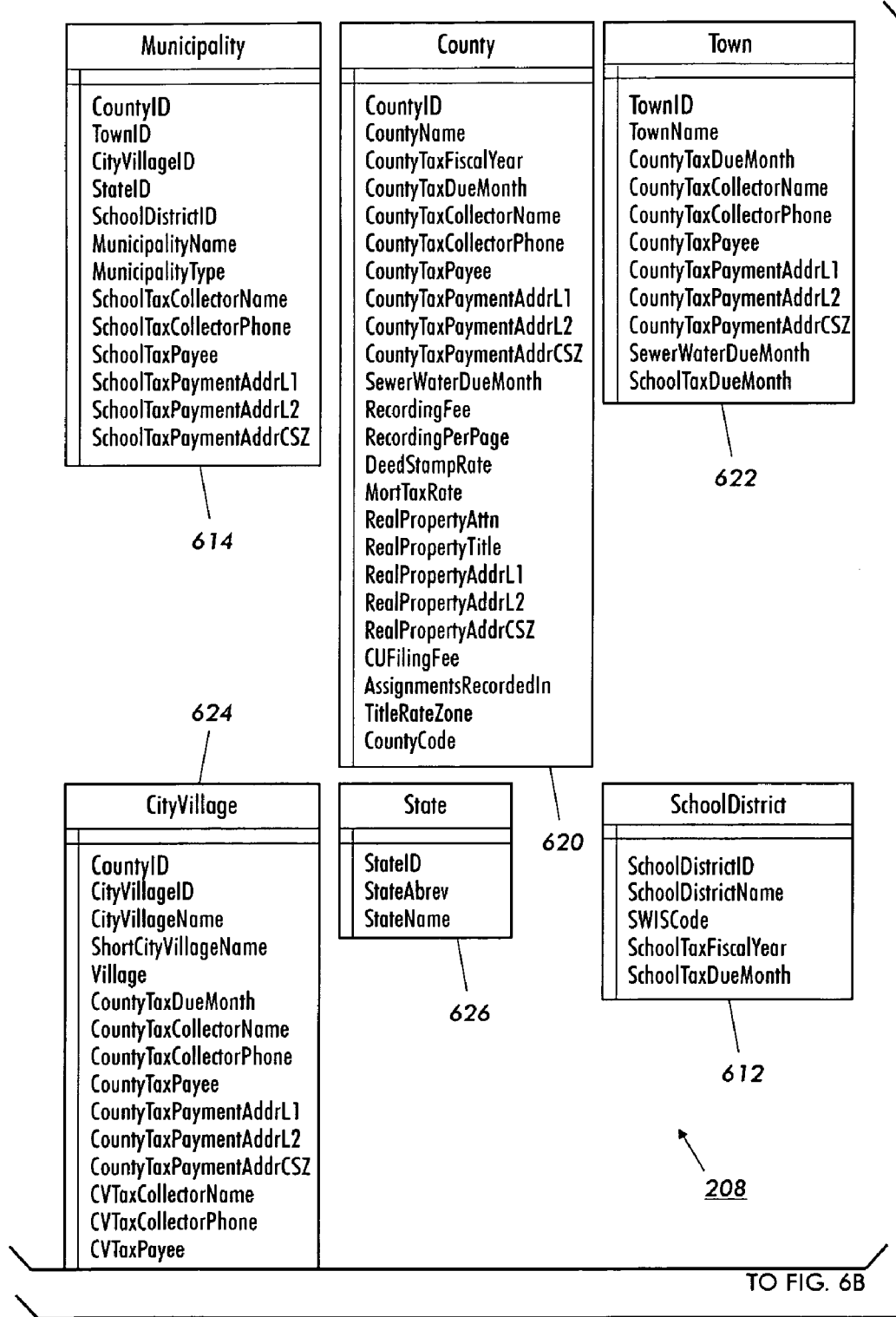
Figure 6B:
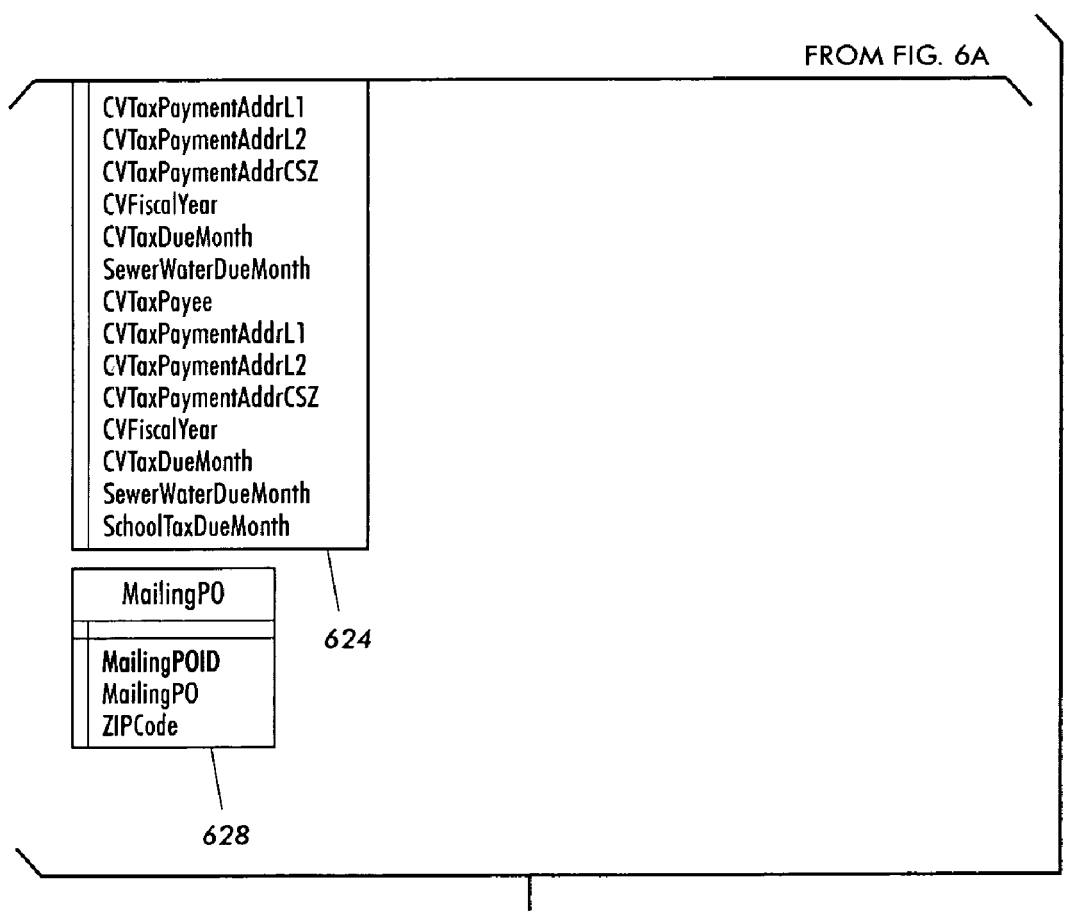

Furthermore, it is possible to include referential or relationship information. Referring to FIGS. 2A-2G, database tables 202 and 203 are the tables used for to maintaining information related to a closing. Table group 208, as depicted in FIGS. 6A-6B, is a series of database tables related to the identification and description of governmental information for the property that is the subject of the real estate transaction. The notes table 1026 (FIG. 10) would also have information related to a particular closing. Group 208 includes, for example, a school district table 612 and a municipality table 614 that interconnects and establishes the relationships and data to support the various municipal entities. Group 216 (FIG. 5) includes tables that pertain to the display and output of stored information, including formatting, etc. Table 203 includes additional closing information (similar to Table 202). Group 230, depicted at FIGS. 4A-4D, includes tables that define the particular information and parameters associated with the lender, loan type and investor for a particular transaction. For example, in FIG. 4D, the Tax and TaxType tables allow post closing tracking of taxes, the Recordation and Recordation Type tables allow post closing tracking of document recordation. The Reports table 438 is a table of available online reports. Lastly, the LendersAgents table 440 associates Agents with Lenders for filling Agent dropdown lists, etc.

Figure 7:
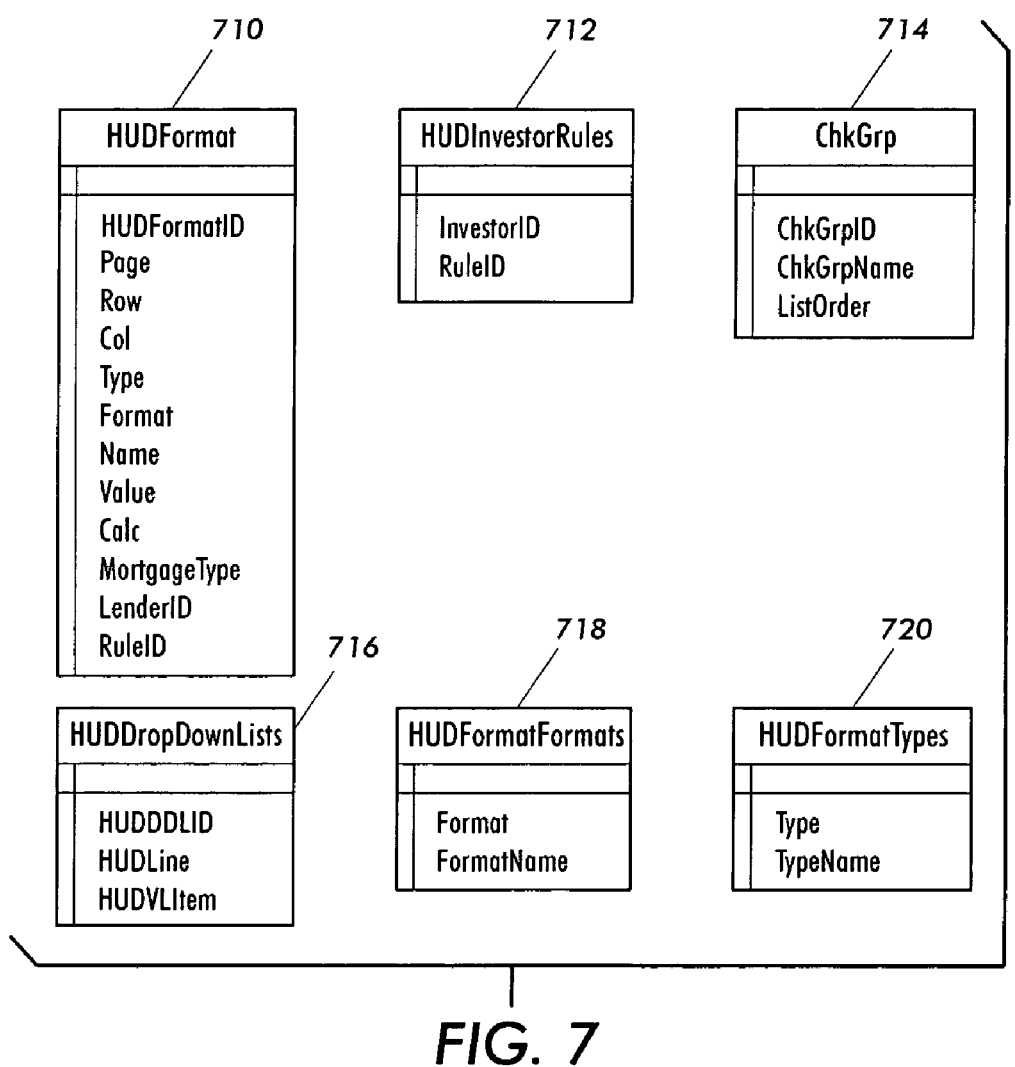
Figure 8:
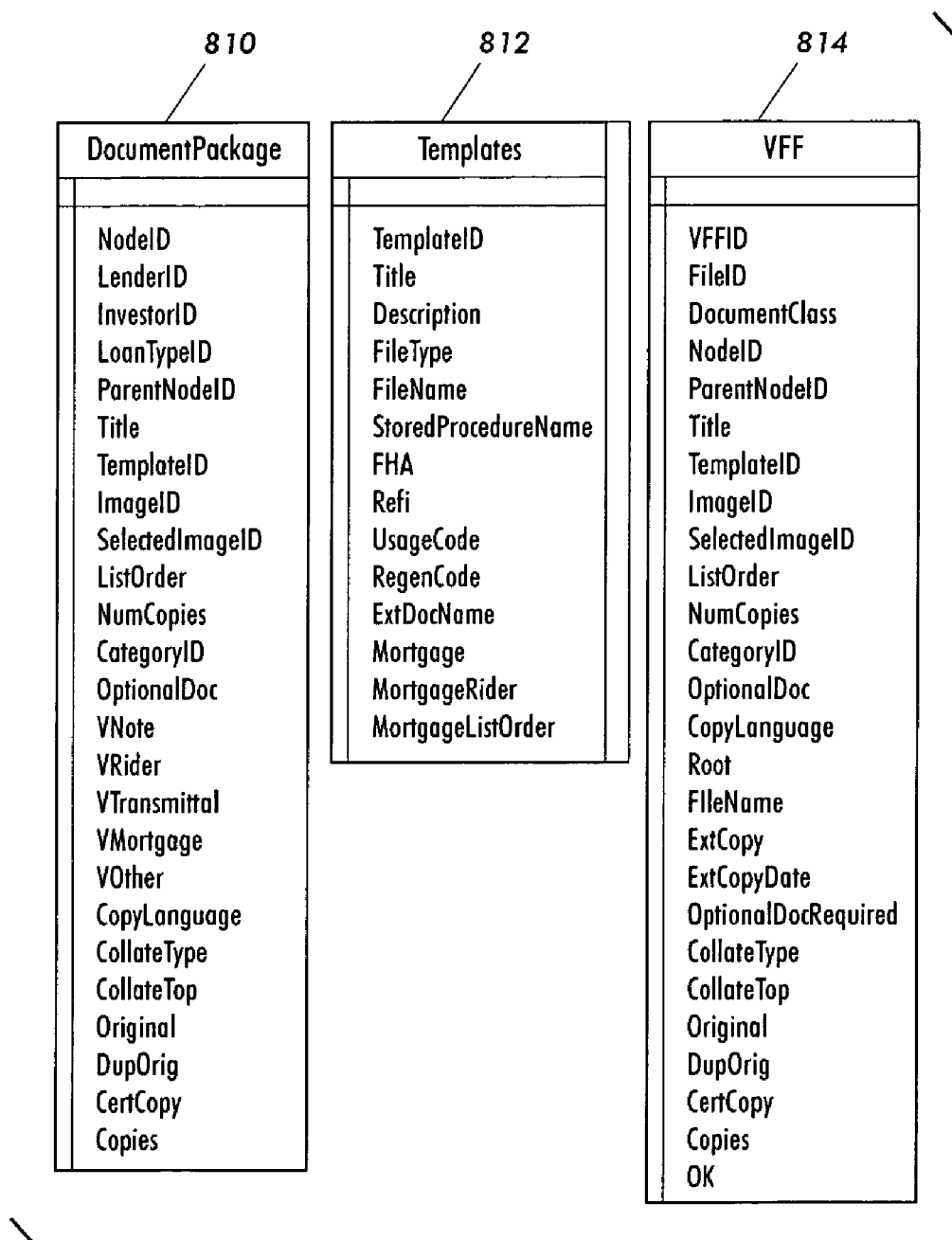
Figure 9A:
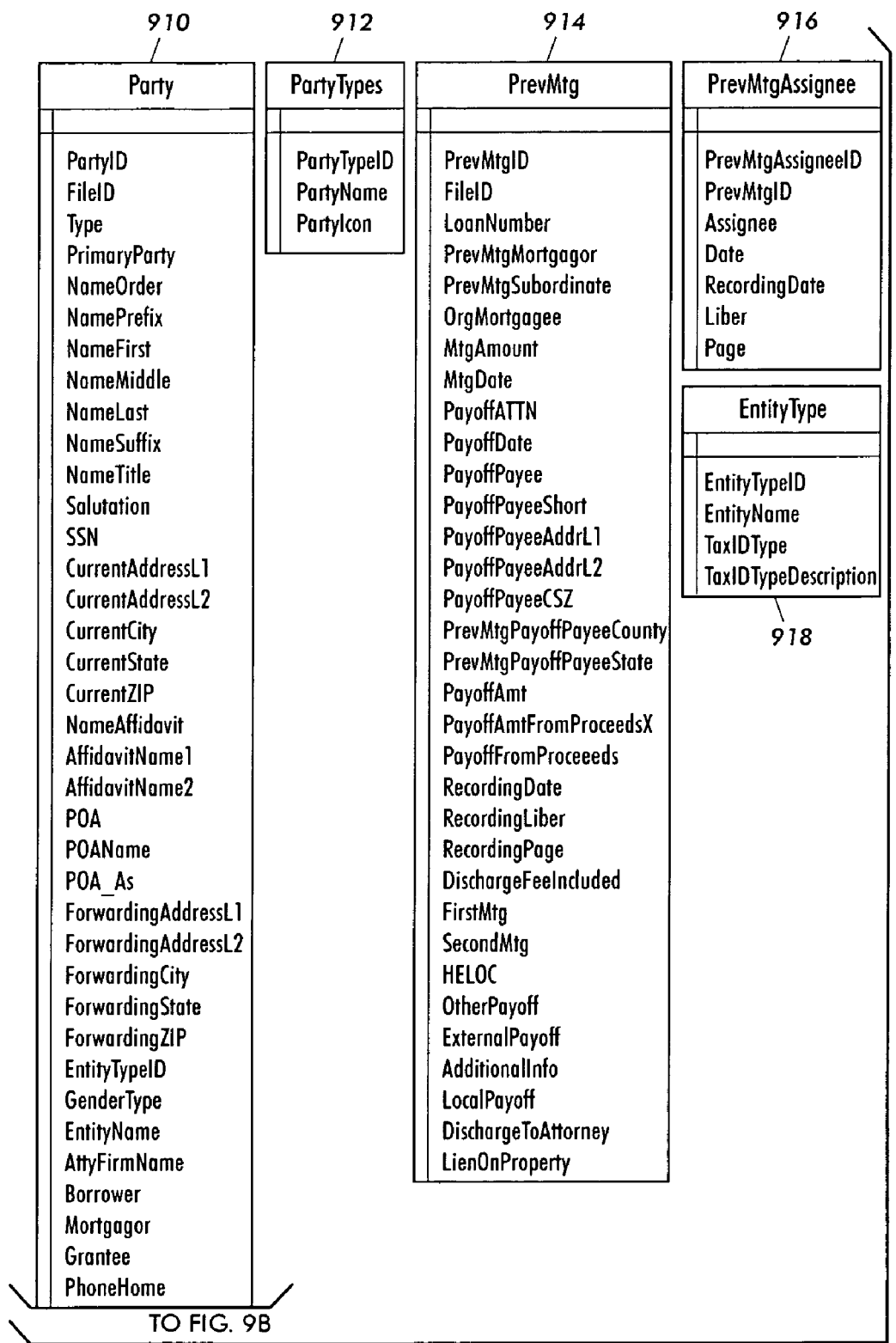
Figure 10:
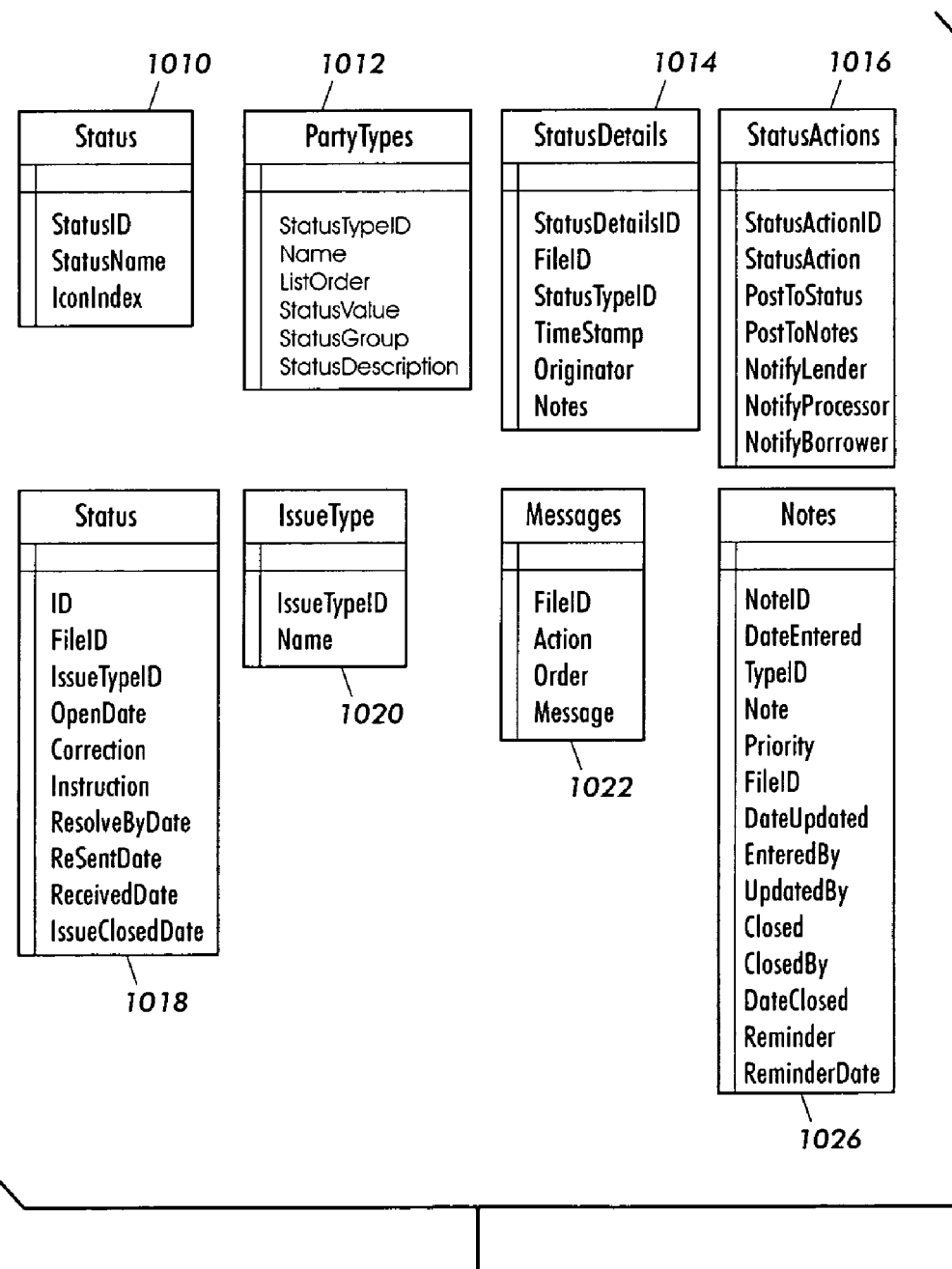
Figure 11:
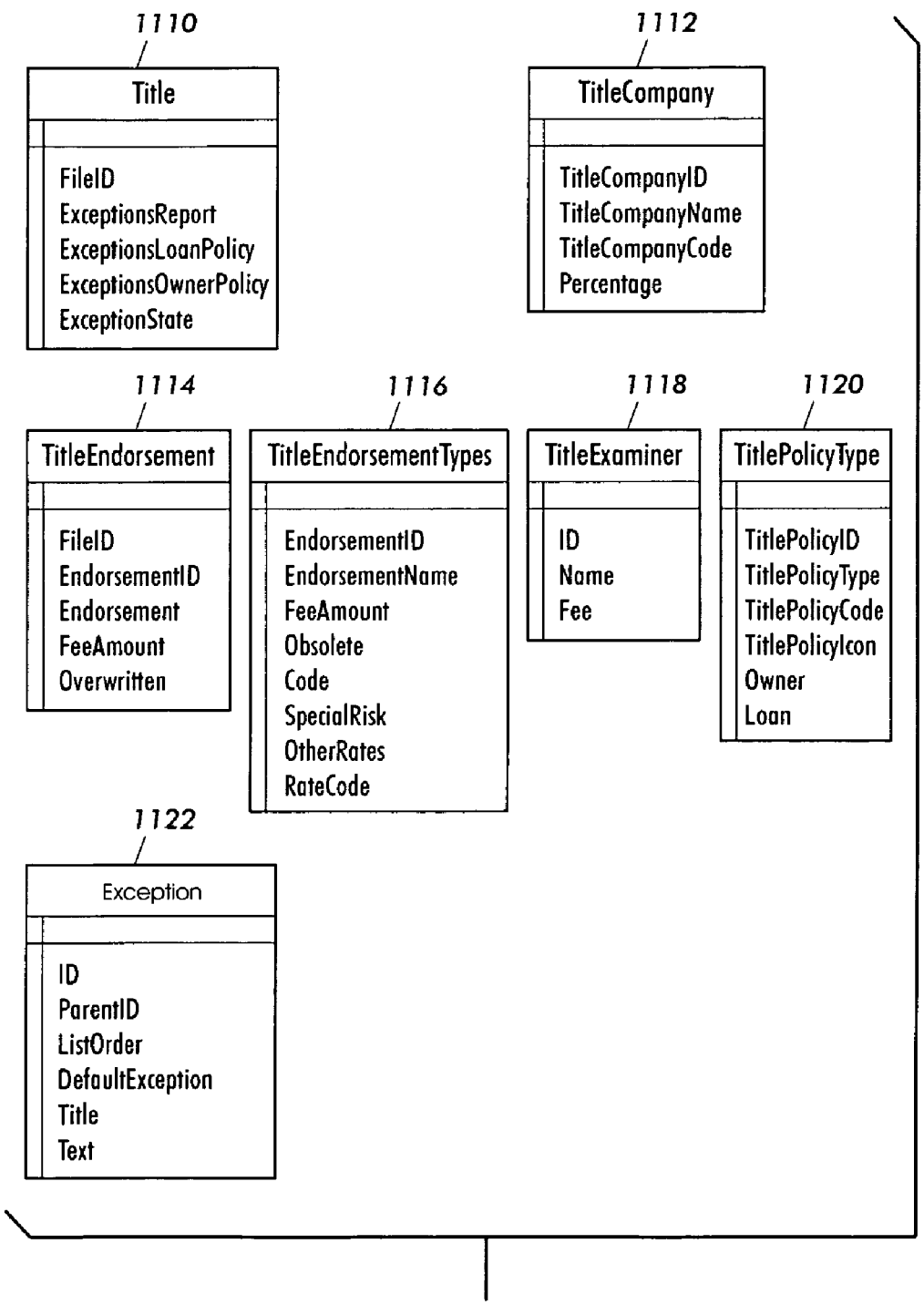
Figure 12:
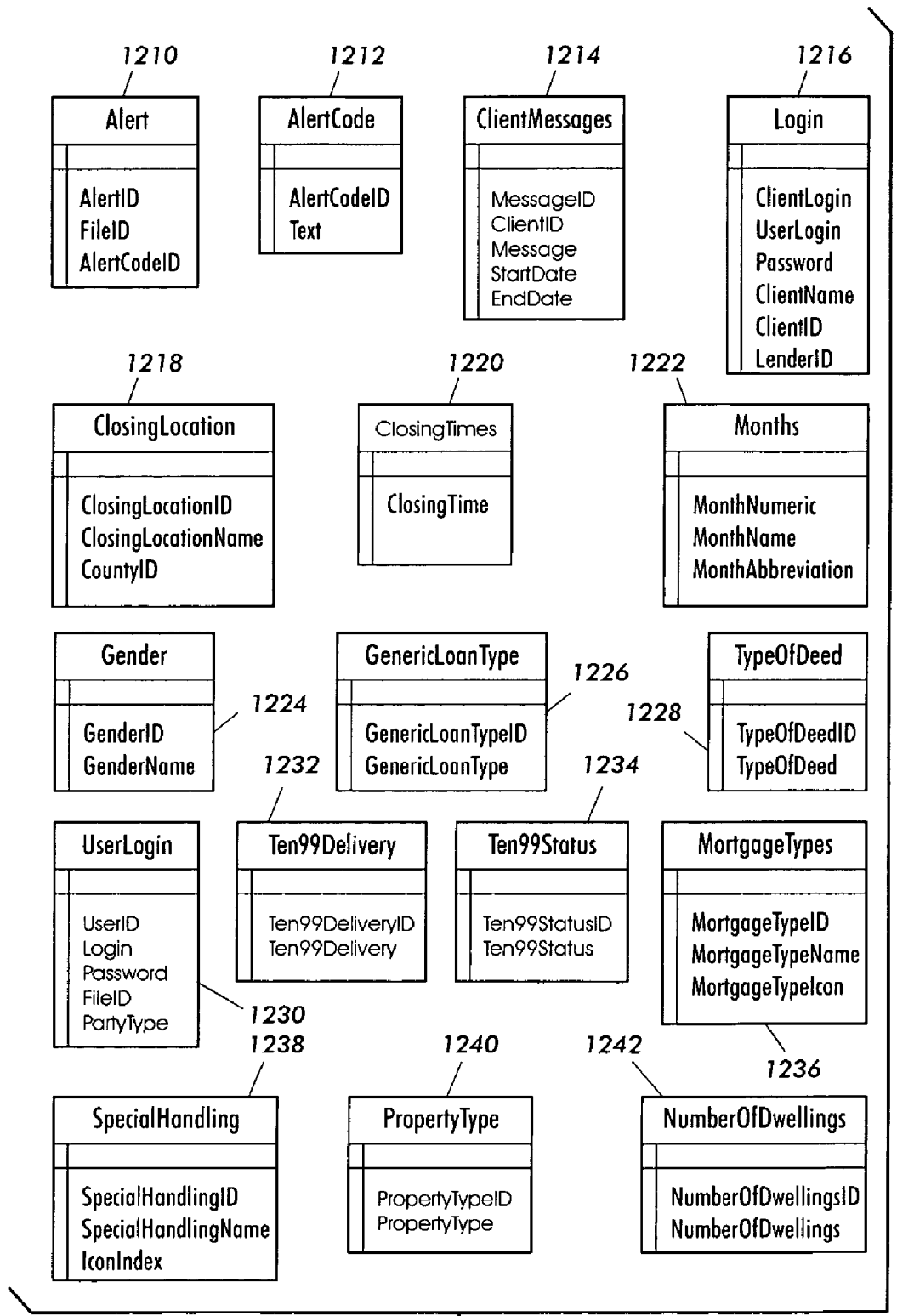
Figure 13:
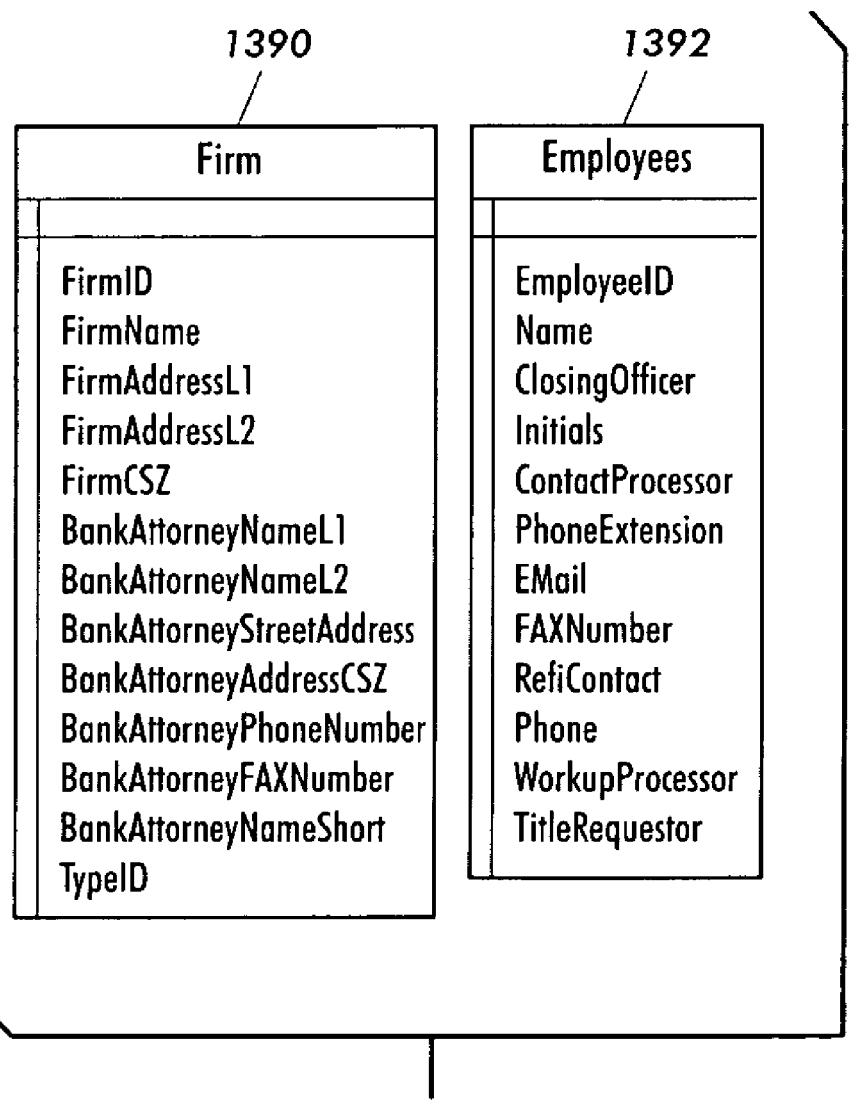
Figure 14:
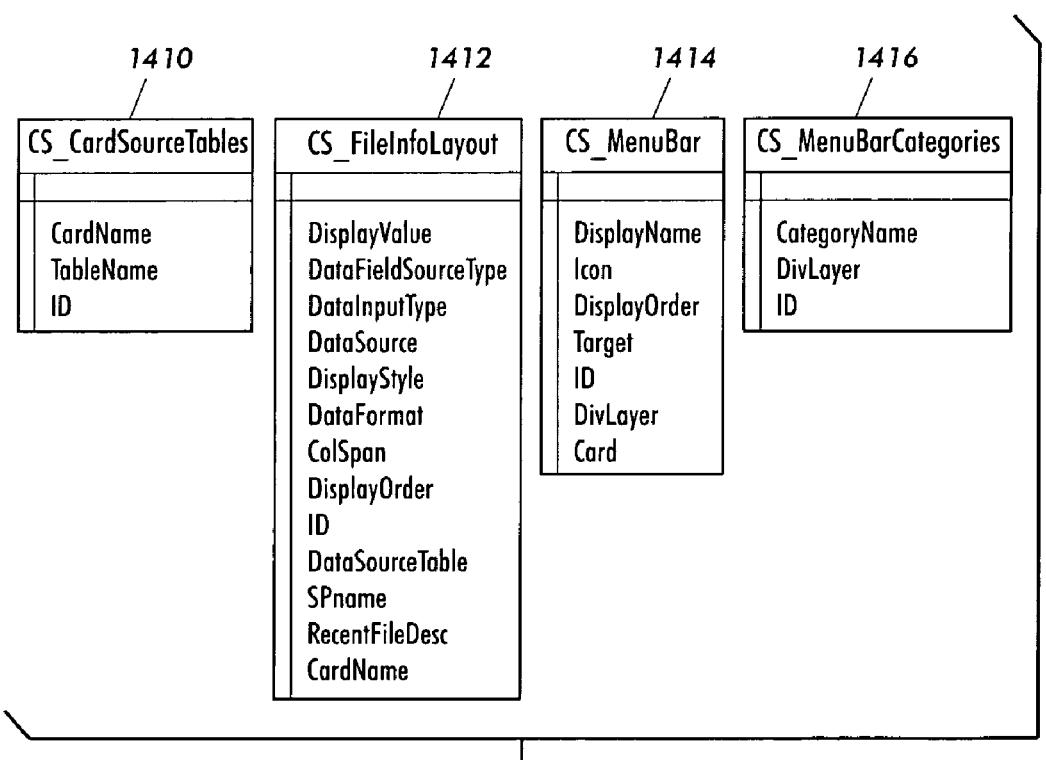

As will be appreciated from a brief review of the database schema figures, other tables are also included in the schema. In particular, tables of FIG. 7 are tables that contain data related to the completion and generation of HUD forms. Tables 810, 812 and 814, depicted in FIG. 8, illustrate data related to generation of the document packages (810, 812) and data in the Virtual File Folder™ (814). Tables 910-918, depicted in FIGS. 9A-9B, illustrate data related to the transaction Parties (910, 912) and data related to previous mortgages (914, 916, 918). Tables 1010-1026, depicted in FIG. 10, illustrate data related to status and status actions (1010-1016), data related to issues (1018, 1020), and data related to both user and system generated notes and processing history (1022, 1026). Tables 1110-1122, depicted in FIG. 11, illustrate data related to the generation of title reports and policies. Tables 1210-1242, depicted in FIG. 12, illustrate data relating to system generated alerts based on file data and rules (1210, 1212), data related to client specific messages (1214), data related to logging into the system (1216, 1230), data related to the scheduling and the closing calendar (1218, 1220), and data supporting the display of ID variables (1222-1228, 1232-1236, 1240, 1242). FIG. 13, including tables 1390 and 1392 include tables that reflect information related to the law firm or firms that may be implementing the eSys system, table 1390, and employees of that firm having access to the system or roles in the process, table 1392. The database tables of FIG. 14, tables 1410-1416, are for web presentation formatting. More specifically, the following is a partial list of the tables employed in an embodiment of the present invention: Alert 1210, AlertCode 1212, ARMType 420, ButtonGroup 518, ButtonGroupItem 520, ChkGrp 714, CityVillage 624, ClientMessages 1214, Closing 202, Closing2 203, ClosingLocation 1218, ClosingTimes 1220, CompletionEscrowAgentType, County 620, CS_CardSourceTables 1410, CS_FileInfoLayout 1412, CS_MenuBar 1414, CS_MenuBarCategories 1416, DocumentPackage 810, Employees 1392, EntityType 918, Exception 1122, Firm 1390, Gender 1224, GenericLoanType 1226, HUD1 310, HUD2 312, HUD2b 314, HUDDisb 316, HUDDropDownLists 716, HUDFormat 710, HUDFormatFormats 718, HUDFormatTypes 720, HUDInvestorRules 712, Investor 414, Issue 1018, IssueType 1020, Lender 412, LendersAgent 440, LoanType 418, Login 1216, MailingPO 628, Messages 1022, Months 1222, MortgageTypes 1236, Municipality 614, Notes 1026, NumberOfDwellings 1242, Party 910, PartyTypes 912, PaymentType, PrevMtg 914, PrevMtgAssignee 916, Program 410, PropertyType 1240, Recordation 430, RecordationType 432, Reports 438, SchoolDistrict 612, SpecialHandling 1238, State 626, Status 1010, StatusActions 1016, StatusDetails 1014, StatusType 1012, Tax 434, TaxType 436, Templates 812, Ten99Delivery 1232, Ten99Status 1234, Title 1110, TitleCompany 1112, TitleEndorsement 1114, TitleEndorsementTypes 1116, TitleExaminer 1118, TitlePolicyType 1120, Town 622, TypeOfDeed 1228, UserLogin 1230, VFF 814, ViewColumns 512, ViewFormatConditions 514, Views 510, and ViewSortKeys 516.

Figure 4A:
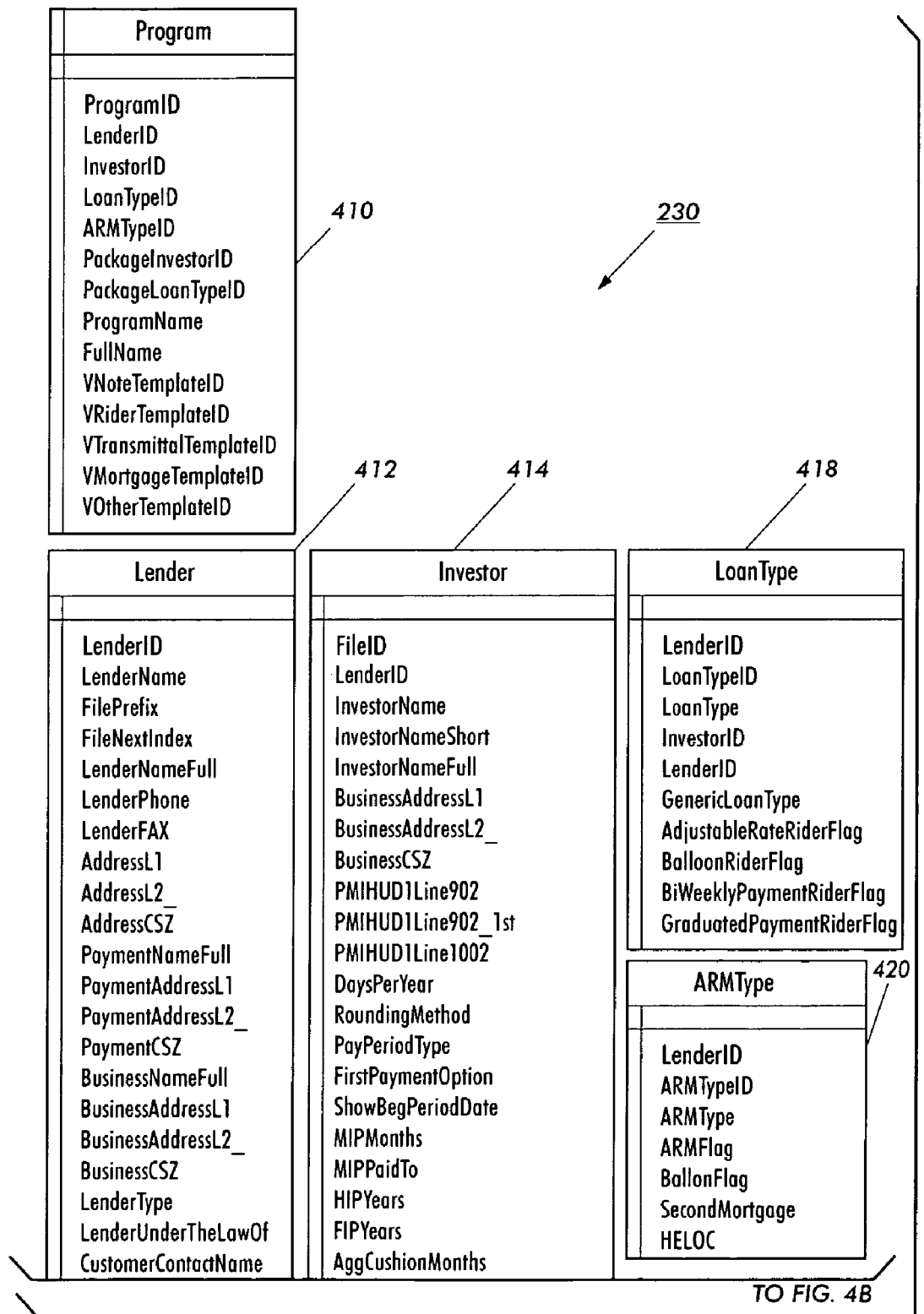
Figure 4C:
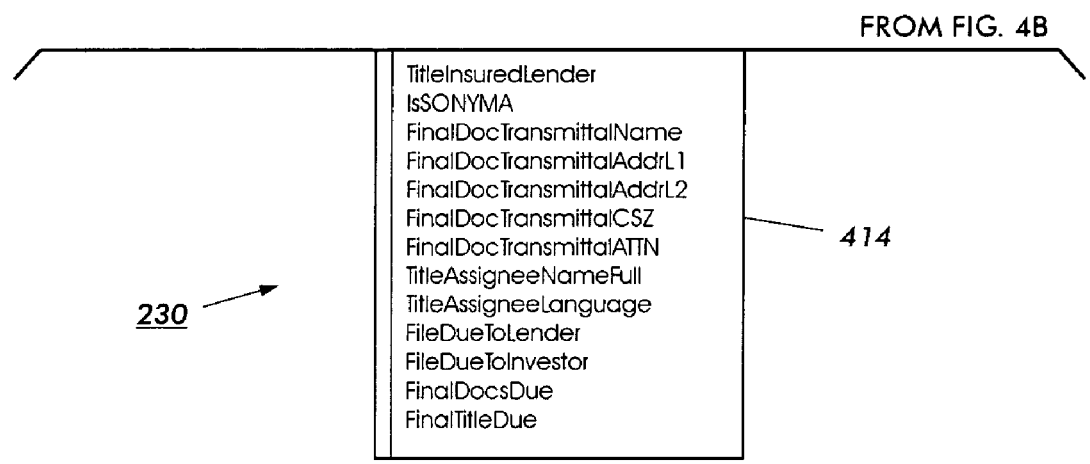
Figure 4D:
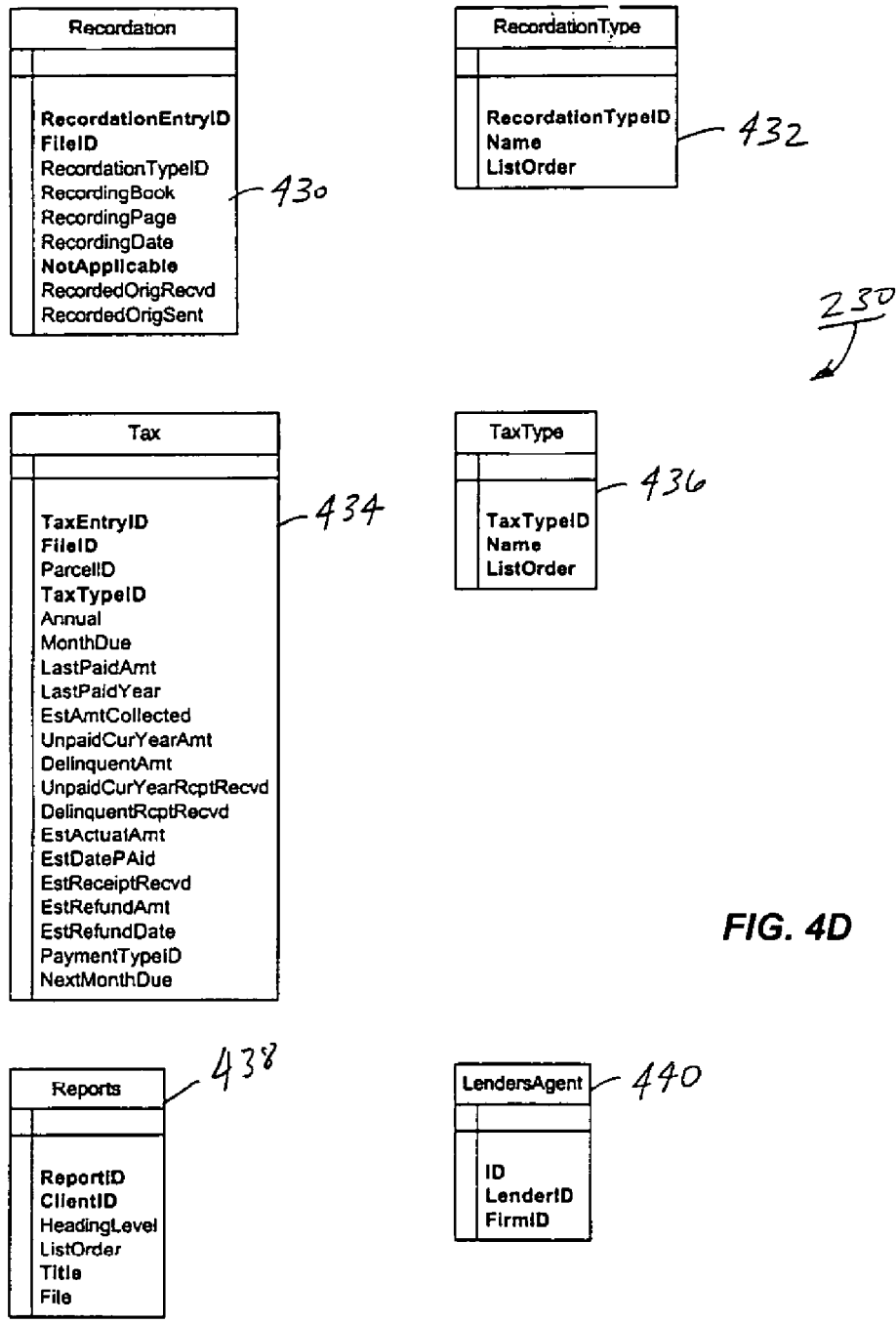
Figure 5:
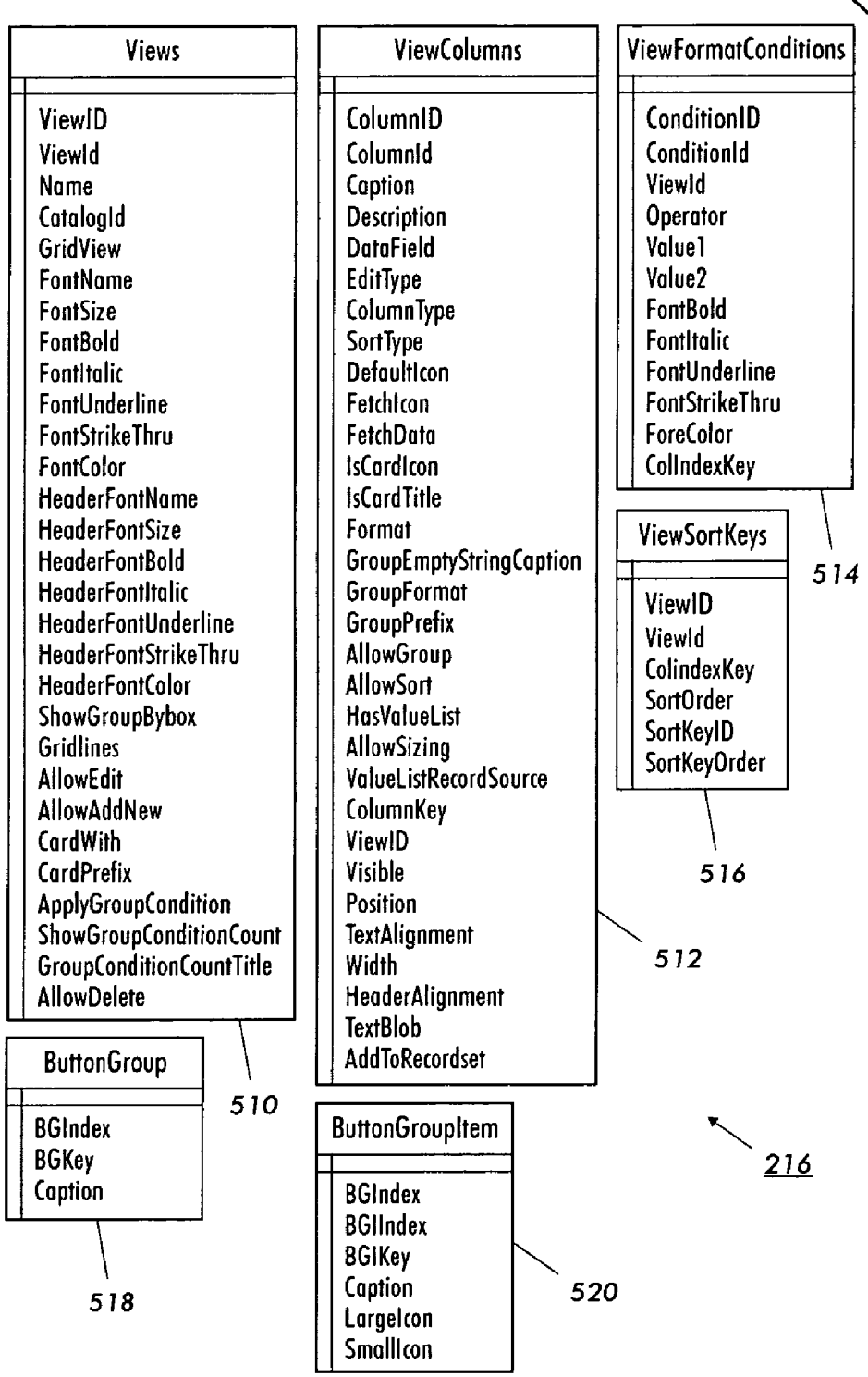

As the requirements change, the rules embedded within tables such as the tables in FIGS. 4A-4C can be easily changed so as to update the process control. An example of rules associated with a database table is table FIG. 4A-4B, Lender table 412, which includes data parameters specific to Lender requirements, for example the AddMonthForEstTaxes, which is used in conjunction with a Visual Basic algorithm contained in escrow.cls. Another example of rules associated with database tables are tables in FIG. 8 relating to document templates table 812 which includes data parameters such as StoredProcedureName and UsageCode, which associate stored procedures; for example, any stored procedure starting with "doc_" or starting with "uc_" that determine whether or not a document is required based on the rules contained in the associated usage code stored procedure and provide and manipulate data to merge with the document based on rules within the associated "doc_" stored procedure. The benefits include quick turn around in compliance and built-in quality control, with less time spent on the mundane, yet critical, task of determining what is basically required for each file, processors and closing officers will have more time to focus on the specifics of each file.

In an embodiment of the present invention, the user-interface and process control are programmed via visual-basic programming code, implemented on a Microsoft Windows-based platform. As will be described relative to FIGS. 15-51 the various features and functions of the user-interface screens are based upon Visual-Basic and similar interface programming techniques.

Integration with Network Fax and Print Services

In a preferred system any facsimile document received or sent relative to a transaction such as a real estate closing, or any document produced and printed, can be automatically captured and checked into a Virtual File Folder™. The Virtual File Folder™ will include the document as well as date/time information (and confirmation report for documents sent or printed). This will reduce the overhead in having to scan in hard copy files to the system, as well as eliminate the need for most of the copying now being done before and after closing. It will also enhance tracking of transmittals and receipts.

Integrated Modular Design

Because of the system's modular design, implementation may be accomplished in a phased manner. For example, as the lending department evolves and application development unfolds, application modules can be phased in. This flexibility will allow the system to be employed to address immediate needs first without having to wait for completion of development to deploy any one part of the software application or system.

Real Estate Closing Embodiment

Having described the general architecture of the present invention, the following description will provide a detailed discussion of the various functions and features incorporated within the system. The particular embodiment employed as an exemplary basis for the discussion is that of a real estate closing process. However, the system may also have applicability to residential construction lending situations as well as other alternative applications as briefly characterized herein.

As the various figures and description will illustrate, the system preferably includes Internet, client-server based access means, including Internet, Intranet and/or dedicated systems as previously described. Moreover, the various features of the eSys Mortgage Centerware™ system are incorporated in a plurality of interactive modules, including: eSys Process Management™; eSys Closing Agent™; eSys Title Agent™; eSys Post Closing™; and eSys Client Services™. The modules are preferably integrated to bring overall process management and connectivity to all processes, participants and data involved in a mortgage lending transaction.

In the embodiment described, eSys is designed to manage a process from inception through closure and follow-up tasks and issues and enable all parties involved to interact with and keep the process moving forward via controlled web based access to a file's Virtual File Folder™ (containing, for example, all file specific data, documents, notes, status and history) and client/type/status driven auto-notifications. One example is to manage the real estate closing process from origination through post-closing and enable, for example, Lender, Closing Coordinator, Post-Closing Coordinator, Closing Agent, Title Agent, Borrower, Borrower Attorney, Seller, Seller Attorney, Investor, Title Company, Document Preparation Service Provider, Electronic Document Service Provider (which may provide methods for obtaining, affixing and securing electronic signatures, management of electronically signed electronic documents, and transfer of ownership of executed electronic documents), Secondary Market Participants, Loan Servicers, Escrow Agents, County Recorders, Abstract Companies and any other parties which may be involved in the origination, pre-closing preparation process, closing/recording process, or post-closing process throughout the life of the loan, to potentially receive auto-notifications, auto-reporting and participate directly in the eSys process. It should be noted that wherever manual data extraction and input is occurring throughout the eSys process, the preferred method would be a direct interface from the source wherever possible (i.e. origination data directly from Origination software systems via extensible markup language (XML) or some other electronic data exchange/sharing method to avoid redundant entry issues).

A system implementing the functionality of the present invention may employ one or more of the following methodologies:

Business Rules—eSys administrative tables and fields combine to provide the system with knowledge of all of the customer, lender, investor, title company, program, closing agent, title agent, and municipality-based legal and business requirements of each transaction. These rules enable the system to present transaction specific input screens, data fields, documents, document packages, data calculations and auto-alerts—all of which contribute to eSys Intelligent Agent Processing.

Process Statuses—these are event-driven transaction milestones that drive the process from origination through post-closing and contribute to management and improved control of the overall transaction process.

Auto Communications—status and event driven auto-notifications, as employed in an aspect of the present invention, keep all parties to a transaction informed and involved in moving the transaction forward, and provide access to the transaction's documents, data and history, via hyperlinks to a Virtual File Folder™ on eSys Client Services.

Virtual File Folder™—in a preferred embodiment, the system provides for electronic storage and access to all transaction data, notes, status, history and documents. This includes information from receipt of origination data and documents through post-closing and follow-up tasks and reporting, whether to manually entered or system created. Furthermore, the virtual file capability preferably includes tracking of potential back door access to a transaction's electronic documents stored in an electronic document storage and maintenance facility, the transaction's origination history, and the post-closing and Secondary Market's window into the entire transaction's current status and history.

Client Services—aspects of the present invention may employ a web interface designed to give participants access to an individual transaction's Virtual File Folder™ to review and interact with the file, as prescribed by the client, during pre-closing and post-closing processing. The Client Services functionality also delivers to the client on-line, real time calendars and client customized reporting, providing the auto-tracking required to effectively manage overall operations.

The above methodologies, and associated functionality, will now be described in more detail with respect to a particular example of the use of the eSys Mortgage Centerware™ system to support a real estate transaction. It is also important to note that, in accordance with a preferred design, files or documents that are part of the transaction may be processed as traditional paper based, fully electronic or hybrid electronic documents (where recordation is not being done electronically).

Examples of pre-closing processing statuses include:
File Created;
File Opened;
Title Report Requested;
Preliminary Docs Posted;
Okd to Close;
Scheduled Tentative;
Scheduled Confirmed;
Package Requested;
Package Ready;
Funding Amount Okd;
Ready to Close;
Closed Normal;
Recording;
Closing Recorded;
Post Title Policy; and
Final Title Posted.

Having received a request from a customer, the system assumes that a lender has issued or is imminently going to issue a commitment and is ready to begin the mortgage/closing process by creating the file in eSys.

Initially, the law firm client (Lender, Investor, Closing Coordinator) creates a new file in eSys. The client would start by going to eSys Client Services, a web site which would be accessed via a customer branded link on the Lender site or a via a third party participant (for example, a closing coordinator, bank attorney or document production service) labeled link or via a direct eSys labeled web address.

The various features and functions of the web interface for eSys Client Services may be further appreciated through the software code included in the WebDocumentation directory in the Computer Program Listing Appendix incorporated herein. Such code, when combined with various images, that are automatically incorporated therein, create, update and implement a web-based interface for users of the system. The WebDocumentation directory includes the following code modules, which are briefly described:

addNoteWindow.asp—contains code for the pop up add note window, stores user input note to the database;

ClientServicesCalMonth.asp—contains layout and includes necessary functions for calendar view;

ClientServicesCreateFile.asp—contains layout and includes necessary functions for file creation view;

ClientServicesEPortfolio.asp—contains layout and includes necessary functions for ePortfolio™ view;

ClientServicesFindFile.asp—contains layout and includes necessary functions for findfile view;

ClientServicesForms.asp—contains layout and includes necessary functions for forms view;

ClientServicesLogin.asp—input screen for gathering user login data;

ClientServicesReports.asp—contains layout and includes necessary functions for reports view;

ClientServicesViewFile.asp—contains layout and includes necessary functions for viewfile view;

ClientServicesWelcome.asp—contains layout and includes necessary functions for loginmessages view;

global.asa—global web parameters and database connection information;

global.css—style and formatting classes;

helpWindow.asp—contains code for the pop up help window;

logout.asp—cleans up session and logs user out;

redirector.asp—site navigation code, redirects to appropriate views, manages session timeout, manages session variables;

storeFileData.asp—sends changes to data back to the database for storage;

storeIssueData.asp—specialized storage procedures for grid style screens;

storeTransmittalData.asp—specialized storage procedures for transmittal screen; and verifyLogin.asp—checks user login information and allows access to site.

The WebDocumentation directory further includes other code modules, which may be briefly described as follows:

adojavas.inc—a standard communication library;

callSP.asp—code to call a stored procedure;

controls.htm—code that displays the control buttons on top of screen;

conversionFunctions.asp—methods for data manipulation;

displayForm.asp—code to display form list and selected form;

displayReport.asp—code to display report list and selected report;

divResizer.htm—code that controls the size of content on the screen to fit window size;

generateArchivedDocs.asp—code that displays a list of documents and links to them;

generateCalendarMonth.asp—calendar creation code that sets up a monthly calendar and gathers basic information to display on certain dates;

generateError.htm—code that displays a caught exception error message;

generateFileData.asp—code that creates all of the information fields and labels associated with the data in a file;

generateFileStatus.asp—code that lists the current progress of a file;

generateIssues.asp—code that creates a grid style information display;

generateNotes.asp—code that lists the notes associated with a file;

generateTransmittal.asp—code that creates a grid style information display;

Header.htm—code to display the header on top of the page;

Menubar.htm—code to generate and display the menu on the left of the page; and recentFiles.htm—code to manage and display the recent files list, and current file open.

The client is initially presented with a login screen (not shown) that prompts for a client name, user name and password to validate/authenticate the user in order to gain controlled access to the site. In one embodiment, the client determines what data set is visible and can control customized views, depending upon the user name at login. Furthermore, the user name field allows eSys to track actions by user and control access to available views of the data set.

Figure 15:
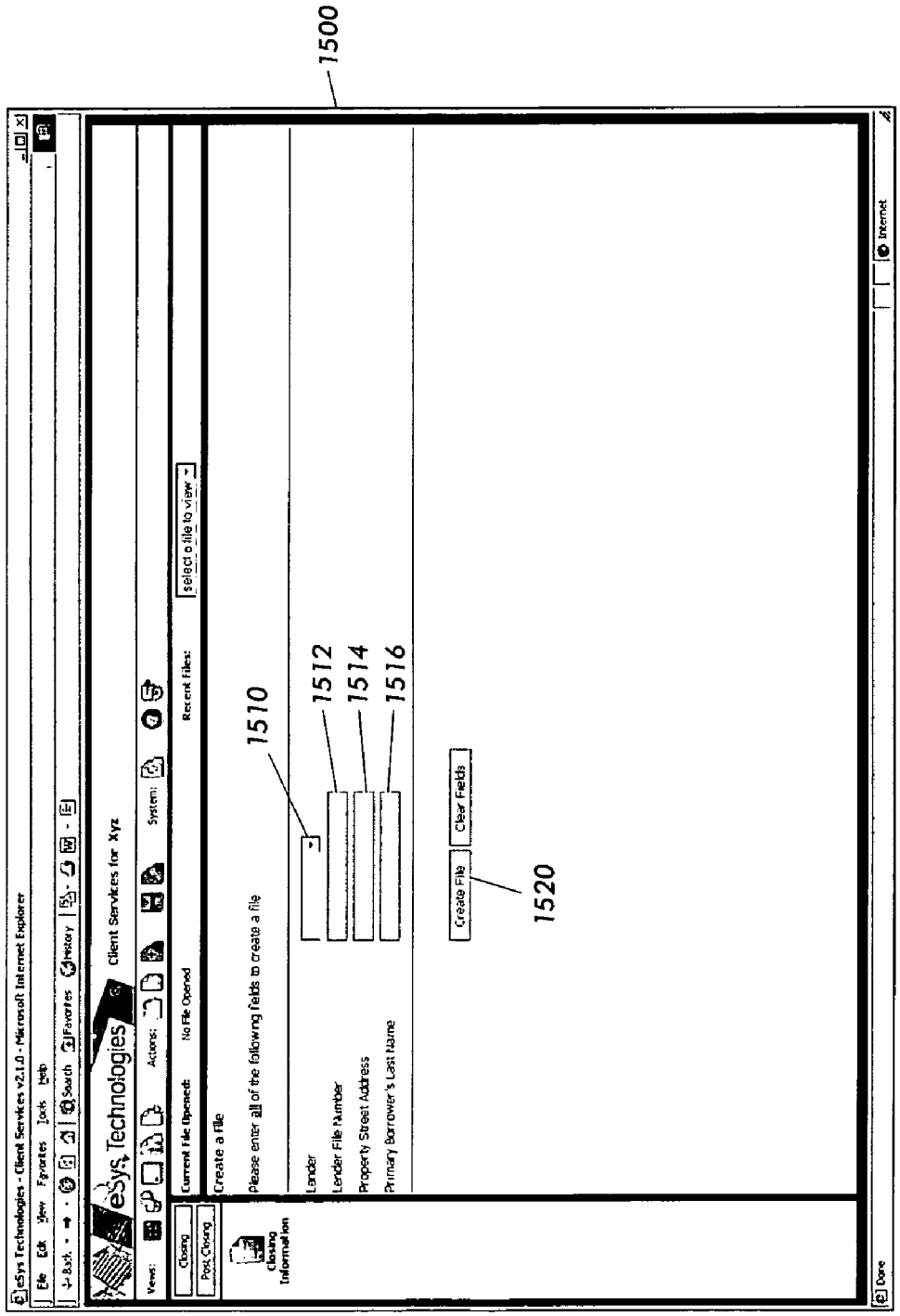

After login, the client user is presented with the Create a File screen 1500 as depicted in FIG. 15. The client enters some basic file specific information into the screen fields to create the file. An example of the fields may include the following: Lender 1510, which may be selected from a drop-down menu as illustrated, Lender File Number 1512, Property Street Address 1514, and Primary Borrower's Last Name 1516. Notably, the screen or data to be entered may be customized per client requirements, and depending upon the type of transaction (e.g., real estate, commercial real estate, merger, acquisition, etc. Once data has been entered, the user then selects the Create File button 1520, which initiates a stored procedure (CreateFile) that processes the data, creates a database record and gives a Status "File Created."

In an alternative embodiment, the client may start by going to electronic document management and storage facility provider screens, logging in and creating a file. Upon entering sufficient information into that system the system triggers an auto-notification from that system to the eSys system that a file has been created in that system and needs to be automatically created in eSys. eSys automatically creates the file, enters the information supplied, and sets the status to File Created as described above. Another alternative contemplates a client origination system that supplies enough information directly into the eSys system sufficient to trigger auto-creation of the file in eSys.

In yet a further alternative origination process, a client would send electronically (fax, email or ftp) or deliver a paper commitment package to the appropriate party which will be referred to as the Processor throughout this description (for example, a closing coordinator, bank attorney or document production service). The Processor would extract the necessary information to create the file in eSys as described above using the login and Create a File screens.

Figure 19:
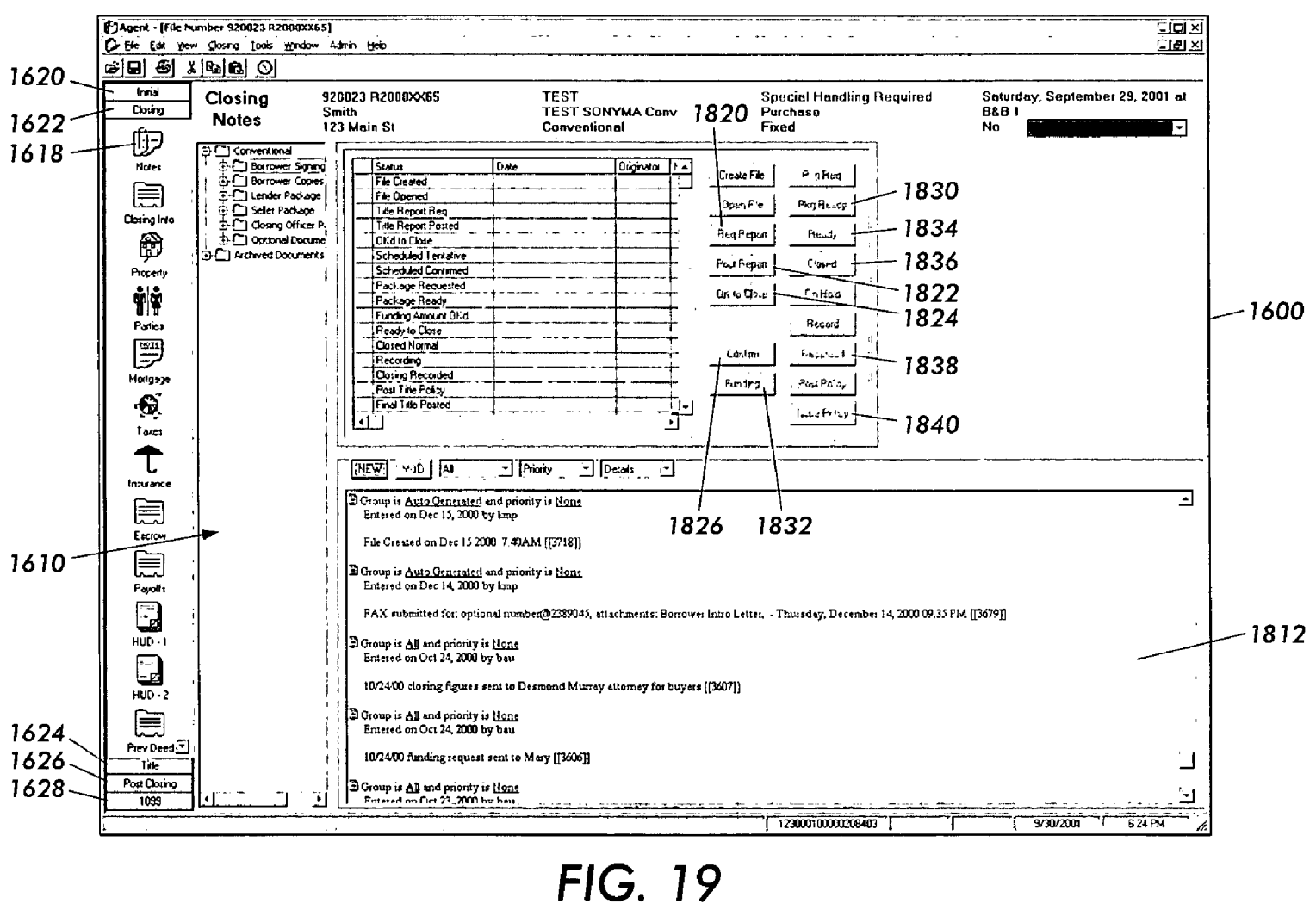

An auto-notification message, containing file identifying information such as the system generated InHouseFileNumber, is generated by eSys and sent to the client profile specified parties. The system preferably generates such notifications using intelligent agent reporting, where Structured Query Language (SQL) driven reports are automatically generated and disbursed appropriately via e-mail, fax or voice response. Specified parties may include the processor responsible for Opening the file in eSys. The auto-notification message serves as notice that a new file has been created and origination documents are on their way. Additionally eSys records the creation and email notice date, time originator, and recipient via eSys auto-generated notation in the file's notes. An example of such notation is seen at FIG. 19. It should be noted eSys provides for automatic hierarchical delivery of auto-communications based on availability of party data and auto-notation of inability to deliver or failure to do so. Such auto-notification can be in the form of an email or fax or potentially any type of electronic communication, for example an automated voice message. For the remainder of this process description, the auto-notification will be described as an email.

The file is now created in eSys and the appropriate parties have been notified. The client needs to forward origination documents to the processor by email, fax, messenger, posting to the eSys Virtual File Folder™ via eSys Client Services, or notice of their location should they reside in an electronic document storage management facility.

Subsequently, the Processor receives email data and origination documents or pointers to them via the File Created auto-email and proceeds to open the file in eSys. If the file was auto-created by eSys after a creation notification email sent to eSys by an external electronic document storage and management facility, eSys will automatically connect to the third party system and retrieve all relevant transaction data when the Processor goes into the file to begin the File Open process. Alternatively, the Processor scans or retrieves origination documents into the eSys Virtual File Folder™.

Figure 16:
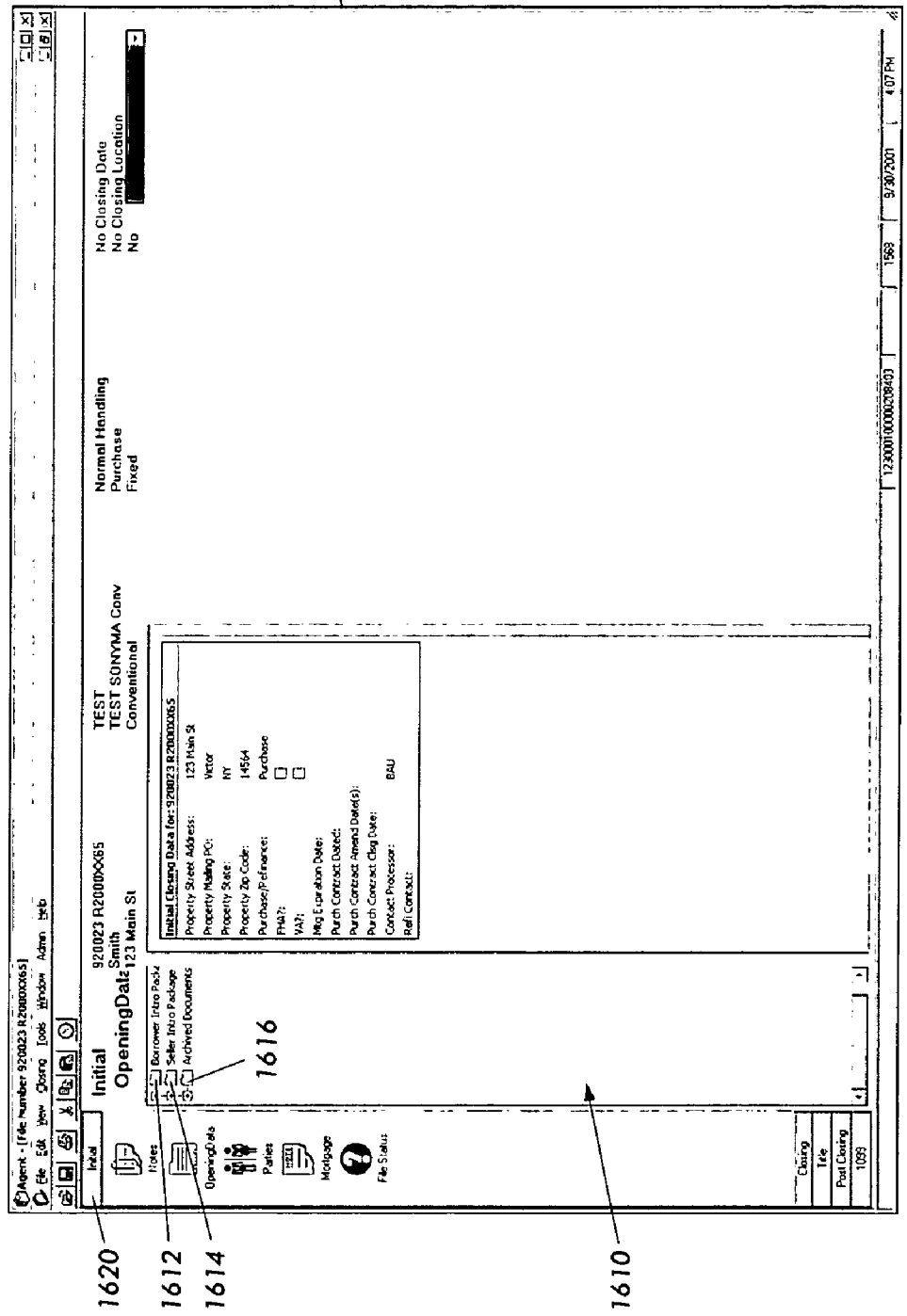

As depicted, for example, in FIG. 16, the eSys interface is a Windows™ or browser-based interface. In the interface screen 1600 the eSys Virtual File Folder™ is visible in the Document Tree region 1610 which is a dynamic rules driven presentation broken down into packages, for example, under the Initial processing area 1620, the packages of the Document Tree are Borrower Intro Package 1612, Seller Intro Package 1614 and Archived Documents 1616. If the file is a refinance, no documents will appear in the Seller Intro Package because they would not be applicable. All documents appearing in any package are in order and will produce the required number of copies per client, lender, investor and legal requirements, pursuant to program type rules. The Archived Documents package 1616 is a collection of documents which are eSys generated and automatically posted to the eSys Virtual File Folder™, or were received electronically and were posted to the eSys Virtual File Folder™ as described above, or were received in paper form and were scanned into the eSys Virtual File Folder™. They are typically stored in the Virtual File Folder™ as .PDF or .TIF or .MAX files, but could be stored and viewed from within eSys or over the web via eSys Client Services in any number of file or image formats.

As depicted in FIG. 16, the Processor extracts data from origination, and enters initial file data into eSys Initial Data input screens which are customizable to client requirements and dynamic in presentation based on client, legal, lender, investor, program, title company, closing agent, title agent and municipality business rules. Examples of such screens are FIG. 16, where Opening Data includes enough basic information to identify the file in an introductory correspondence and to determine what introductory materials are required per client, loan type requirements. For example, if it's a purchase, there will be introductory materials supplied to both a borrower and a seller; if it's an FHA loan, there will be FHA documents included in introductory correspondence which would not be included if it were not an FHA, etc.

Figure 17:
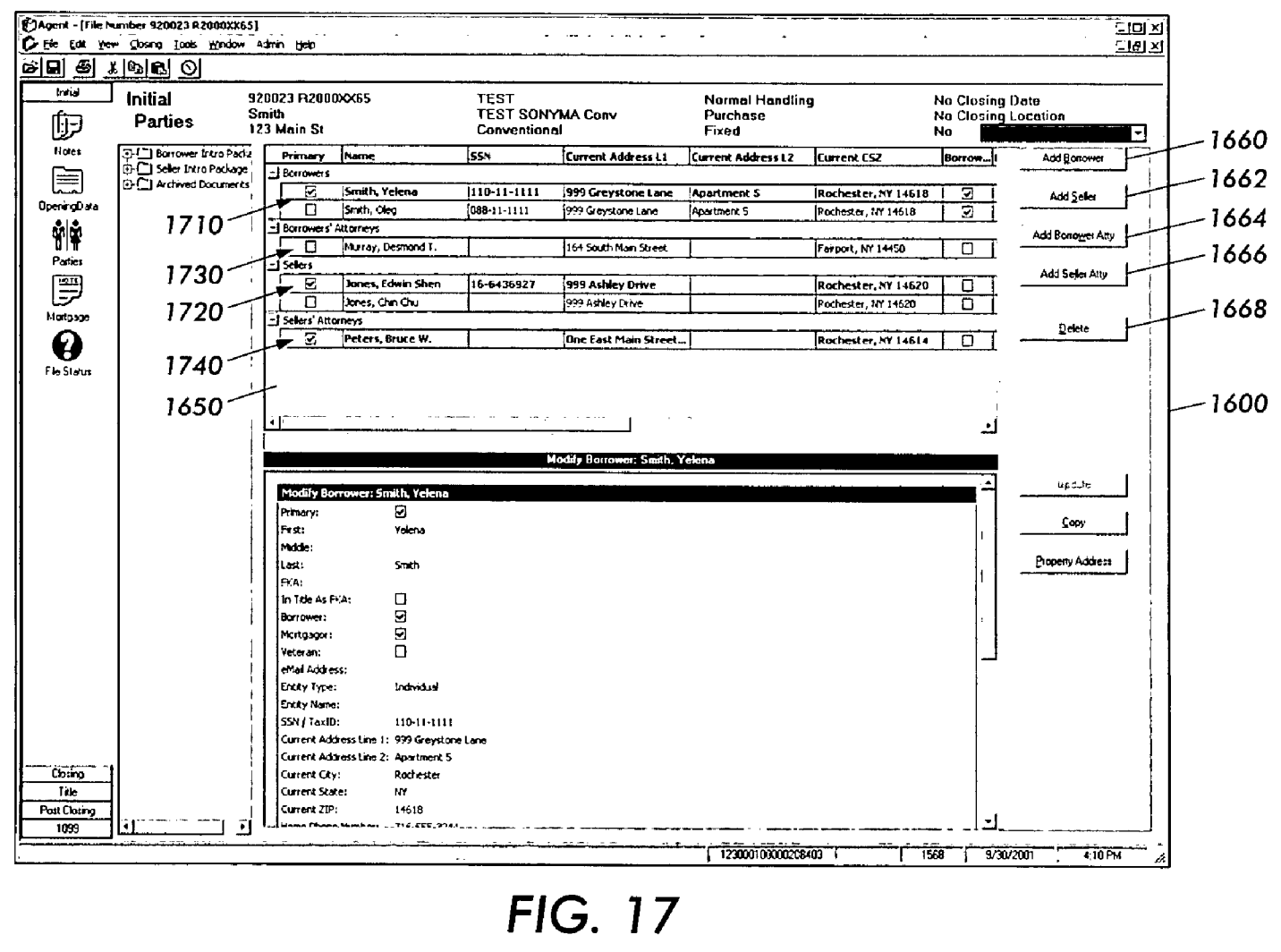

Referring next to FIG. 17, there are depicted aspects of the interface screen 1600, where details about the transaction parties may be entered into Borrower fields 1710, Seller Fields 1720, Buyer's Attorney Fields 1730 and Seller's Attorney Fields 1740. In the parties entry stage, as depicted in partial views of FIG. 17, an unlimited number of borrowers, sellers, borrower attorneys and seller attorneys can be entered by clicking on the associated buttons 1660-1666, with detail and personal information as required per client, loan type and process. As depicted in FIG. 17, the various fields may be moved about within scrollable window region 1650 in order to allow a user to view/update particular details of the various fields.

Figure 18A:
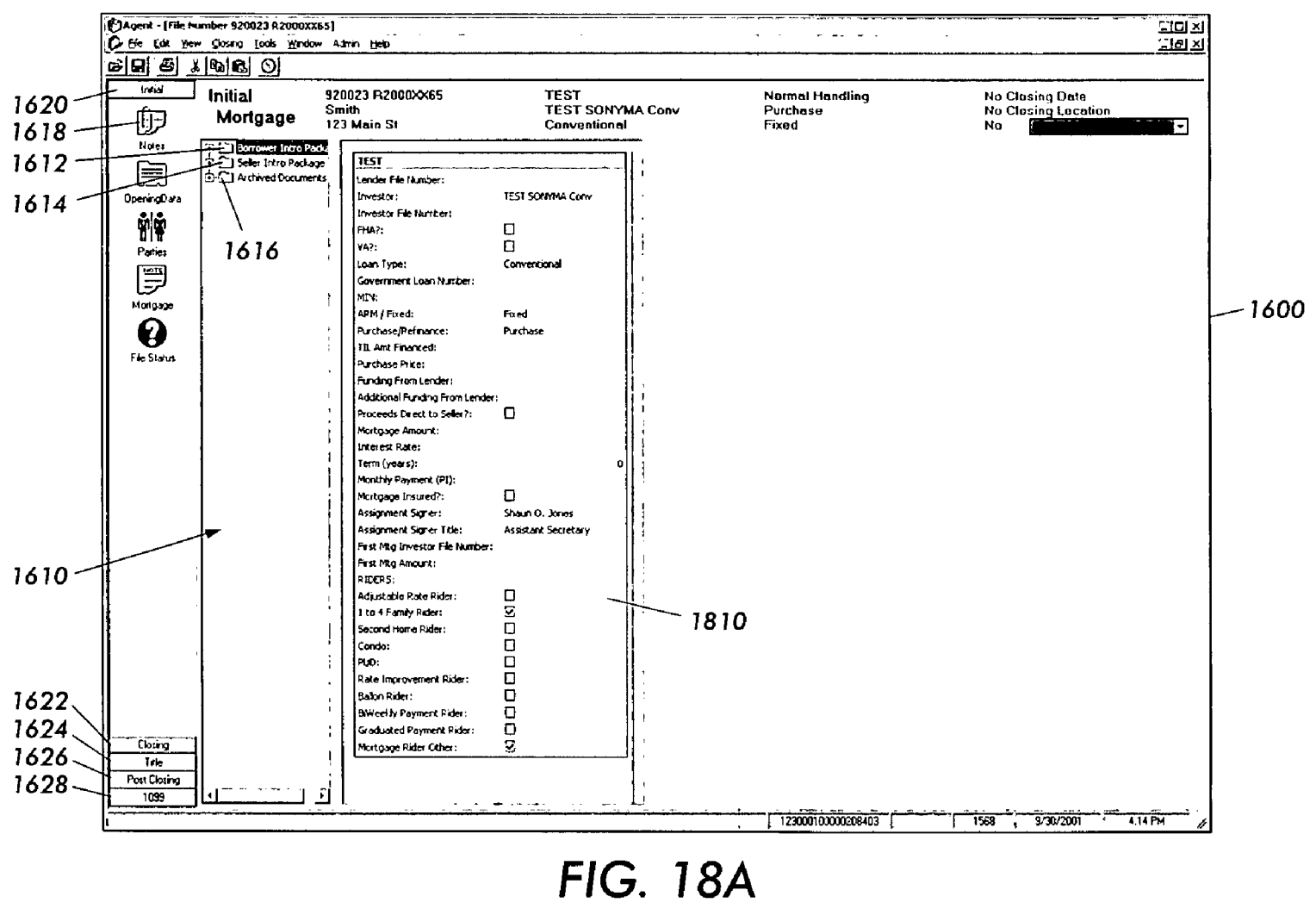
Figure 18B:
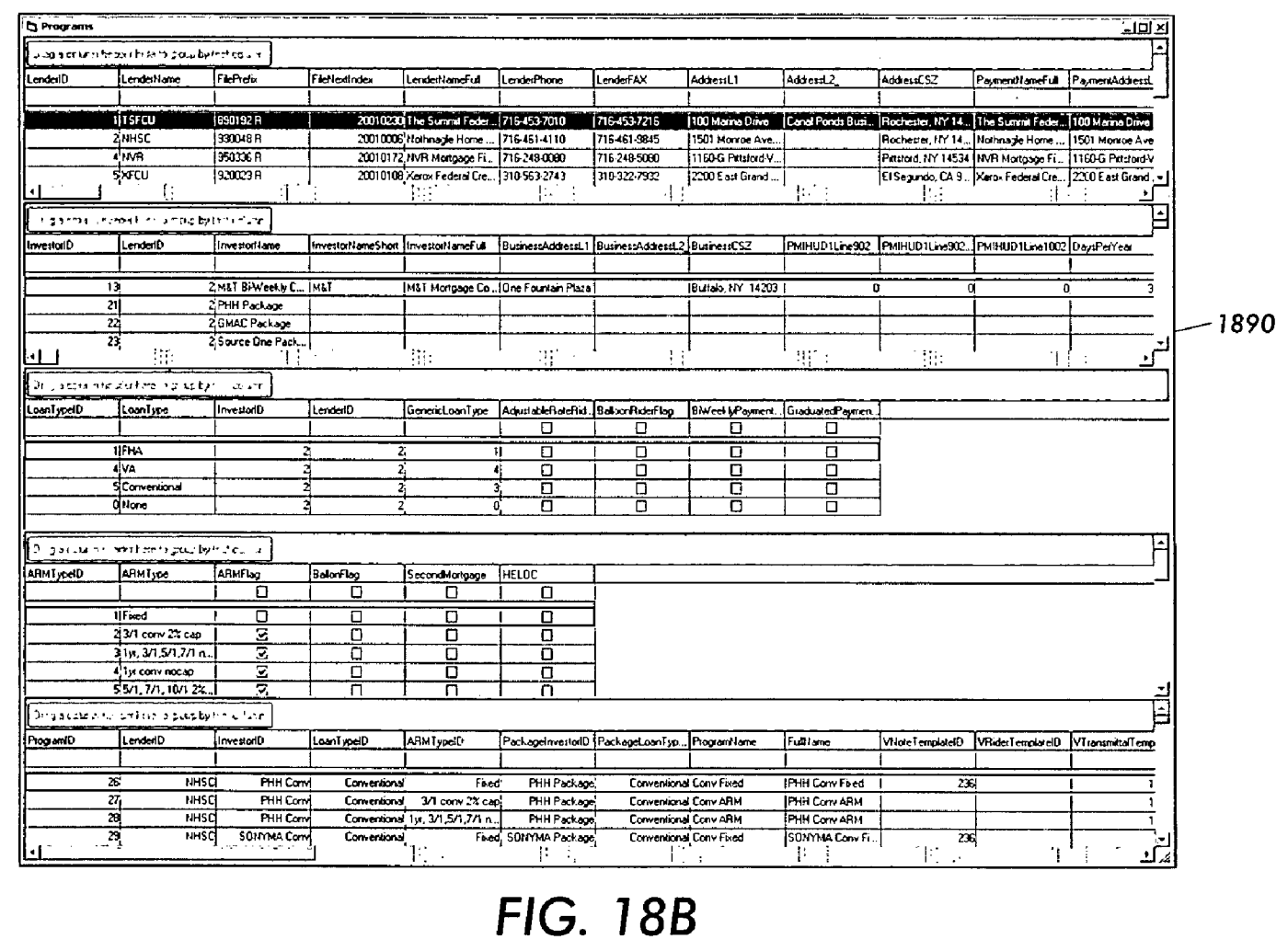

As depicted in FIG. 18A, card region 1810 of screen 1600 is where mortgage details are collected. Some fields are entered by the Processor or could be imported from an origination system, for example the Monthly PI Amount, the mortgage Term in years, the Purchase Price, etc. Some fields exemplify Intelligent Agent Processing™ and are governed by the Program table illustrated in FIG. 18B. For example, once the user selects the Lender, the user is then able to select the Investor from a list of available Investors for that Lender—as determined by the Program table. Similarly, the Loan Type, and the ARM type, may also be selected from the available types as defined by the Program table for that Lender/Investor. For example some type of adjustable or fixed, as determined by the Program table for the Lender/Investor/LoanType. Additionally on the Mortgage screen depicted in FIG. 18A, there is a listing of Riders at the bottom of region 1810. These riders are selected based on data input throughout eSys. Briefly referring to FIG. 18B, the Program table, administered via Program Table Maintenance screen 1890 allow the customization of the system, wherein a particular loan program may be established and/or modified by manipulation (e.g., dragging) of the program entries depicted.

Also available to the user, via a selection of the Notes icon 1618 in the Initial processing bar 1620, is a Notes/Status display as depicted in FIG. 19. In the scrollable Notes display window 1812 all file notes (system auto-generated and user input) are visible, sortable by category (e.g., Initial, Closing, Title, Post Closing) and preferably color-coded as to source and priority. The Notes are auto-dated and auto-identified by input user or source and can display in detail and summary views. For example, if a Processor clicks on the Open File button and notification is automatically sent out to appropriate parties, an auto-notation is also made to the file Notes by eSys, wherein the system automatically logs the event, date and time, as well as the Processor who opened the file. (File Status is now "File Opened") and auto-notifications and/or auto-reports are generated by eSys as specified by the client profile.

Figure 20:
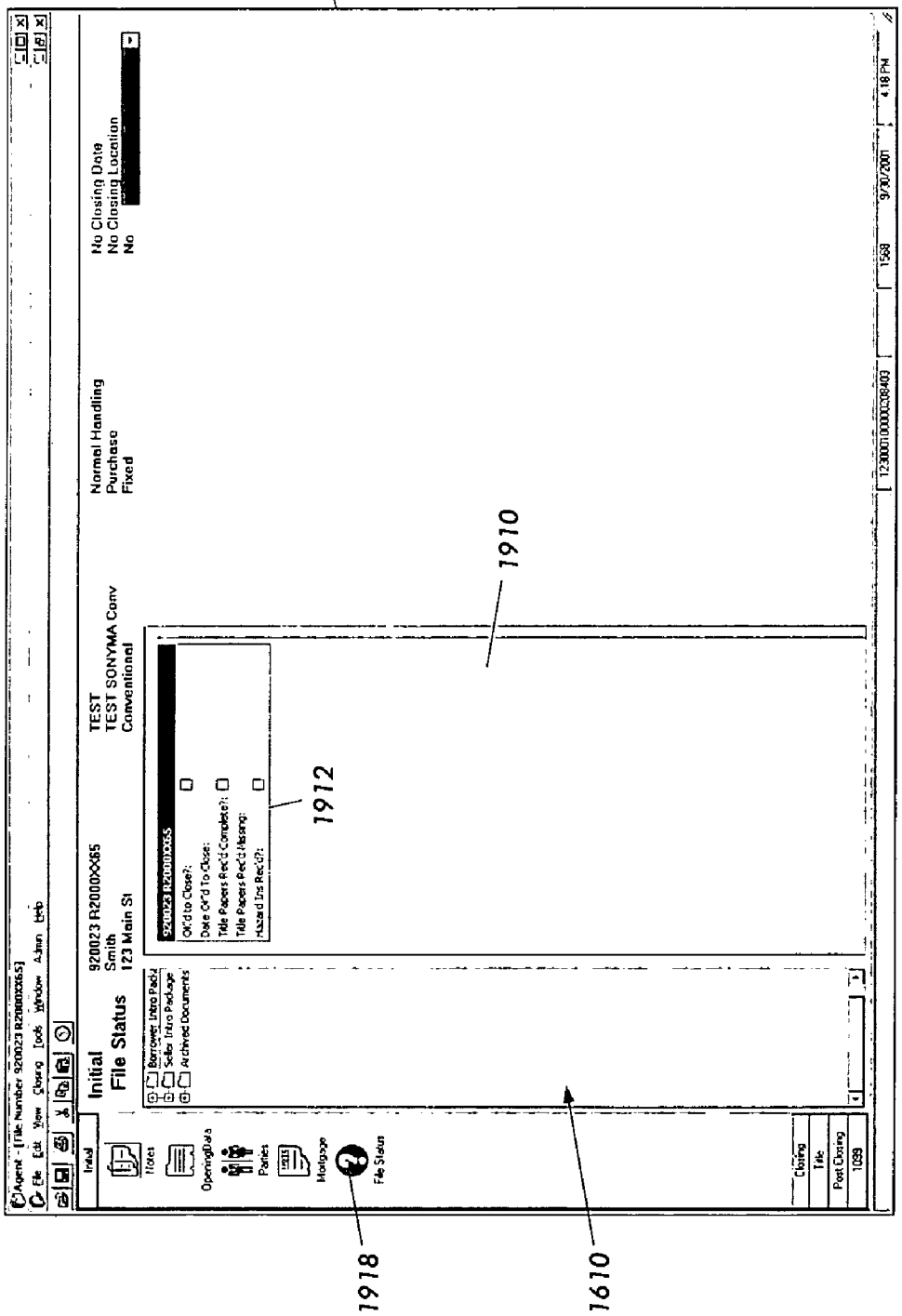

Referring briefly to FIG. 20, in a similar fashion, a user selecting the File Status icon 1918 would be presented with a status window 1910, wherein the current status of the file/transaction would be depicted for review in the form of card 1912. Again, the window may be a scrollable window using conventional sliding-bar or similar controls to allow a user to view a display area that may be larger than the window itself.

With respect to the auto-notification function, for example, the Lender gets a notice that the file has been received and that the file status is Open. The Borrower/Attorney, Seller/Attorney also receive email intro letters detailing that the Closing Agent has received commitment and what the requirements of the respective parties are to bring closure to the transaction. Subsequent to the parties receiving notices and supplying requested data and documents to the Processor, the Processor receives documents and info, scans the documents so that they may be stored in the Virtual File Folder™. The Processor then extracts data and enters the data into eSys.

Another step in the process of a real estate transaction is that of requesting a title report for the property being transferred. The Processor clicks on the Request Report button, (FIG. 19, button 1820 "Req Report") which automatically sends a title request to the appropriate party as specified in the Client Profile, for example, the Title Agent. As a result of the step of requesting a report, the File Status is automatically advanced to "Title Report Requested" and auto-notifications of file status are delivered pursuant to the Client Profile instructions. As previously described, auto-notations would also be made to the file Notes.

Figure 21:
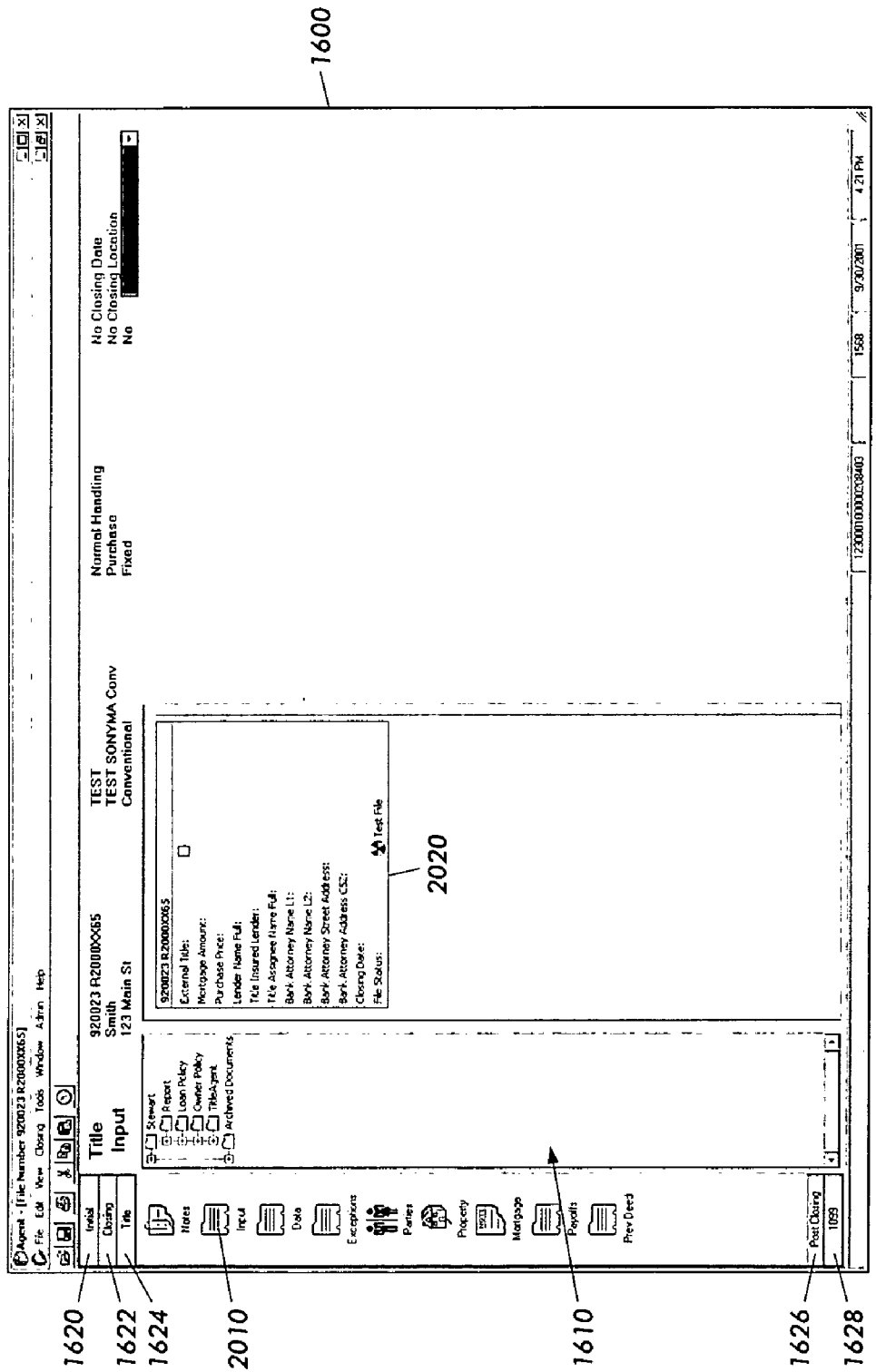

In a subsequent process step, the Title Agent receives the automated email notice of the Title Request including a hyperlink to the file in eSys and proceeds to either retrieve the data and documentation necessary to prepare a title report in another system or prepares a title report within eSys. For purposes of this process description, title will be prepared in eSys. As illustrated by FIG. 21, information relating to the processing of the title may be displayed and entered as a result of a user selecting Title bar 1624 so as to display the various icons therebeneath. A user subsequently selecting Input icon 2010 would be presented with a screen that includes a title data window 2020 next to document tree region 1610. As illustrated, title data corresponding to the various fields of the tables in FIG. 11, and other tables, may be displayed for user review and/or editing. The Title Agent then reviews the Virtual File Folder™ and its stored information, as depicted for example in FIG. 22, and prepares a preliminary title report using existing documentation, data and data derivatives already collected in eSys. In response to selection of Data icon 2012, a Title Data window 2030 is displayed, along with an endorsement window 2040. Next, the Title Agent enters additional information into eSys Title input screens. It will be appreciated by those skilled in the development of such systems that such interface screens are customizable to client requirements and are dynamic in presentation based on client, legal, lender, investor, program, title company, program, closing agent, title agent and municipality business rules.

Figure 22:
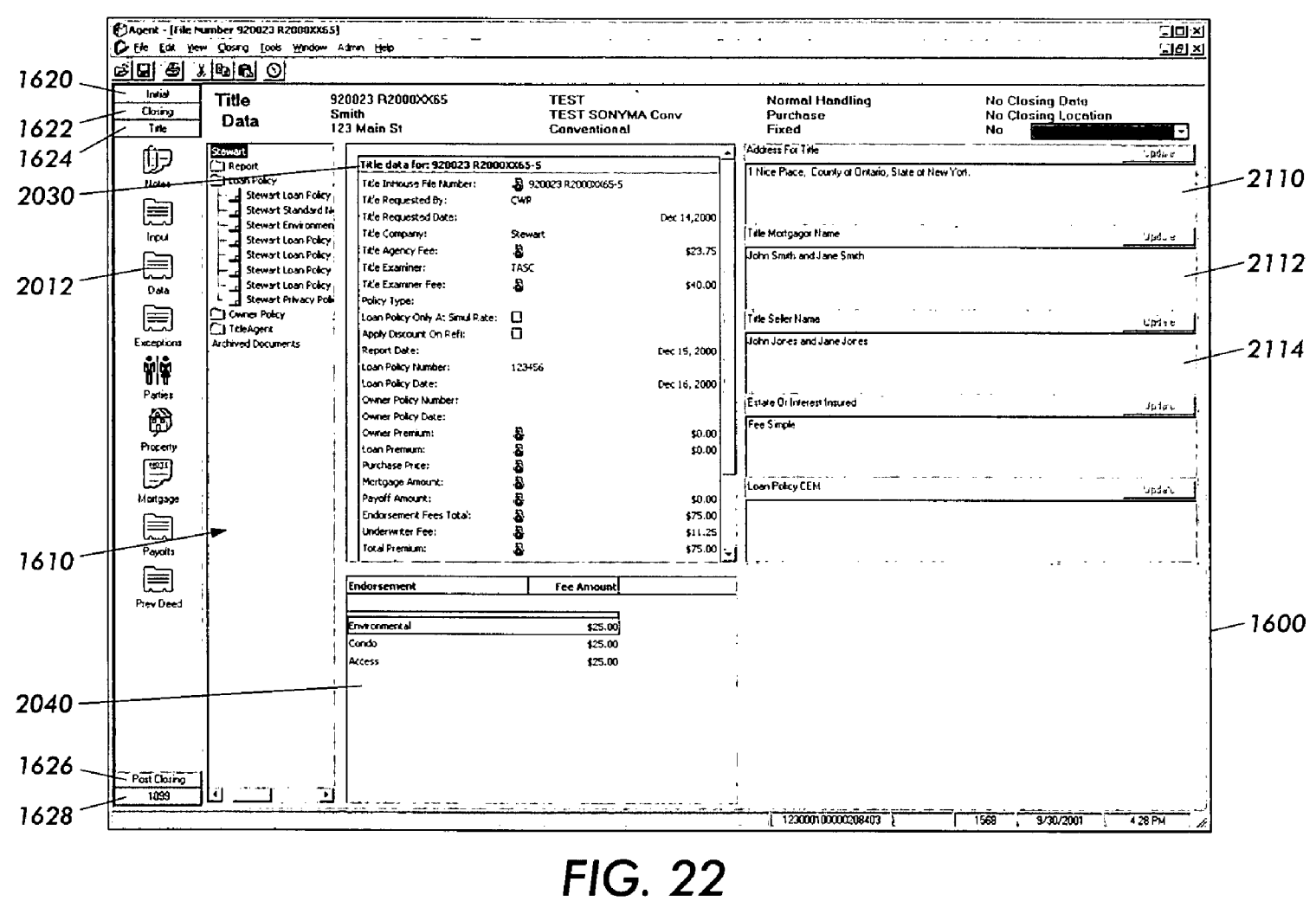

In the Title Data screen of FIG. 22, there are depicted a combination of system input data fields, system generated values and system forwarded fields that can be edited as required for title documentation. For example, the property address depicted along the right side of screen 1600, as in window 2110, is concatenated from the data input screens and municipality tables (FIGS. 6A-6B) into a prescribed Address For Title presentation 2110 and presented in an editable input field where it can be further customized as required and retained for use in all title documents. The mortgagor and seller names are treated similarly in windows 2112 and 2114, respectively, where the mortgagor only (as opposed to borrower only) names are concatenated by eSys from the Party table and presented as prescribed where they can be further edited and retained for use in all title documents.

Figure 23:
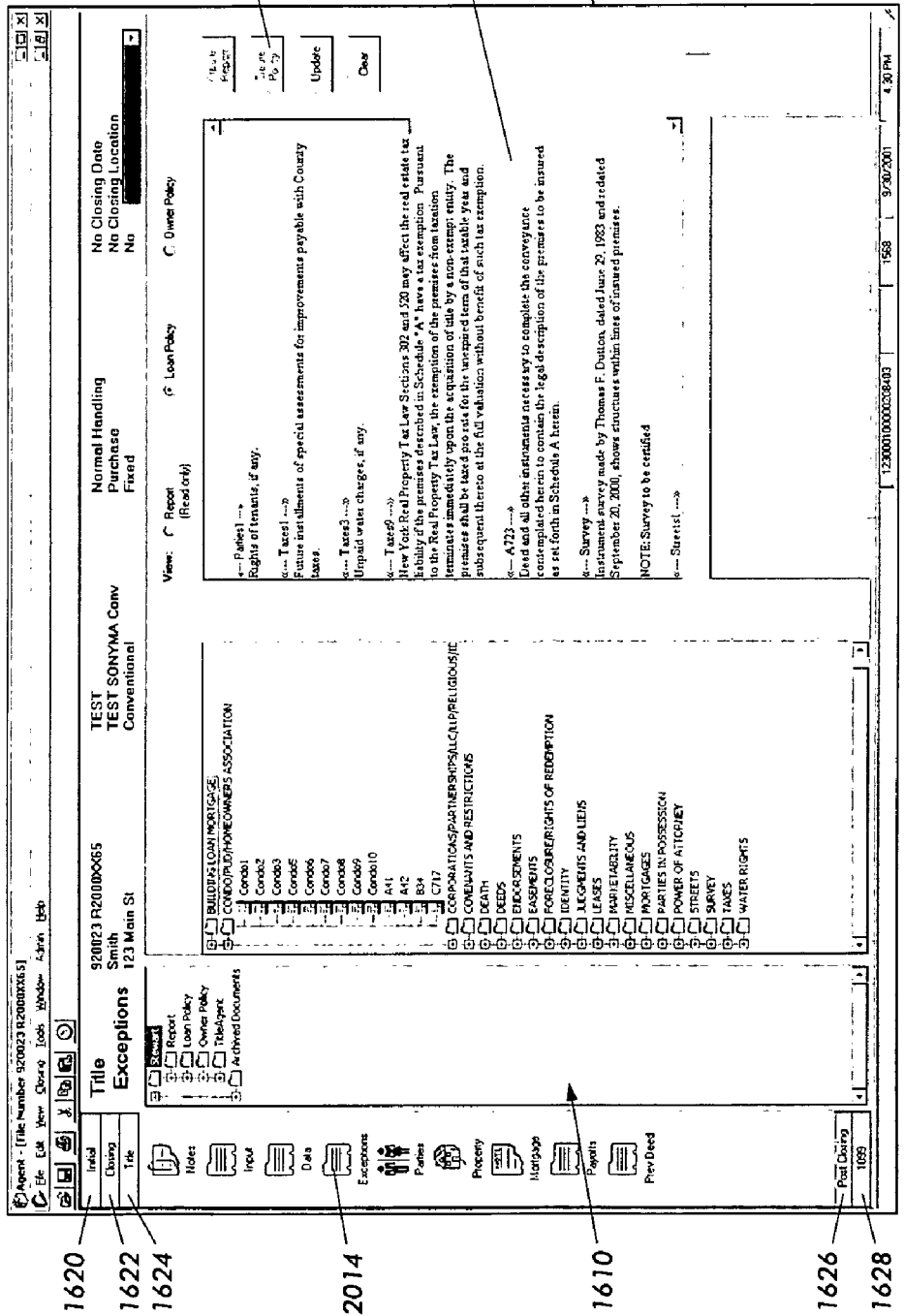

Referring briefly to FIG. 23, there is depicted a Title Exceptions screen where title exception lists are custom built and retained using client profile relevant exceptions which can be selected and auto-included into a text view such as that shown in region 2150 for further file-specific editing. It should be noted that any relevant eSys screen may be made visible in one or more eSys processing sections (controlled by bar 1620-1628 along the left side of the interface). For example, Title may include the same Parties, Mortgage, Property, Status/Notes and Payoffs screens that appear in the eSys processing section labeled Closing as required by the Client Profile. It will be further appreciated, however, that one or more aspects of such screens may be displayed in a read-only format in one section whereas it may be presented in an editable format in another section. Again, all such uses may be controlled via client preferences or coded within the eSys software embodiment.

Once the Title Agent prepares the Title Report the report may be viewed on-line for accuracy. In a preferred embodiment, eSys presents the appropriate documents that make up the report in a package listing such documents in the correct order. The documents can be reviewed for accuracy on-screen with color coded variables, printed individually, printed as a package (automatically generating the appropriate number of documents), posted to the eSys Virtual File Folder™ where it can be accessed and reviewed from within eSys or over the Web via eSys Client Services. Similarly, such documents may be automatically added to a notification or faxed to a prescribed recipient.

After completing and accepting the title report, the Title Agent may select on the Post Report button (FIG. 19 button 1822 "Post Report") that automatically posts the preliminary title report to the Virtual File Folder™. Once posted, the File Status is changed to "Title Report Posted" in the system. Again, in response to the status change, an auto-notification would go out to the appropriate parties. Such parties and notification may include, for example, Borrower/Attorney and Seller/Attorney receiving email notification that the preliminary report and exceptions are available on-line for review of required curatives. A hyperlink to the file may be provided in the notice that will automatically take the recipient to the eSys Client Services site, request a login and open directly to the documents for review.

Similarly, the auto-notification to the Lender will include notice that the preliminary report, and preliminary documents (i.e., proposed deed, survey map, and insurance binder) are available on-line for review. Again, a hyperlink to such information may be provided as part of the electronic notification.

At this point in the process typically the Lender will need to review commitment and title conditions and indicate that the transaction is satisfactory to proceed toward closure. This phase may be triggered by a Title Report Posted notice and/or a Preliminary Document Posted notice that is sent to the Lender with a hyperlink to the file in eSys. Again, the Lender may then proceed to review the documentation on-line. The Lender can enter file notes as desired. When the Lender determines that commitment and title conditions will be met, the Lender advances the file status to keep the process moving forward. Advancing the status is accomplished by the Lender selecting the OK to Close button (e.g., FIG. 19 button 1824 "OK to Close") causing the File Status to now change to "OK'd to Close." Automatic "OK to Close" notification goes out to appropriate parties as may be defined in the Client Profile, for example notice would go to the Processor indicating the Lender is satisfied that processing on this loan should go forward.

Figure 24:
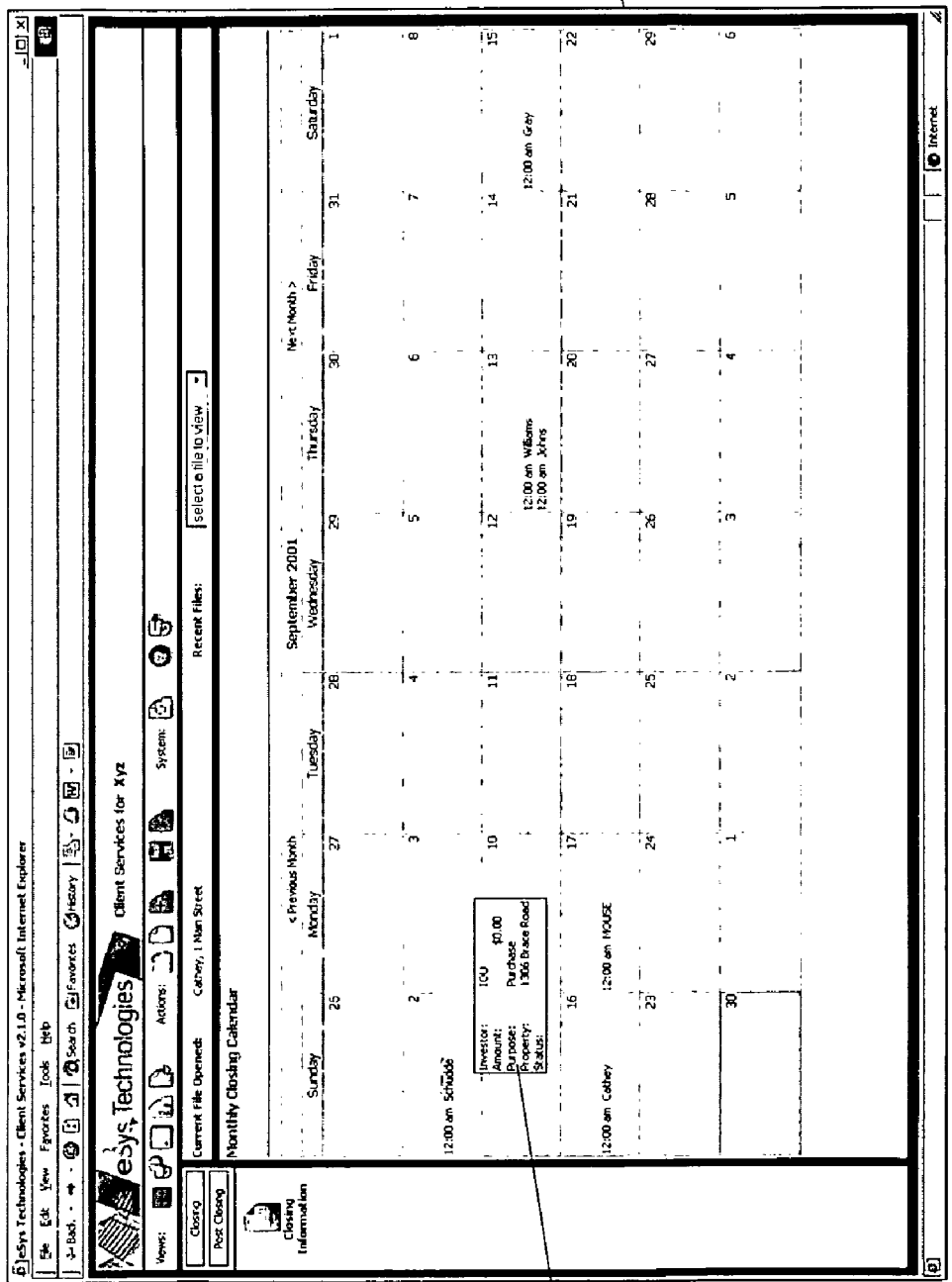
Figure 25:
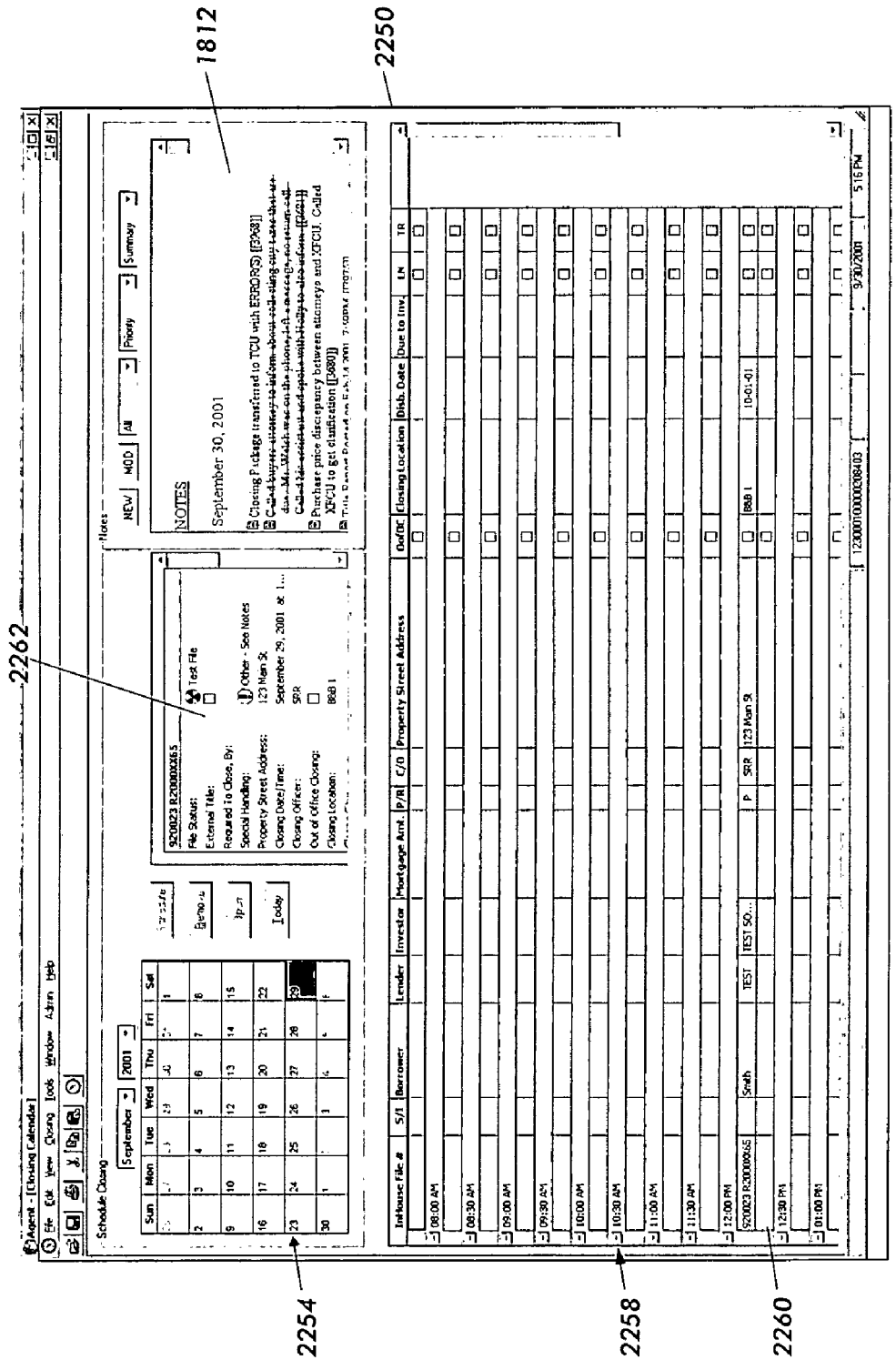

Once the Processor receives the "OK to Close" notice he/she proceeds to move the process forward by reviewing the file and beginning the scheduling process. The scheduling process is initiated by the Processor who selects a tentative closing date and time on the closing calendar, examples of which are depicted in FIGS. 24 and 25. FIG. 24 depicts a web-based calendar 2210, where the time may be reserved, and where upper-level information, window 2214, may be displayed for any scheduled closing by selecting the calendar item it is associated with. Similarly, FIG. 25 depicts an eSys calendar 2250 where a user may review, remove, or schedule a closing. More particularly, the Processor may select a date from calendar region 2254, resulting in the display of closings in day window 2258. Selection of a particular scheduled closing, for example the Smith closing 2260, results in a display of the transaction information in window 2262.

Tentative scheduling allows the Processor to reserve a date and time until all parties can confirm availability. Tentatively scheduled entries appear in a different color (for example blue) on the calendar. Color coding on the calendar can also serve to offer visual cues at a glance for other scheduled items, for example a different color based on closing location (i.e. out of office) or a different color based on status of file (i.e. it closed yesterday, but is still not on record or it closed last week, but Title Policy has not been requested or issued to name a few implementations), all of which are customizable per client.

Once the closing date is scheduled, as a result of the Processor selection, the File Status is changed to "Scheduled Tentative". Automatic email notice of tentative date and time is also sent out to appropriate parties as prescribed in the Client Profile. For example, the Title Agent receives notice of tentative scheduling in case the process is occurring out of sequence. As will be appreciated by those familiar with real estate transactions, this may be the first notice that the Title Agent has that this file exists and is about to close. Also notified are Borrower/Attorney, Seller/Attorney who receive notice requesting scheduling confirmation.

Confirmation may occur in any number of ways including, for example:

telephone (DID to Processor); Email (Direct to Processor); Fax (DID to Processor Desktop); On-line via eSys Client Services; Automated Voice Response; and any traditional paper method such as messenger, overnight delivery or postal service. If confirmation occurs on-line, data, date, time and originator are auto-noted and the Processor is notified. If confirmation occurs by phone, email or fax, Processor is directly notified. Ideally, the tentative schedule—notification—acceptance process is repeated until all parties can agree on a confirmed date and time.

Once the Processor receives confirmation and is satisfied that all required parties have confirmed the scheduling, the Processor selects the Confirmed button (FIG. 19 button 1826 "Confirm") and the File Status is changed to "Scheduled Confirmed." Subsequently, the system displays the Closing Calendar entry for that closing as Confirmed and sends out appropriate prescribed auto-notifications of the confirmed schedule date/time for the closing. Again, the Borrower/Attorney, Seller/Attorney receive confirmation notice advising that information/documentation regarding Expenses, Adjustments and Payoff Statements must be supplied at least twenty four hours, or another predefined time, before the closing. Similarly, the Lender receives confirmation notice to prepare funding and closing instructions and the Title Agent receives notice to be ready to create the policy on the scheduled date.

Figure 26:
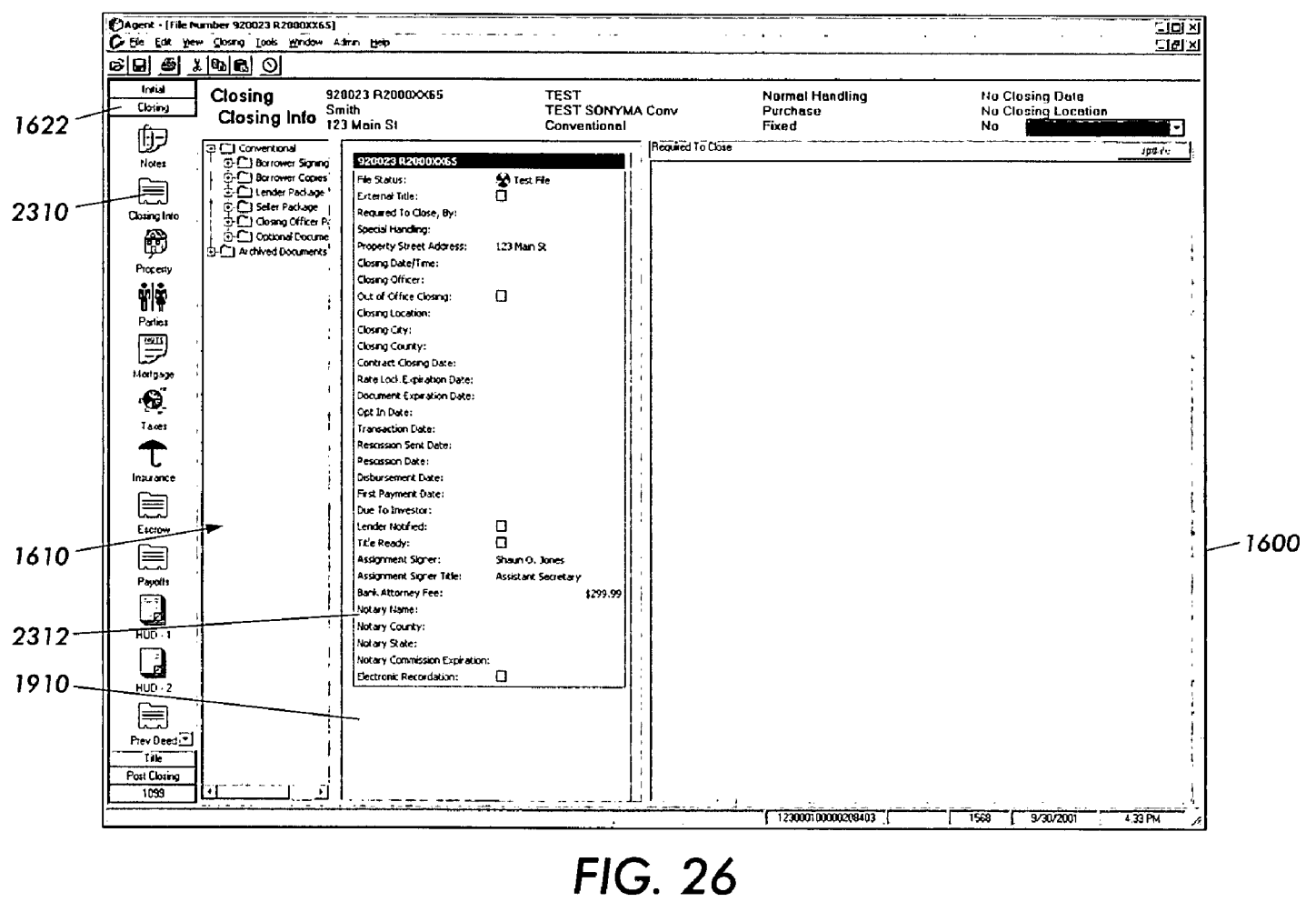
Figure 27:
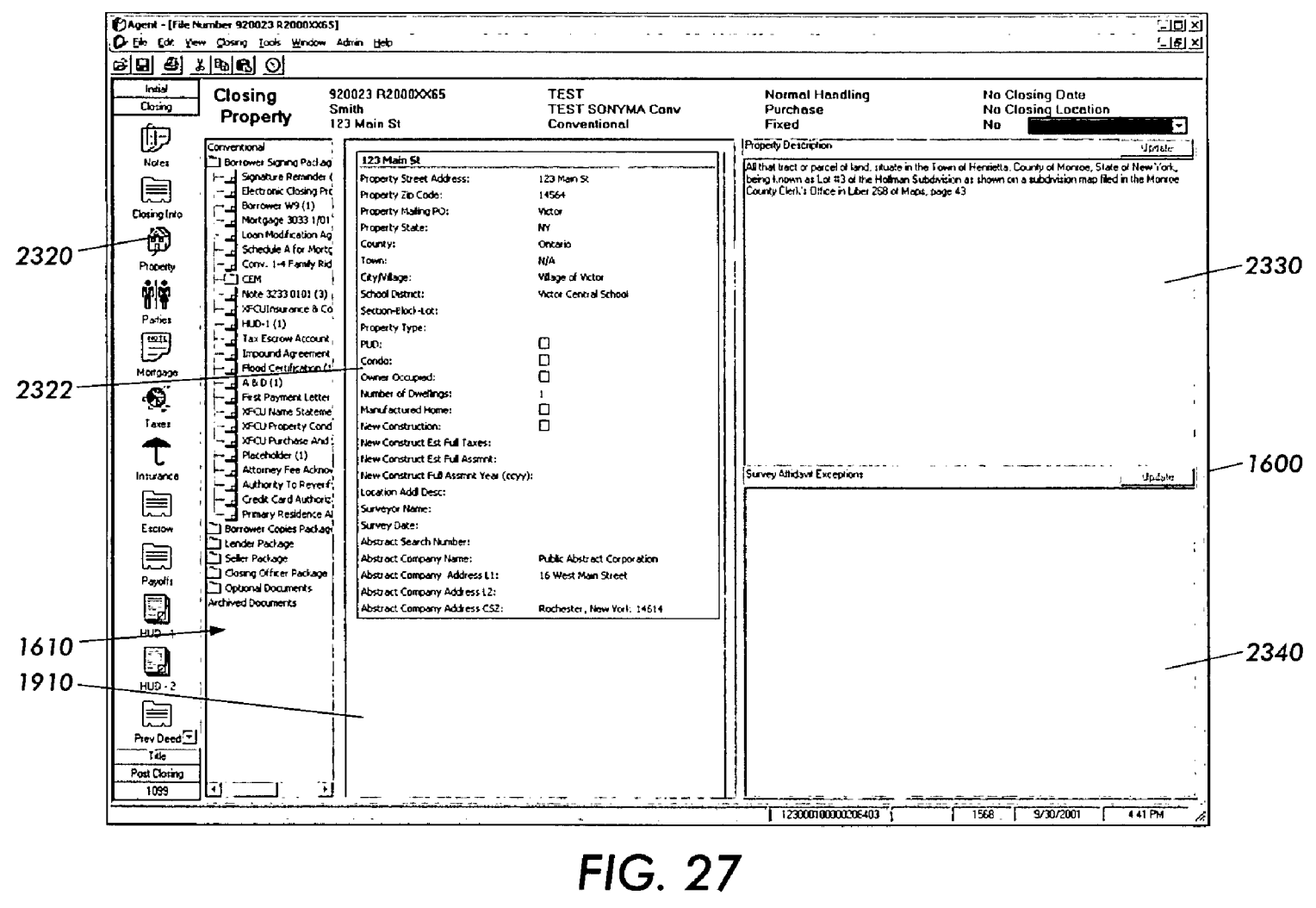

After the closing has been scheduled, the File Status is updated to "Scheduled Confirmed." The Processor now begins the closing document preparation process based on the confirmed closing date and time. First, the Processor reviews file for any and all inconsistencies in origination/source documents and data, and resolves all that may be found. Information for such a review may be found on screens such as those depicted in FIGS. 26 and 27. More specifically, FIG. 26 is a screen 1600 that is displayed as a result of a user's selection of Closing bar 1622 and Closing Info icon 2310. As a result, window 1910 depicts the closing info card 2312. Similarly, screen 1600 in FIG. 27 is displayed as a result of a user selection of Property icon 2320, where window 1910 depicts details on the real estate property that is the subject of the transaction (card 2322). For example, if the appraisal does not indicate that the property is in a Planned Unit Development (PUD), but it is, the Processor would resolve the discrepancy.

Subsequently, the Processor obtains tax figures and enters such information into the eSys Tax Screens that are supported by eSys Municipality tables (FIG. 6A) and associated Intelligent Agent Business Rules. The Processor also gathers expenses, adjustments and payoff statement data and documentation electronically or in paper form. Such documents are made part of the eSys Virtual File Folder™ and data is entered into eSys Closing dynamic data screens such as those depicted in FIGS. 26-31, as required per legal and business rules, for example.

With respect to Closing Info, the Processor is presented with screen 1600 as illustrated in FIG. 26, where a customizable collection of fields is intended to present, at a glance, details about the closing. Some of the fields depicted in card 2312 are system generated or derived, for example the Rescission, Disbursement and First Payment dates as well as File Status. Some are initially gathered and appear in other views, for example, the Property Street Address, Out of Office Closing, Bank Attorney Fee, and the expiration dates; others are entered directly into the fields depicted in window 1910, for example, who will be notarizing the documents, whether or not there will be an electronic closing, the Closing City and County, as well as fields to capture special handling or information regarding a closing that is "On Hold."

The Property screen illustrated in FIG. 27 includes a customizable collection of fields that relate to descriptive information about the property, some of which are entered by the Processor and some that are driven by underlying municipality tables. For example, when entering the property State, County, Town, City/Village and School District you first select the County, then select either the Town or City/Village from the available Towns or Cities/Villages supplied by the municipality tables, then select from the appropriate School Districts as made available by the municipality tables. The municipality tables could easily expand to drive Counties from State selections, States or Provinces from Countries, etc. The Property card 2322, depicted in window 1910, also includes a text Binary Large Object (BLOB) field to input an unlimited length property description in editable text window 2330 for auto-inclusion as a field in closing and title documents, as well as a BLOB (editable text window 2340) to gather Survey Affidavit Exceptions for similar purposes.

Figure 28:
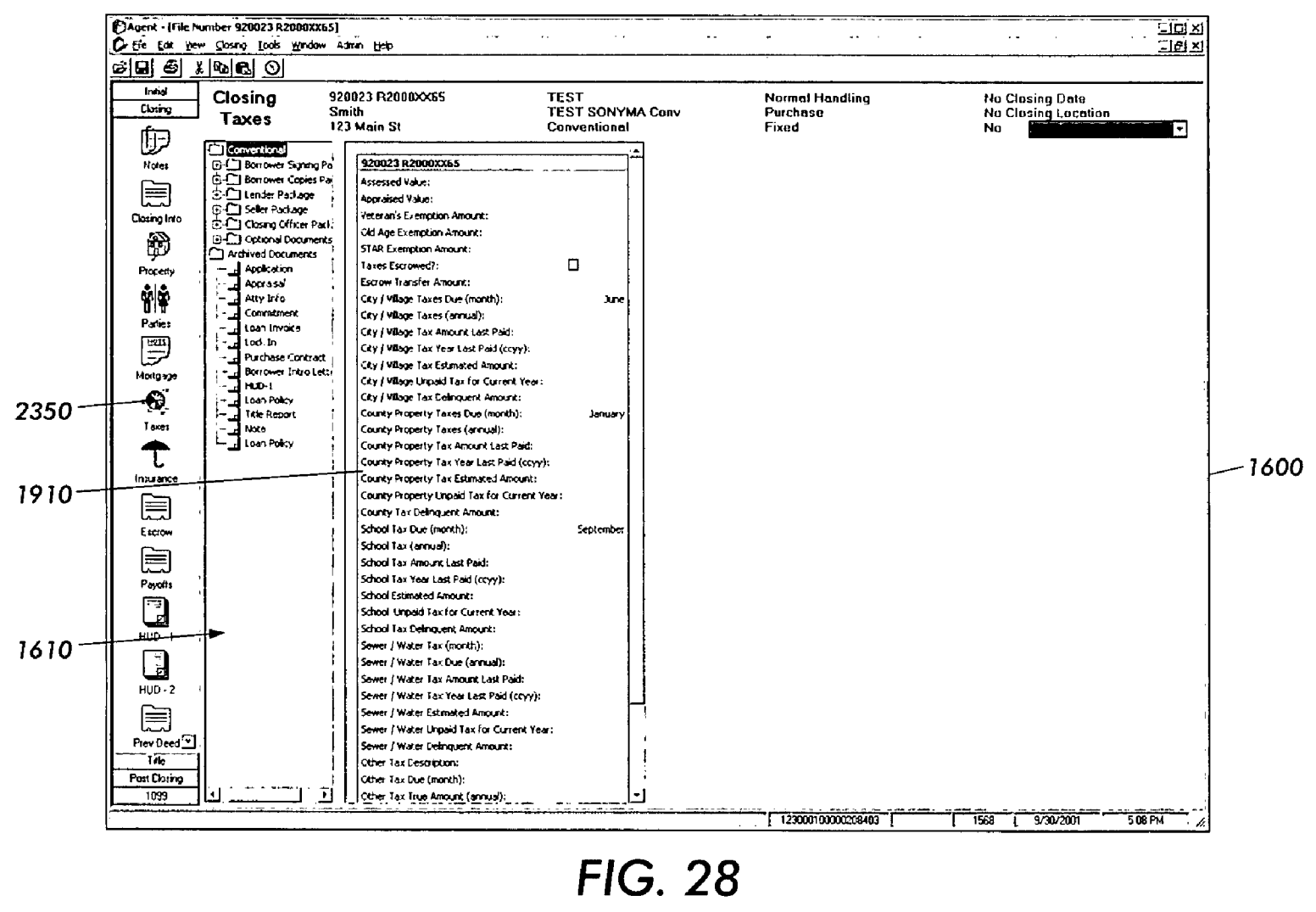

Turning now to FIG. 28, there is depicted a customizable screen designed to gather information relating to relevant taxes, for example, assessed and appraised value, exemptions, whether or not taxes will be or were escrowed, whether or not estimated taxes will be collected, current tax payment status, delinquent taxes, and when the taxes are due. The tax information is displayed in window 1910 as a result of the selection of Taxes icon 2350. In one embodiment, the taxes types are fixed and list City/Village, County, School, Sewer/Water and Other and are governed by municipality table rules. In another embodiment, the presentation might allow for unlimited tax types by utilizing look up tables in a grid presentation similar to the Parties screen (FIG. 17).

eSys Intelligent Agent Processing™ currently uses a combination of Lender/Investor rules, legal and municipality rules to determine tax due dates and whether or not they will be paid as a follow-up post-closing task. For example, if a School Tax is due in September and the closing occurs during the last week of July, and the Lender/Investor requirement is that if a tax is due within 60 days of closing, then estimated taxes must be collected and the taxes be paid as a post-closing follow-up task, the documentation will automatically reflect that the school taxes will be paid by the closing agent (or post-closing coordinator) in September. Such information is managed, and depicted, by the system through rules such as those found in file Escrow.ctl in the Computer Program Listing Appendix incorporated herein.

Figure 29:
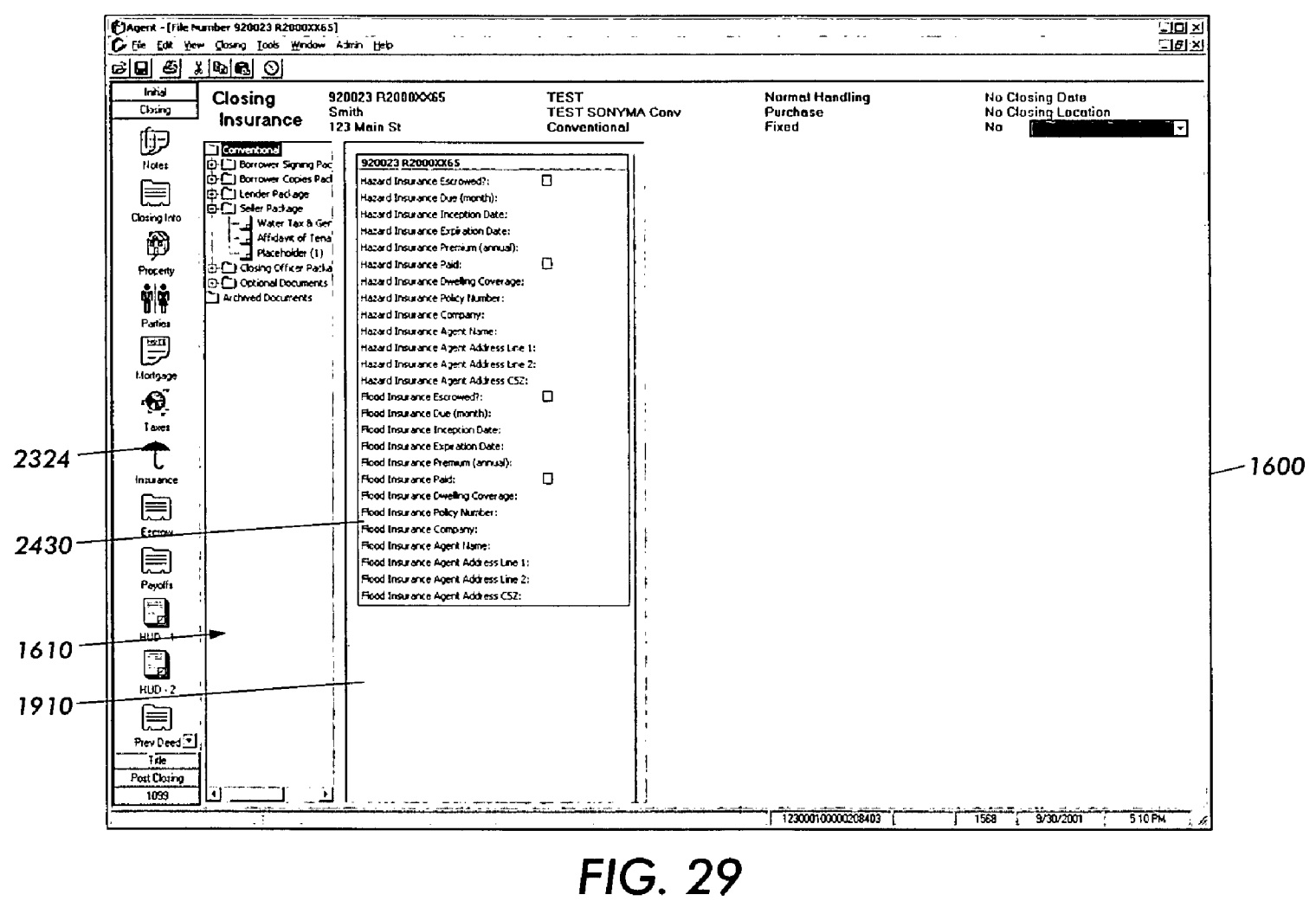

As illustrated in FIG. 29 a customizable screen may also be employed to gather information relating to relevant required insurance for the property. Insurance information may include details of policies such as hazard or flood insurance or any supplemental insurance that may be required, for example earthquake insurance. Screen 1600, via window 1910 depicts the insurance "card" 2430 for the capture of insurance inception and expiration dates, premiums, coverage, policy numbers, insurance company and agent information as well as due dates and whether or not the insurance is being escrowed. One implementation defines the types of insurance in fixed fields, another implementation might allow for unlimited types of policies by utilizing look up tables in a grid presentation similar to the Parties screen.

Figure 30:
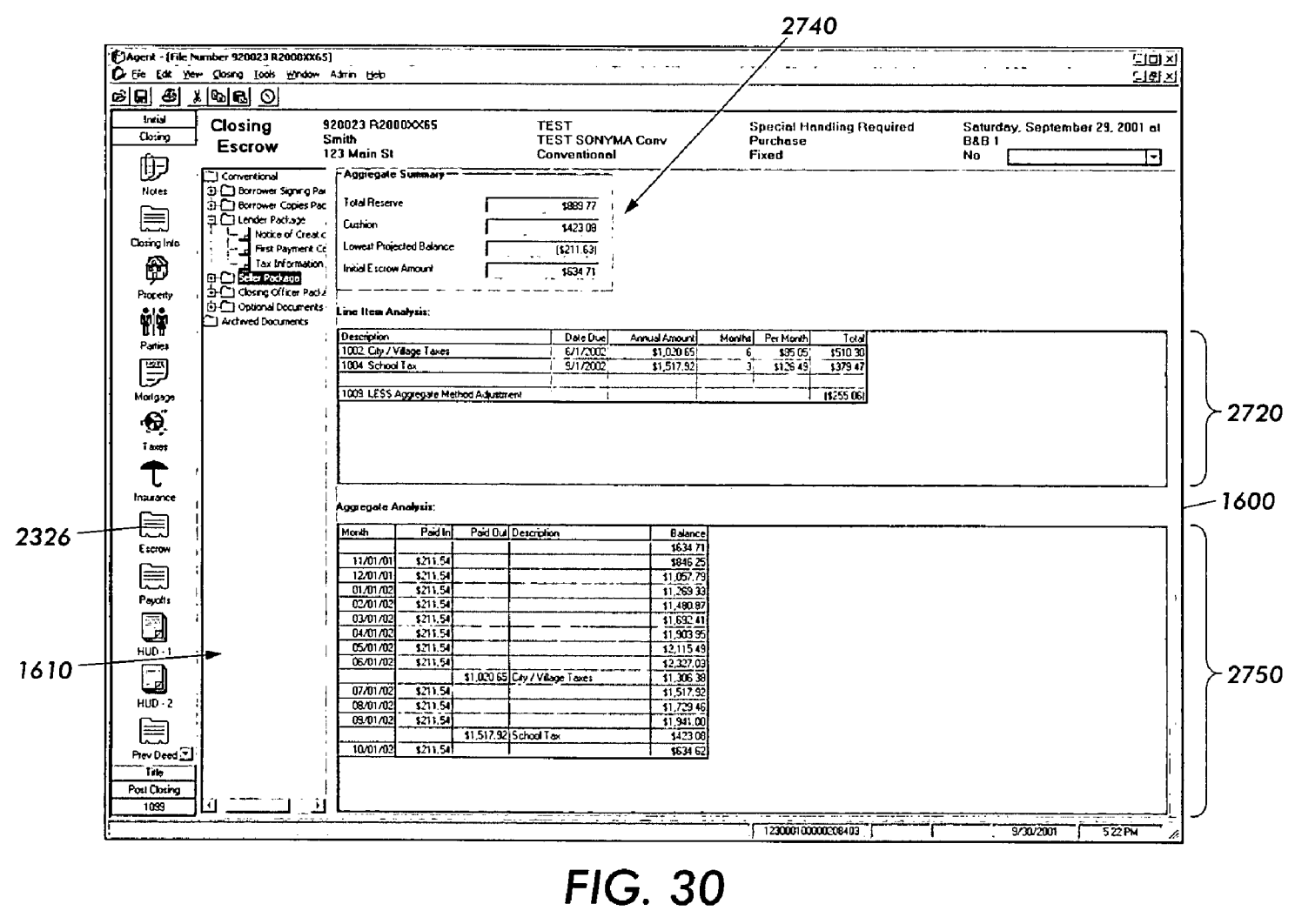

Also reviewed by the Processor may be information related to any escrow as shown in FIG. 30. The layout of screen 1600, for Closing Escrow, shows details using information stored in the database or the Virtual File Folder™. For example, various tax and/or insurance amounts and due dates, having been entered into a tax card or an insurance card, are represented in a line item analysis window in region 2720, and the aggregate analysis is also generated by the system. At the same time, the information in regions 2740 and 2750 can be updated to show a summary and analysis detail, respectively. Although the data may be displayed in a read-only format in the escrow display, it may also be possible to allow the user to overwrite the eSys analysis should the Lender/Investor require it, but preserve the eSys analysis for future reference.

Figure 31:
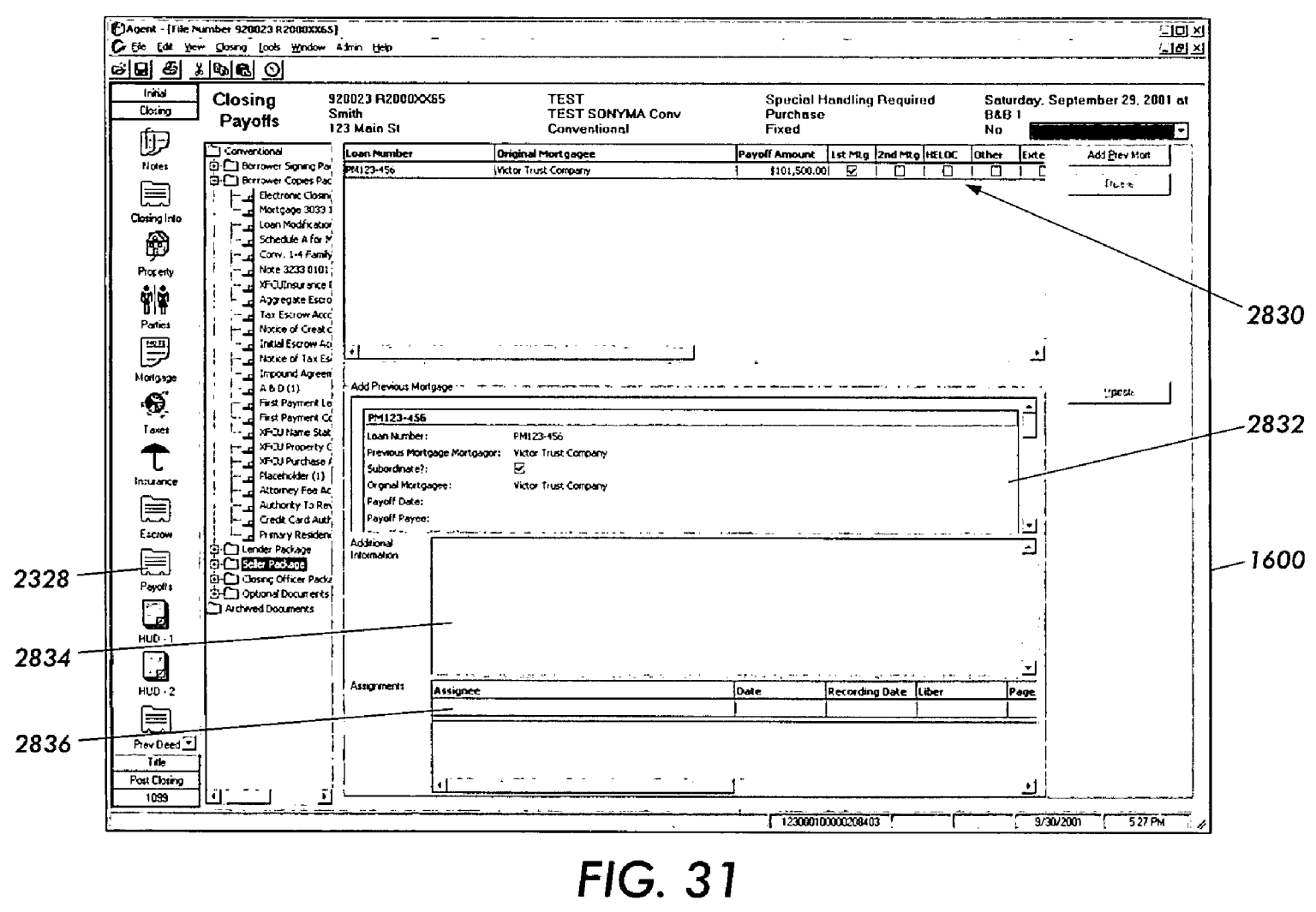

FIG. 31 illustrates a Payoffs screen, selected via icon 2328, that is designed to collect all relevant detail on an unlimited number of loans being paid off as part of the real estate transaction. Such loan information may be included in the system, regardless of whether or not the loans include liens on the property (e.g., a first mortgage, second mortgage, home equity line-of-credit (HELOC) or other type of loan). As illustrated screen 1600 depicts a loan table 2830 and a loan "card" 2832, where the original amounts, balances due, recording information, whether or not they are subordinate, and whether or not the discharge fee is included. The screen also permits the display, in window 2834, where additional information in the form of a text BLOB may be displayed or edited. Also displayed in window 2836, in a tabular format, is any assignment information associated with each loan. This data is used by eSys Intelligent Agent Processing™ to automatically feed closing and title documentation as well as tracking and follow-up tasks.

Figure 32:
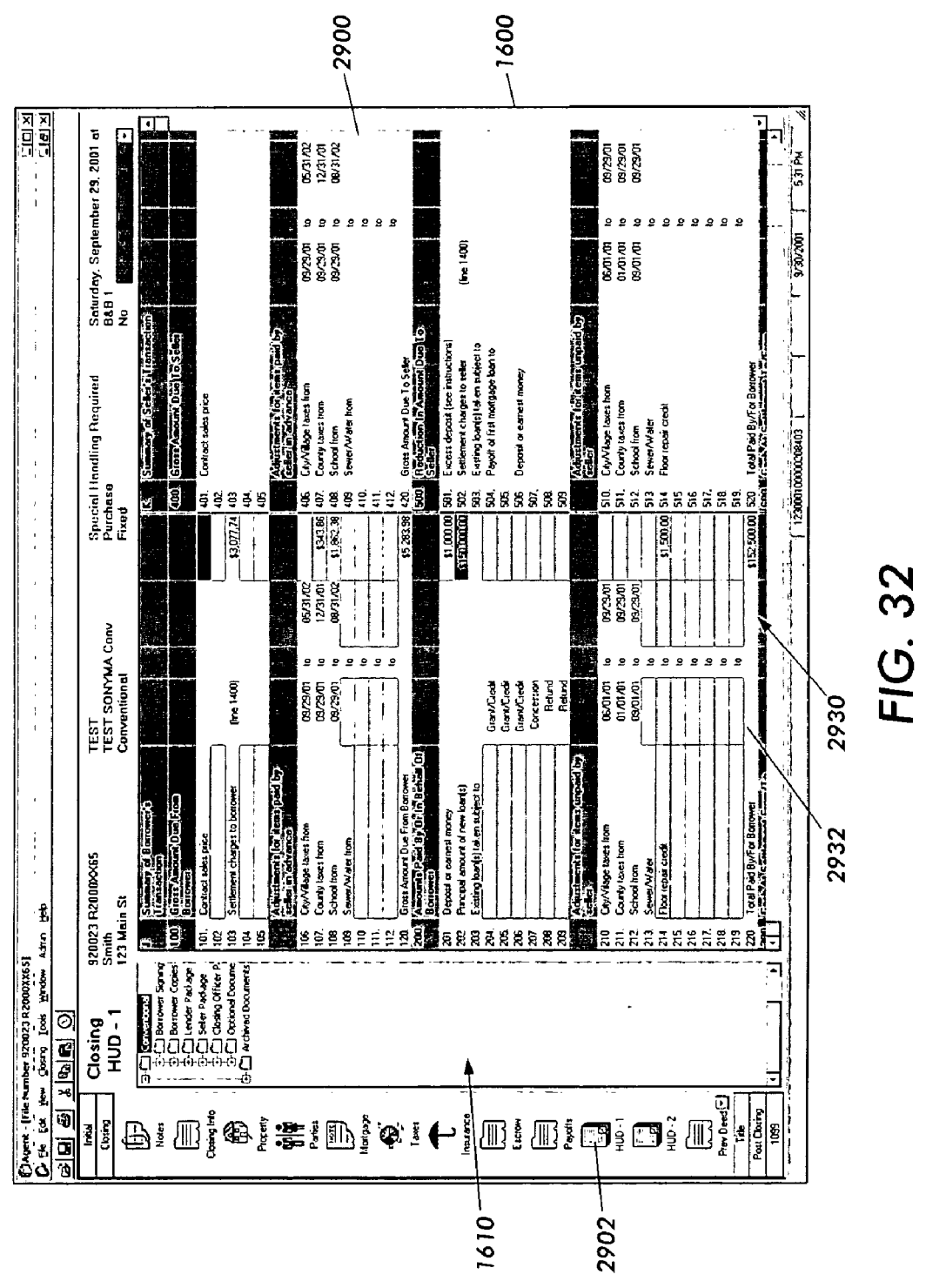

In the HUD-1 and HUD-2 screens, depicted in FIGS. 32 and 33, respectively, the various calculations relating to required HUD closing documents are illustrated. It will be appreciated that there is a significant amount of information associated with the HUD sheets, but that the views of the associated figures are not able to depict all such information. To enable a user to view the data, window regions 2900 are preferably scrollable windows and/or include features to control the level of "zoom" applied to the data within the window. As described herein, the data is preferably color coded so that a user or viewer of the system is able to easily discern that information which is provided or entered into the system from that which is calculated by the system. Moreover, the system also makes it possible to see detail of the HUD sheets. Again, the information depicted has, to a significant extent, been entered via the various cards and is transferred, by the eSys system, to is the HUD sheets.

Referring specifically to FIG. 32, region 2930 includes a table 2932 that represents a summary of the borrowers transactions. Scrolling region 2930 to the right would similarly display a table that represents the seller's transactions. Similarly, FIG. 33A includes information pertaining to closing sheet HUD-2 in the form of a table 2934 in region 2930. Such information is displayed in region 2930 in response to a user's selection of the HUD-2 icon 2904. The various details of the HUD sheets are preferably based upon user input and calculations done via Visual Basic algorithms contained in hud.ctl in accordance with the rules tables shown in FIG. 7, which contain data governing business rules, presentation and formatting.

Figure 33A:
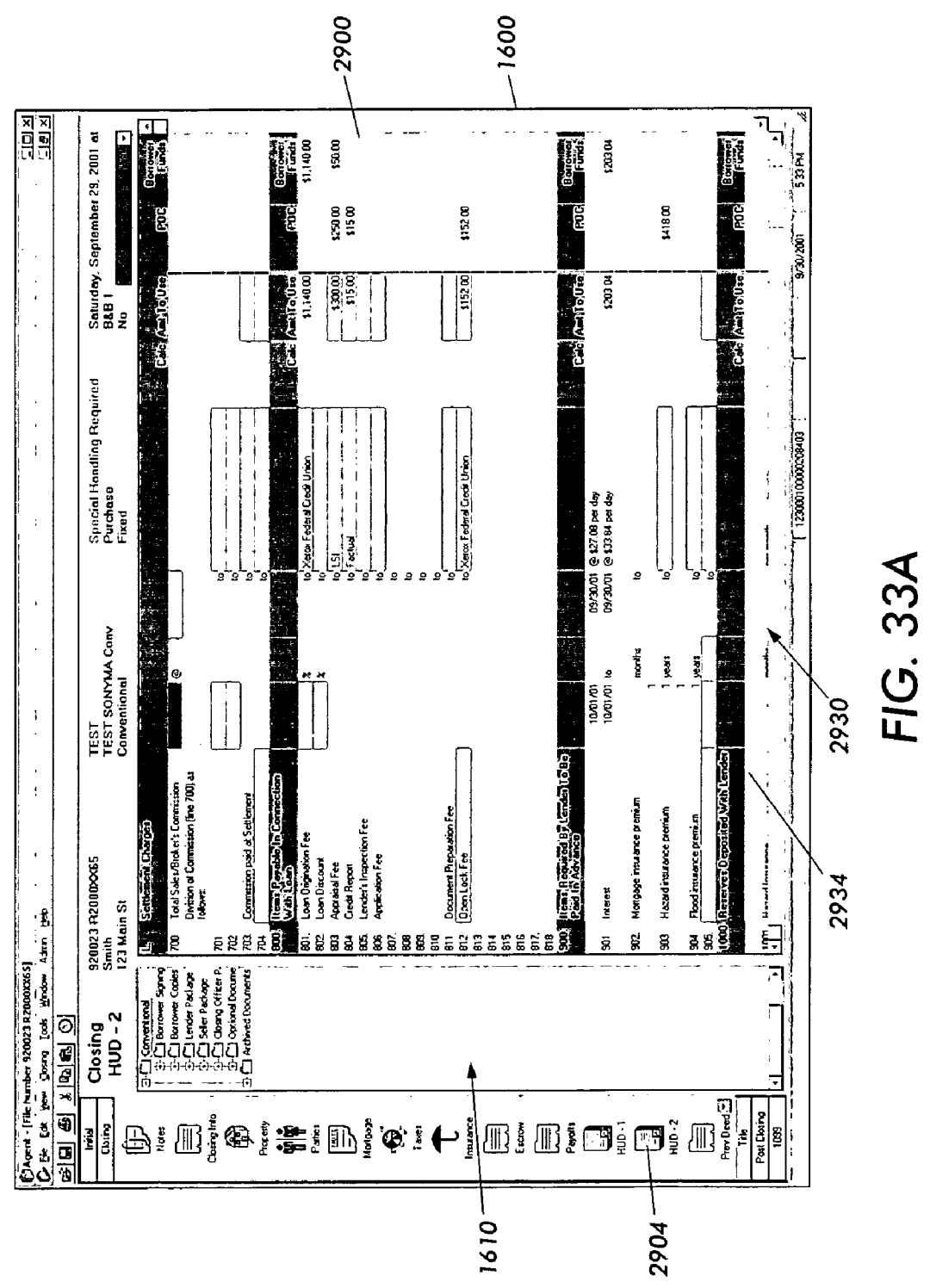
Figure 33B:
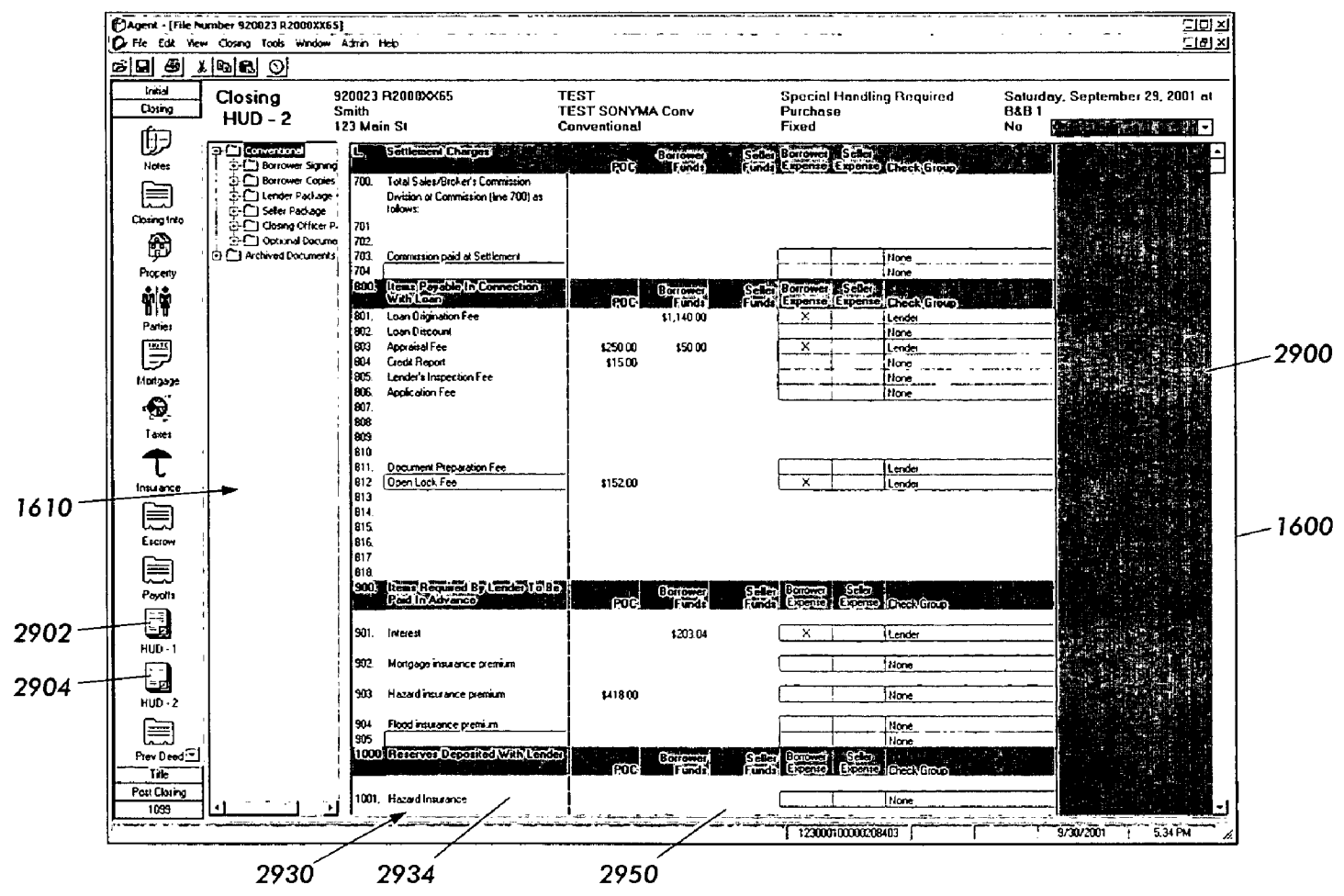

Referring briefly to FIG. 33B, there is depicted a HUD-2 Accounting screen which may be displayed by collapsing the left side of the HUD-2 table 2934. More specifically, table 2950 in window 2900 provides accounting/disbursement information wherein a user may indicate the party to which disbursements or funds are being assigned. Such information, as will be appreciated, may in turn be employed to provide a summary of disbursements, funds, etc. as well as a list for input to accounting software to generate check requests on behalf of one or more parties to the transaction.

Also depicted in the various HUD screens, consistent with the previously described user-interface screens, is a Document Tree 1610 that includes a listing of the documents within the system that are related to the closing so that a user may, at any time, select on one of the files and open the associated document file as might be done in a conventional Windows Explorer operating environment. For example, a user may open a HUD document, to view the document populated with information displayed in the HUD tables. The various documents depicted in the Document Tree may include system generated documents as well as user-provided documents which may be in the form of digital submissions (either digital original data or hard copy documents that have been scanned and entered into the system).

The HUD information displayed in the tables (2932 and 2934) is mapped with static locations as prescribed by HUD regulations, for example, line 102 of the form is always the "Contract sales price", line 104 is always "Settlement charges to borrower," and other HUD lines are reserved for specific item types and are Lender/Investor mapped within eSys for consistency and accuracy. For example, Lender/Investor specific lines would include fees, and lines 812 (table 2934 in FIG. 33A) through the end of the 800 section would automatically populate with the Lender/Investor prescribed fee and fee description.

Furthermore, eSys Intelligent Agent Processing™ automatically disburses multiple payoffs across the appropriate HUD lines available, and determines when it is going to run out of lines to use. In such a situation, the intelligent agent indicates "See Attached Addendum to HUD," and creates the document to attach and automatically populates it with the payoffs that would not fit on the HUD form, and then includes the additional form right behind the HUD in the document package for every HUD that is generated (in the right number of copies).

Figure 34:
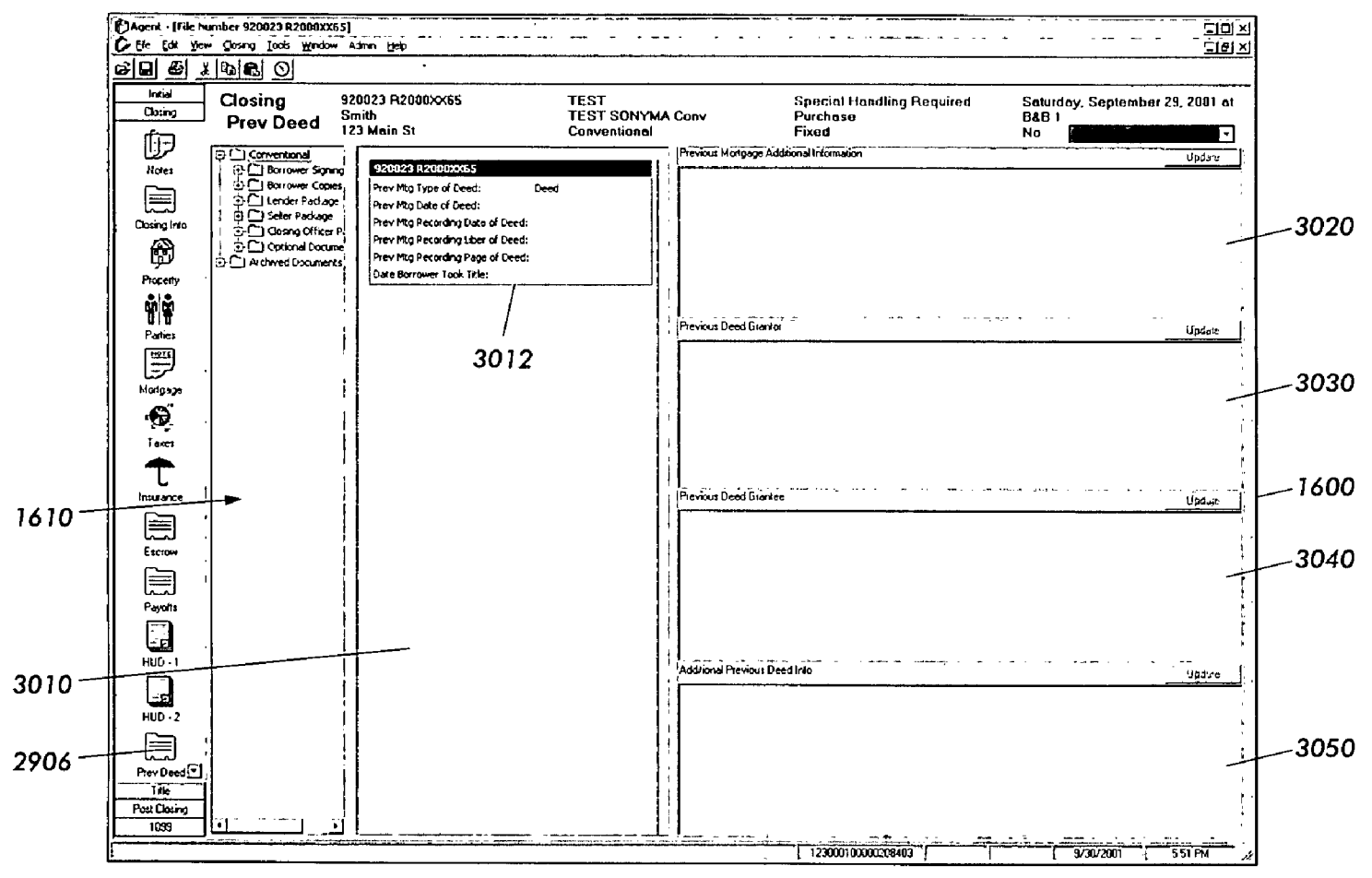

Briefly referring to FIG. 34, the PrevDeed screen is displayed in response to selection of PrevDeed icon 2906. This screen is intended to gather relevant previous deed information including, for example, the type, date of deed, recording information of deed, and when the borrower took title as represented in card 3012 depicted in region 3010. Additionally, BLOBs are supplied to enter previous mortgage additional information (3020), the previous deed grantor (3030) and grantee (3040) and any additional previous deed information (3050) that might be required. This information is used for both closing and title document preparation.

Figure 35:
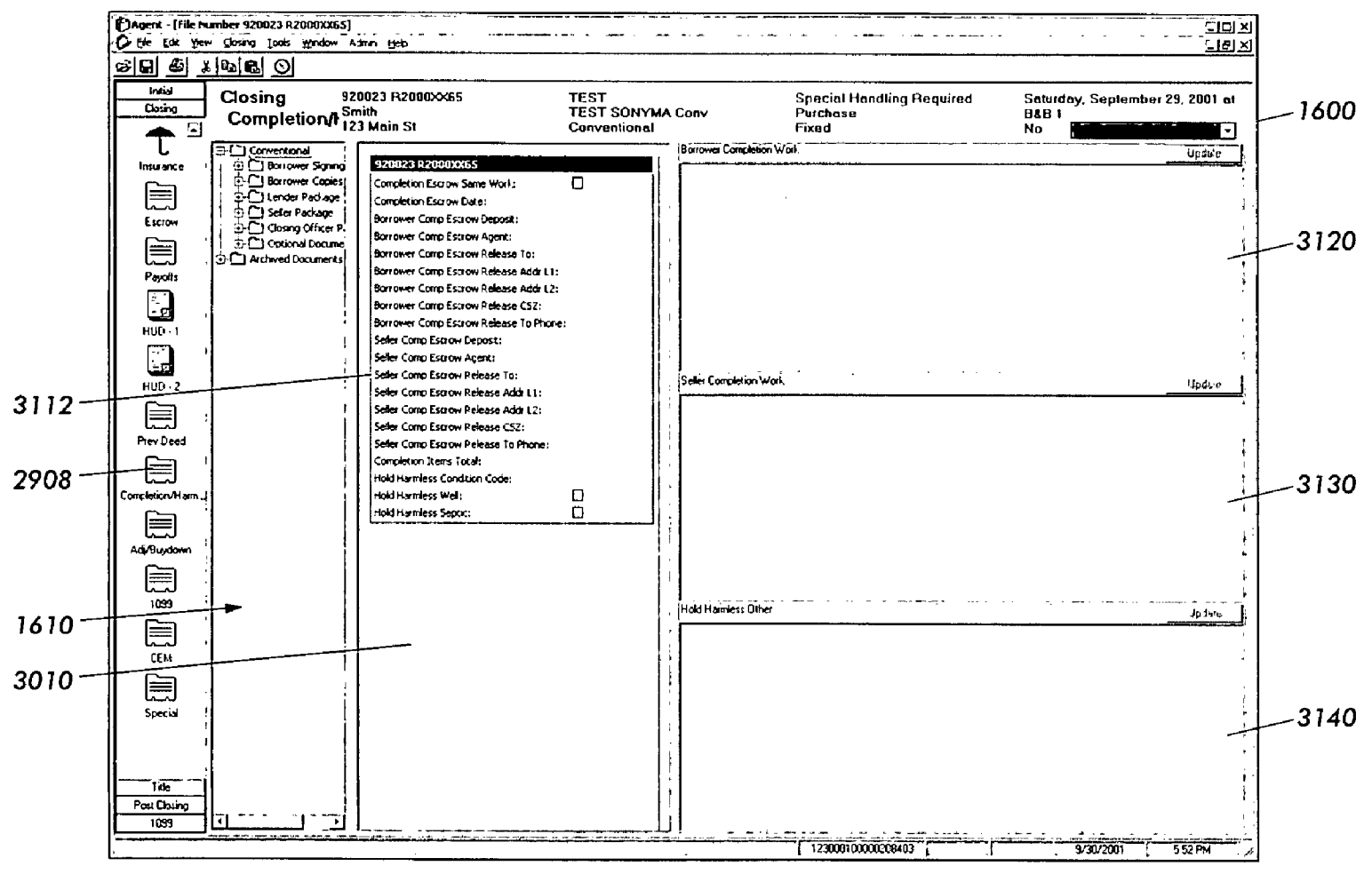

In a similar fashion, screen 1600 is depicted in FIG. 35, where any transaction completion or hold-harmless detail may be reported via a card 3112 in region 3010. The Completion Escrow portion of this screen is designed to capture relevant information for closing and title documentation as well as post-closing follow-up tracking and includes, for example, a description of the work to be done, the amount held from borrower and/or seller, who is holding the money, who it is to be released to, and the required completion date. The Hold Harmless portion relates to acknowledgment of existing conditions for which the Lender/Investor will not be held responsible, for example, the condition of the well or septic system. A BLOB is made available to accommodate free entry of any type of hold harmless information in fields 3120, 3130 or 3140, where the text data can be preserved and used as a field as required in any document or post-closing follow-up report. It should be noted that the Completion Escrow/Hold Harmless, like all screens in eSys, is customizable per client profile and could be implemented with look up tables and grids to allow for unlimited item entries.

It will be further appreciated that similar screens are implemented in the system to enter, edit and display information including:

Adjustable/Buydown—designed to capture terms relating to adjustable and buydown loans, the screen includes fields such as margin, first change date, minimum and maximum rates, caps, buydown amounts, borrower portions and conversion fees.

1099s—designed to enable the closing agent to fulfill income tax reporting obligations by presenting relevant 1099 information drawn from throughout eSys along with 1099 specific information (see e.g., FIG. 44), the system stores detail as to whether or not 1099 reporting is required, generates the required 1099S Recipient Copy, stores detail as to how it was delivered, and whether or not it was filed. In combination with eSys Virtual File Folder™ document archive the 1099 information in eSys provides the information necessary for post-closing follow-up and tracking. Reporting to the Internal Revenue Service can be accomplished electronically using a third party reporting service or software, or in an alternative embodiment, directly out of eSys.

CEMs—designed to capture relevant detail on existing mortgages being consolidated into the current mortgage, the screen (see e.g., FIG. 50) captures the new money amount and new money PI along with existing mortgage mortgagee, date, original amount, recording information, current principal amount, tax amount paid, borrower(s), assignment date and recording information. One embodiment names a fixed number of existing mortgages, a preferred implementation is to allow for an unlimited number of previous mortgages and their consolidation relationships to automatically include in the current mortgage consolidation.

Once the Processor verifies that all closing data has been entered, the Processor ascertains whether final closing figures have been generated by eSys and reviews the figures for accuracy. Next, the Processor creates a document package via eSys. If a third party document production service is being used, Processor clicks on the Package Request button (File Status is "Package Requested"). eSys will prepare the required document set request and supply the data to merge with the third party forms, electronically make the request, and retrieve the prepared documents for possible review, printing, or placement into an electronic document storage and management facility. The Processor can then proceed to the "Package Ready" status. More specifically, eSys merges document templates with data to create the closing packages (for example, Borrower Signing, Borrower Copies, Lender, Seller, Closing Officer, and Optional) with the appropriate documents in the right order and in the right number of copies.

Upon retrieval of the merged data templates, if a third party document production service is being used, or when the documents are ready for merging by eSys, the Processor clicks on the Package Ready button (FIG. 19 button 1830 "Package Ready"), the closing document package is posted and printed, and the File Status is changed to "Closing Package Ready". In order to proceed to that point, eSys merges the data with the document set and makes them available for delivery in any number of potential ways. For example, documents can be automatically posted to the Virtual File Folder™ and/or posted to an electronic document storage and management facility, potentially with a pointer to each document in the Virtual File Folder™ for easy access and review. Alternatively, the document package(s) may be automatically printed.

Again, an auto-notification would be sent to the appropriate parties including, for example: Borrower/Attorney, Seller/Attorney could receive notice that HUD (with final closing costs) and other documents are available via Client Services for review before the closing. Similarly, the Lender receives notice for final review of on-line documents and request for funding, and the Accounting Department receives notice of imminent funding and the need to cut checks for the various disbursements. It is further contemplated that the various disbursements, including date/amount information may be automatically imported into an accounting software interface so as to automate the process of generating the necessary disbursements.

Figure 51:
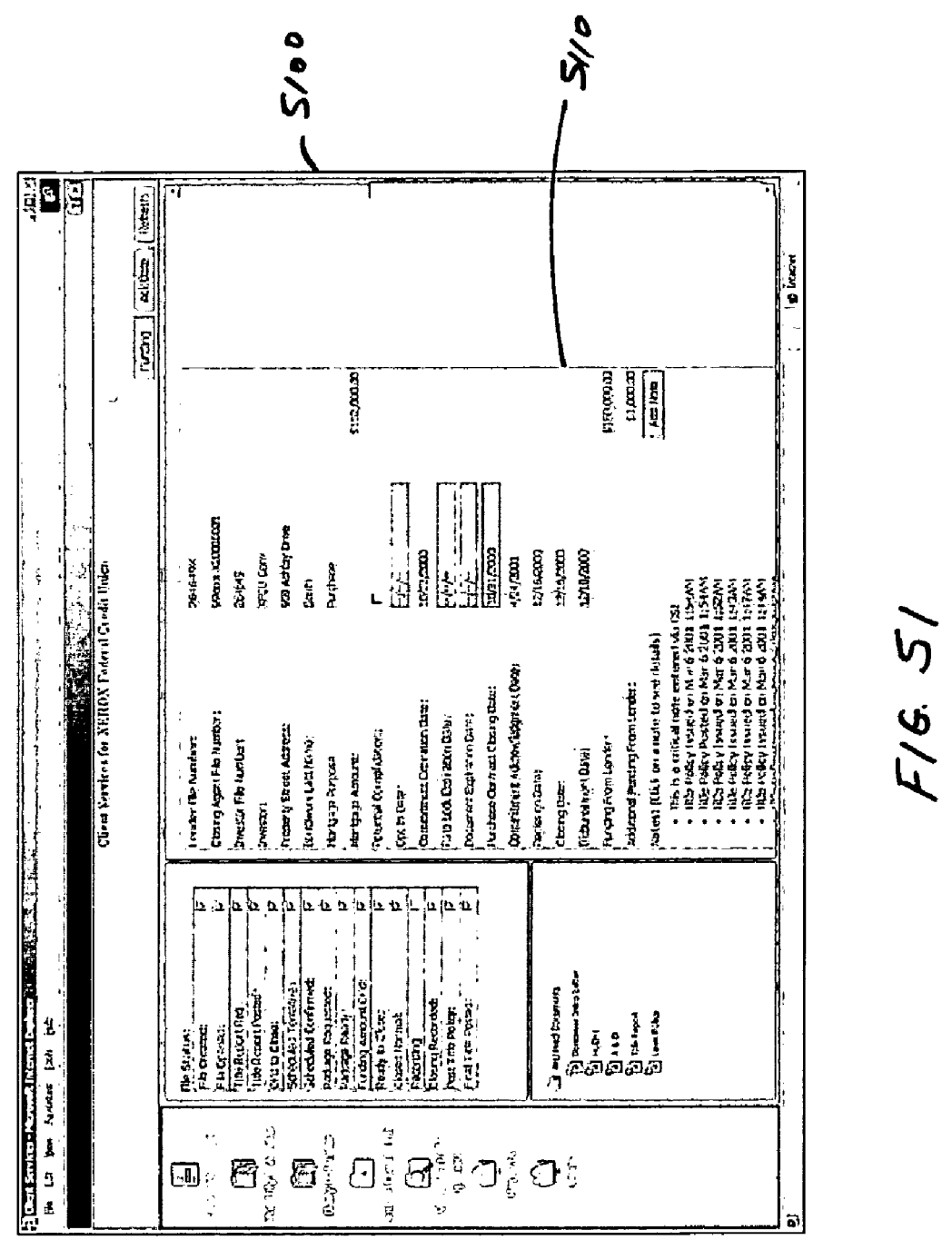

Once the Lender has received notice that final closing figures and documents are available on Client Services for review and a request for Funding Amount Verification and Funding, the Lender goes to eSys Client Services, reviews the final documents and closing figures and enters any additional funding details. Subsequently, the Lender selects the Funding button on eSys Client Services (e.g., FIG. 19 button 1832 "Funding"), which causes a change in File status to "Funding Amount Okd." Similarly, a client services screen 5100, as depicted in FIG. 51, for example, may be displayed to review lender information in window 5110 related to the funding. Auto-notification of Funding goes to appropriate parties, for example, the Processor, Closing Officer and/or Accounting Department.

Subsequently, the Processor receives notice that Funding data has been confirmed and entered via Client Services. The Processor then reviews funding data and determines that the file is ready to proceed to the closing table. A Closing Officer may be assigned at this time and receives auto-notification of imminent closing, file basic identifying information, closing date and time and pointer to on-line documents for review.

The Closing Officer may review the file or Processor may determine that the file is ready and then select the Ready to Close button (FIG. 19 button 1834 "Ready") and the File status is now "Ready to Close." Auto-notification again is sent to appropriate parties for example, Lender and Accounting verifying that all is ready to proceed with the closing. In an electronic closing, when the Ready to Close button is selected by a user, eSys will automatically send the closing document package to the third party electronic document storage and management system and could advance that system's status via a custom API interface, for example, the status might be set to "Loan Ready for Closing."

The next logical step in the process is that the closing occurs, where the Closing Officer conducts a paper or electronic closing, or a hybrid combination thereof. In such a closing, paper documents or a computer workstation (e.g., personal computer) with a signing screen are waiting in the closing room. For electronic closings with electronic recordation, an auto-request goes out to the abstract company to run out the title at the time of the closing. The abstract company can reply by email or by going to eSys Client Services—perhaps through a hyperlink in the request email—and set a flag indicating that title is clear to the point of closing.

When the closing parties arrive, funding is reviewed and modifications to anticipated funding request are made if required. Next, externally prepared original paper documentation is collected and scanned into the eSys Virtual File Folder™. If the closing is electronic, documents are sent on to the electronic document storage and management facility (possibly leaving a pointer to its location within the Virtual File Folder™). The Closing Officer then reviews Title Exceptions and verifies that all curatives have been satisfied or guaranteed and that those curatives/guarantees are processed into the eSys Virtual File Folder™ and, as required, into the electronic document storage and management facility. As customized per client requirements, title exceptions and commitment conditions could be dynamically displayed on the user interface screen during the closing to facilitate curative verification and post-closing tracking of guarantees, for example.

The parties may then review paper documents and execute or if electronic, documents are reviewed on-line and electronically signed, witnessed, and notarized as required using a third party electronic signature, storage and management method. Funds are exchanged, subsequent to execution of the closing documents, in the form of paper checks, electronic funds transfer, credit card or potentially any ATM method by which funds may be transferred.

It is contemplated that in some situations, in the event that the closing has issues which must be addressed within a given time frame to finalize the closing, the Closing Officer may set the file status to "On Hold" until such conditions are met. eSys manages the On Hold state as follows. Initially, data required to close is input into eSys with a Required to Close by Date. The system then changes the File Status to "Closing On Hold" which automatically sends notice to appropriate parties, for example: Lender, Accounting, Title Agent, Borrower/Attorney, Seller/Attorney, and Closing Officer (as a reminder) detailing the conditions which must be met and the deadline for meeting them. Thereafter, eSys' daily auto-report notification to the Closing Agent/Title Agent will detail this On Hold closing until its state is no longer On Hold.

Once all Parties are satisfied that commitment and title conditions have been satisfied, all documents are executed, and all funds have been exchanged appropriately, the Closing Officer sets the file status to Closed Normal. To complete the closing, the Closing Officer clicks on the "Closed" button (FIG. 19 button 1836 "Closed") and the File Status is updated to "Closed Normal". In an electronic closing, eSys might at this status automatically update an external system status. For example, setting the file to Closed Normal in eSys might set the file status to "Loan Documents Executed" in a third party electronic document storage and management system via a custom API interface.

When the closing occurs without going On Hold (Closed Normal), in a paper closing or hybrid electronic closing, where the documents requiring recordation are executed on paper and sent to the County Clerk's office for recordation in a traditional manner, the parties leave the closing table. In an electronic closing with electronic recordation, the parties may stay at the closing table during the recordation process so funds can be disbursed at the time of closing. The following details one embodiment of eSys electronic closing recordation in conjunction with an electronic document storage and management facility and process:

First, the Closing Officer would check to see that title had been run out successfully, and then push the Recording button (FIG. 19 button 1838 "Record") where the File Status would be reflected as "Recording" and eSys would automatically execute the following tasks:

(a) send recordation document data, as may be required, to an electronic document storage and management system from the existing data within eSys for data accuracy and consistency. eSys might also set the third party electronic document storage and management system's status to reflect this progress in the process, for example "Recordation in Process" via a custom API interface;

(b) retrieve the recordable sealed executed electronic documents from the electronic document storage and management facility using a custom API interface and place them in a secure location available to the County Recorder along with any data the County Recorder may require; and (c) auto-notify (perhaps with a hyperlink to the documents and data) the County Recorder that the documents and data are there waiting for retrieval and recordation.

The County Recorder then retrieves the documents and data, unseals the documents, records the documents, reseals the documents and sends them with the recording information back to eSys via email or via Client Services. Subsequently, eSys puts the sealed recorded original documents back into the electronic document storage and management system, sets that system's status as appropriate (for example, "Recordation Complete" and/or "Loan Closed and Funded") and advances the eSys file status to Closing Recorded. For a file where paper recordation occurred, closing information is entered into eSys in one of the following ways:

(a) County Recorder or Abstract Company sends email or fax to Closing Officer with Recording Data;

(b) County Recorder or Abstract Company calls Closing Officer with Recording Data; or (c) County Recorder or Abstract Company directly enters the Closing Data into eSys Client Services and clicks on the Recorded button (File Status would now be "Closing Recorded") which auto-notifies parties appropriately.

The Closing Recorded event is established in eSys via one of the above methods and auto-notifications are then sent to Borrower/Attorney, Seller/Attorney as notice that funds can be disbursed. Notice is sent to the Title Agent as a request for preparation of Title Policy and to the Closing Officer as notice that funds may be disbursed.

Once the Title Agent receives request (auto-notification) to prepare title policy(ies) with hyperlink to the file's documents, including the marked up title report, curatives and guarantees in the Virtual File Folder™, and prepares the title policy(ies). The Title Agent creates title policy(ies) as follows:

is (a) Title Agent goes to the Virtual File Folder™ to review relevant file documentation, such as the marked up title report, curatives and guarantees;

(b) Title Agent goes to the Post Closing screen (or refers to the auto-notification of recordation received) and reviews the recordation information;

(c) Title Agent goes to the Title Data screen and enters the Loan and/or Owner Policy Number(s);

(d) Title Agent goes to the eSys Title Exceptions screen and selects the Create Policy button (FIG. 23 button 2170 "Create Policy"). This preserves the title report exceptions and makes them Read Only and copies the title report exceptions to the Loan Policy exceptions (and to the potential Owner Policy exceptions). The title agent edits the exceptions for the policy (ies) and updates them.

The Title Agent can then view the Loan Policy components in the Document Tree, for example, the policy jacket, endorsements, Schedule A, Schedule A Description, Schedule B, privacy notice, etc.), and then print them out as a package for the title validating officer to sign and then post to the Virtual File Folder™ Alternatively, for an electronic closing, the Title Agent selects the Post Title Policy button and the File Status is advanced to "Title Policy Posted" and eSys sends the title policy to the electronic document storage and management system for electronic signature and storage. Auto-notice that the policy(ies) are ready for electronic signature would go to the title validating officer.

Once the Title Validating Officer receives notice that the title policy(ies) is(are) ready to issue, the validating officer would sign the paper documents for a paper closing. For an electronic closing the validating officer would review policy (ies) on-line and execute them on-line. Once the Title Validating Office has completed this task, he/she selects the Issue Policy button (FIG. 19 button 1840 "Issue Policy") and the File Status is updated to "Title Policy Issued." This action may also trigger a third party electronic document storage and management system status to reflect auto-notification to appropriate parties as prescribed per client profile, for example, the Title Company, the Borrower/Attorney, the Lender, the Title Agent and the Processor.

Figure 36:
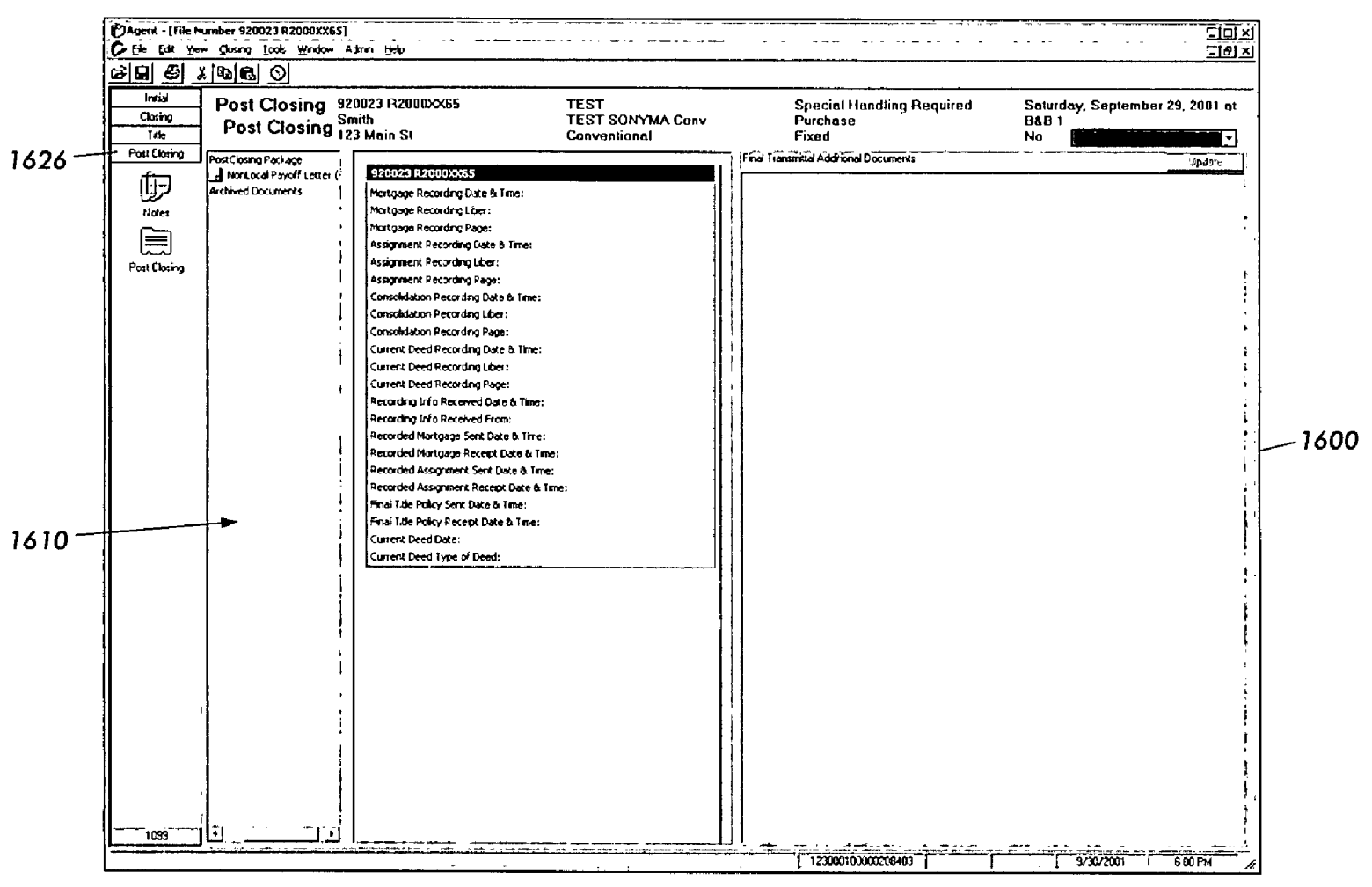

Referring next to FIG. 36, there is depicted the screen 1600 reflecting post-closing information associated with the transaction. eSys post-closing is a logical extension of eSys Pre-Closing, Closing and Title Processing processes. When used together, all relevant pre-closing data is shared with post-closing and available to the post-closing coordinator and, potentially, any and all participants on post-closing task and issue processing. eSys post-closing can be used independently of pre-closing processing, providing process management, tracking, auto-notifications, transaction history and a client/program/file specific presentation of only those post-closing tasks and processes prescribed by the client and relevant to a particular file. eSys post-closing may also be used as a high level management tool to monitor and auto-notify third parties of actions required, or it can be used to process post-closing tasks and issues.

Examples of post-closing tasks include, but are not limited to: Disbursements (escrows, fees, tax payments due at closing, title premiums); Payoffs, Mortgage Discharges; Estimated Taxes; Completion Escrows; Document Transmittals; and 1099s. Similarly, examples of post-closing issues include: Closing Package Incomplete; Errors in Closing Documents; Title Package Incomplete; Errors in Title Documents; and Funding/Disbursement Issues.

The post-closing process may be entirely web-based and accessible via eSys Client Services. The post-closing process uses the same methods as eSys pre-closing processes, including eSys business rules, auto-communications, and post-closing process statuses to drive and manage the post-closing process to completion of all tasks and resolution of all issues. Moreover, the system keeps all participants informed, provides real-time, on-line reporting and a centralized transaction history.

Examples of post-closing Processing Statuses include:
File Created;
File Closed Normal;
Closing Recorded;
Mortgage Funds Disbursed;
Final Title Policy Received;
Recorded Docs Received;
Post-closing Tasks Exist;
Post-closing Tasks Completed;
Post-closing Issues Exist;
Post-closing Issues Resolved;
Mortgage Docs Transmittal Sent;
Title Transmittal Sent; and
Final Recorded Docs Sent.

Figure 37:
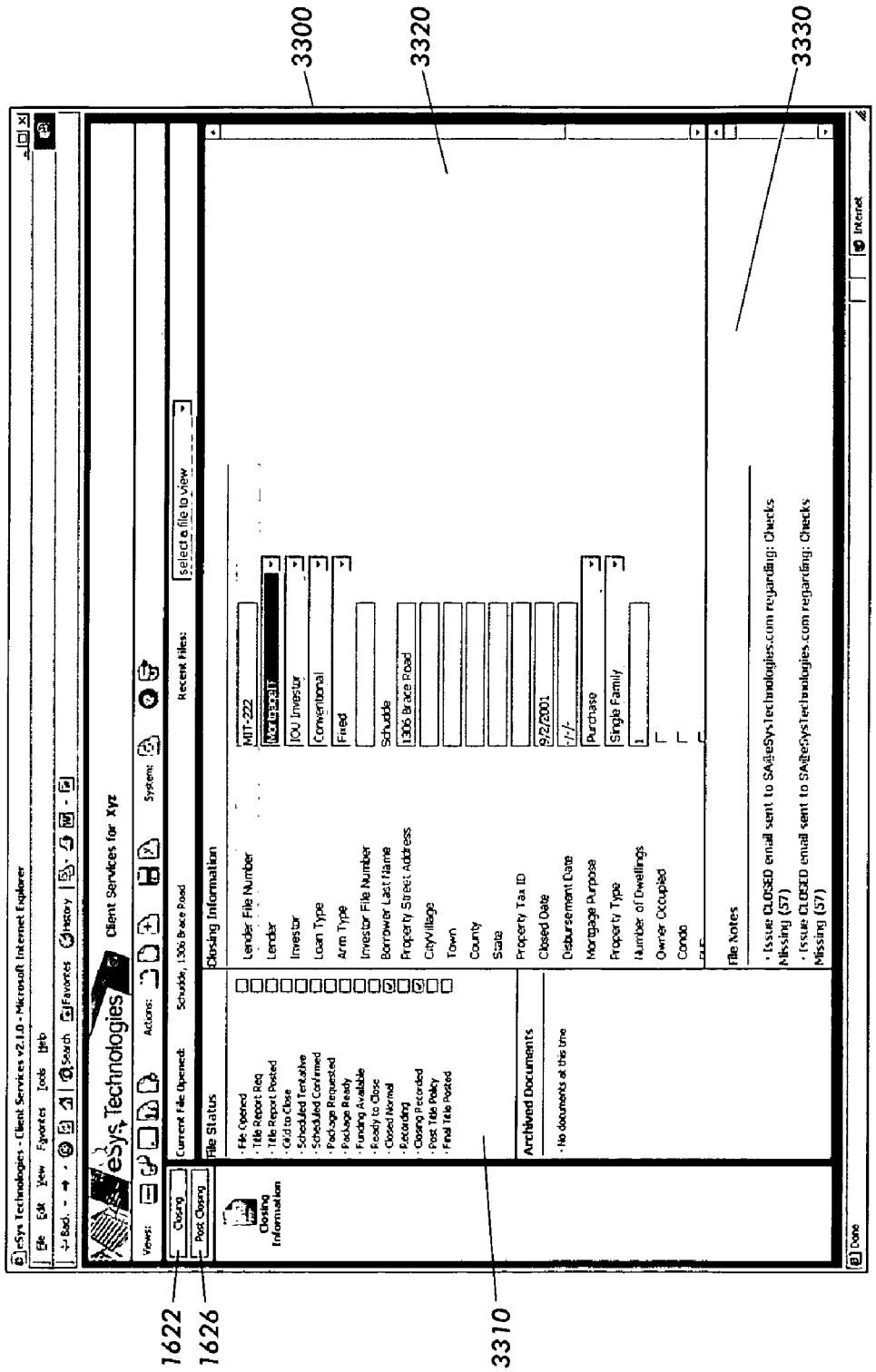
Figure 38:
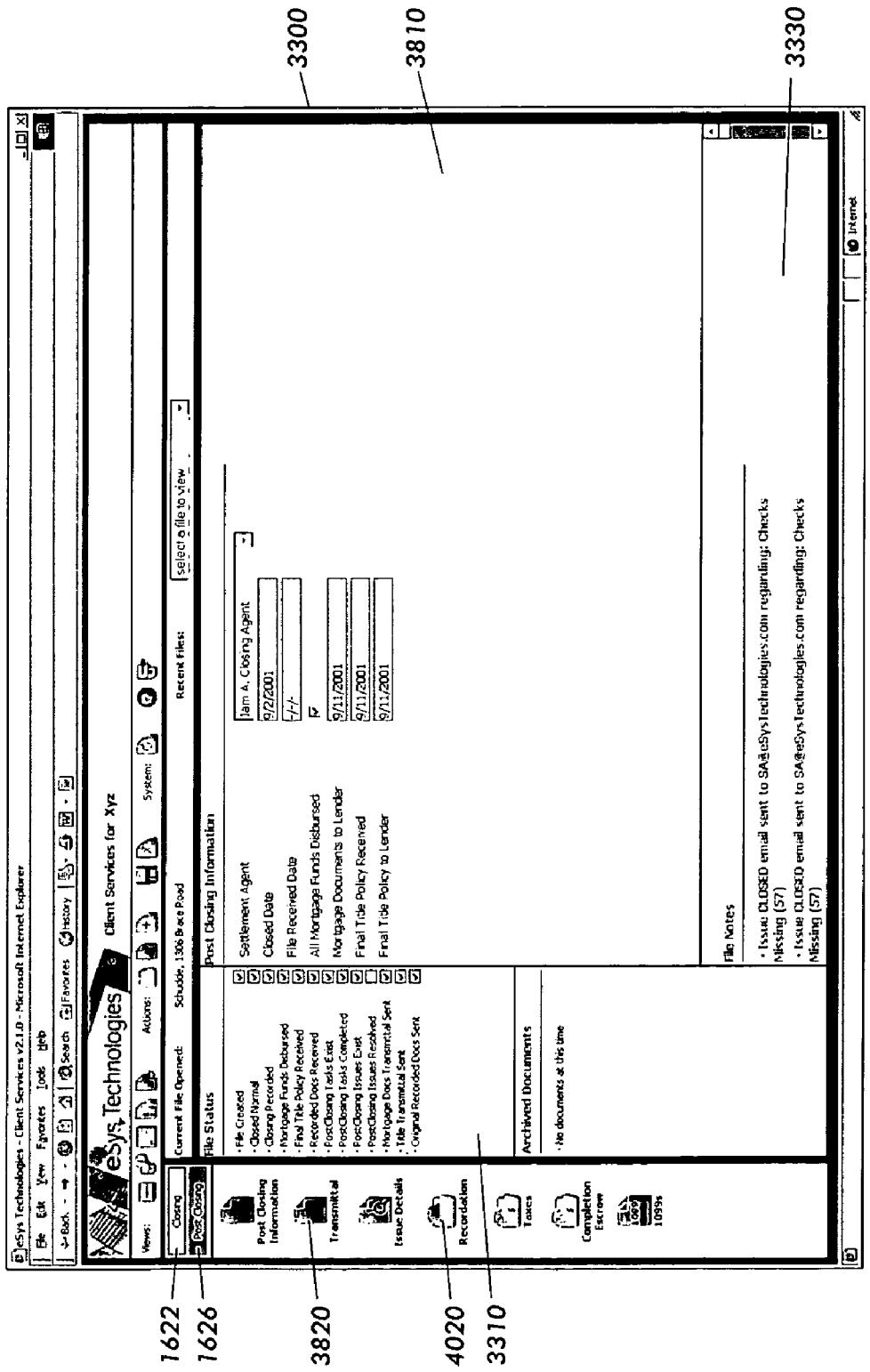

The eSys Post-Closing system is particularly designed to be used either independently of the Pre-Closing process, or in conjunction with those processes. A first embodiment contemplates pre-closing and/or Title Processing that have been done in eSys and a Closing Officer working through post-closing Tasks and Issues. Referring to FIG. 37, upon receipt of the Closing Recorded notice, the Closing Officer or Post-Closing Coordinator may utilize the hyperlink to the file to go directly to the post-closing section of eSys Client Services to review the file's status. The file will already have been created in eSys post-closing because it existed in the pre-closing section of eSys and attained a status of Closed Normal. As depicted in FIG. 38, the web interface screen 3300 is laid out in a manner similar to screens 1600. With Closing and Post-Closing selection bars (1622, 1626) along the left, the user is able to select the portion of the process to be displayed. Upon selecting a particular file, the File status window 3310 is displayed along with the closing information window 3320 and a File Notes window 3330. The File Created and Closed Normal status boxes in window 3310 are already checked, as well as the Closing Recorded status, assuming the recording information on all file relevant recordable documents has been entered into eSys.

A second embodiment of the system contemplates eSys being employed in a post-closing mode only, where Pre-Closing and Title processing were not done through eSys. The post-closing Coordinator would create the file in eSys post-closing and enter enough information to manage and/or perform post-closing Tasks and Issues as defined by the client profile. The information required could be manually entered or imported from third party processing systems. For example, all of the Lender, Investor, Program, Municipality-based administrative table fields that define the Business Rules required would need to be populated, along with transaction specific data which would define the existence of a post-closing Task, for example, a 1099 is required, or estimated taxes were collected, or a completion escrow is being held.

Any file processed through eSys would already be visible on the eSys Closing Calendar (FIG. 24). A file created in eSys Post-Closing would also be visible on the eSys Closing Calendar. Hovering over an entry on the calendar will reveal summary data per client profile. The calendar entry acts as a hyperlink to the transaction detail within eSys. Implementation of eSys post-closing is entirely customized to the Client's requirements per the client profile. A detailed description of one implementation of eSys Post-Closing processing where Pre-Closing and Title processing were done through eSys but Post-Closing is being done through a Post-Closing Coordinator follows:

The file has reached a status of Closed Normal, recordable documents have gone on record and a final title policy has been requested. The Post-Closing Coordinator receives email notification that these events have occurred as well as the physical file containing the hard copy closing documents if a traditional paper closing has occurred or access to copies of the electronic closing documents within the eSys Virtual File Folder™ Archived Documents and possibly pointers or hyperlinks to the original executed electronic documents stored within an electronic document storage and management facility. The Post-Closing Coordinator uses the hyperlink to go directly to the file in eSys Client Services. In the Closing section of eSys Client Services, the Post-Closing Coordinator can review relevant transaction specific Pre-Closing file data on the Closing Information card (e.g., FIG. 37) which defines the transmittal and Post-Closing task requirements for that specific transaction. The Post-Closing Coordinator then reviews the data against the available closing and title documentation, performing a quality control check. The Post-Closing Coordinator then clicks on the Post-Closing navigation bar and is presented with several Post-Closing card options and a Post-Closing status grid as depicted in FIG. 38.

Referring to FIG. 38, the Post-Closing screen 3300 includes, in the web-based embodiment, an Information Card 3810 that contains client profile customized data fields such as the Settlement Agent, the Closed Date, File Received Date and other key Post-Closing dates documenting the Post-Closing status and useful for Post-Closing status and tracking of tasks and issues.

Figure 39:
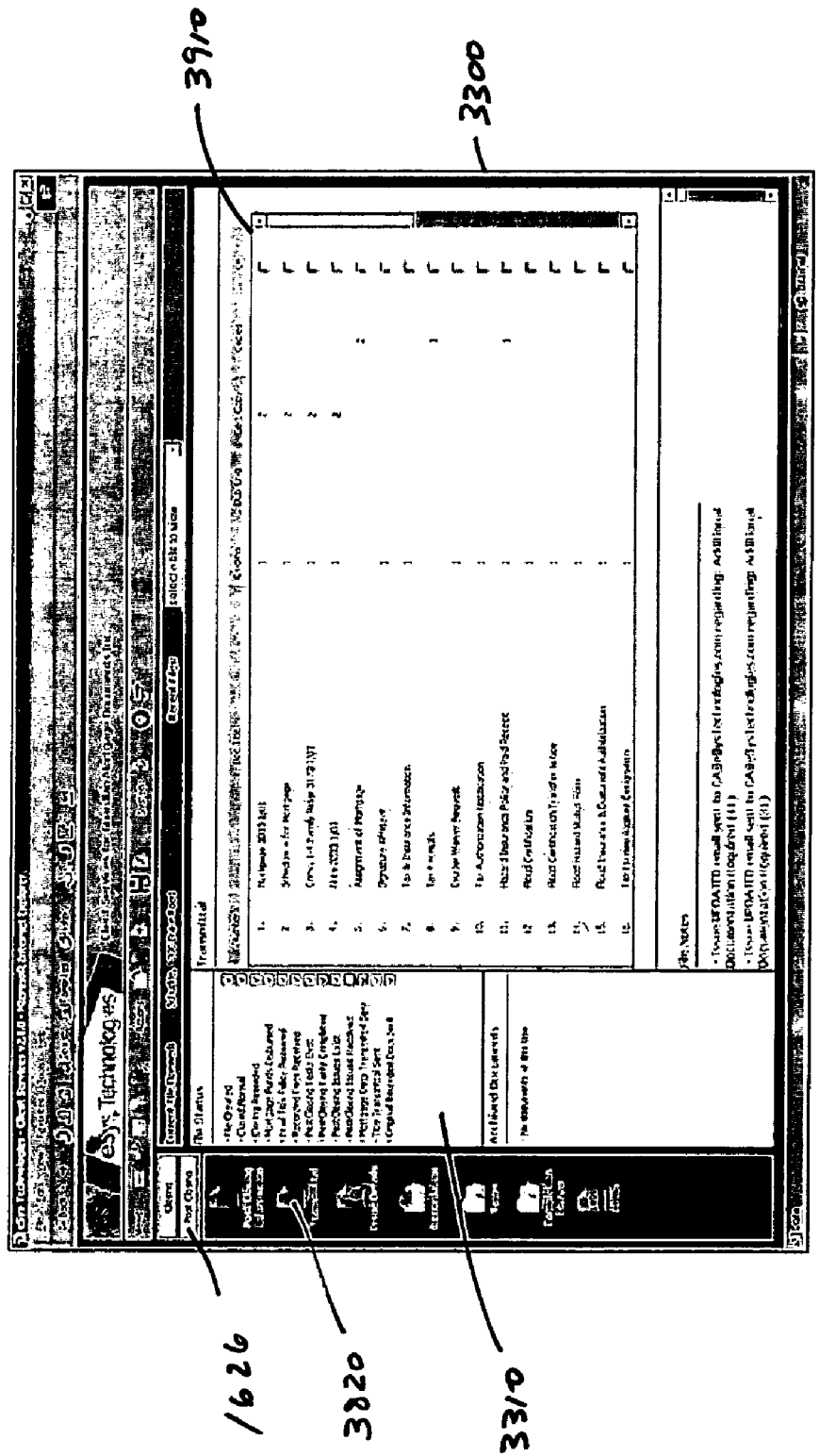

Moving to the Transmittal Screen of FIG. 39, accessed by a user selection of Transmittal Icon 3820 (e.g., FIG. 38), the screen automatically supplies the file reviewer with a comprehensive Lender/Investor/Program prescribed document checklist 3910. The reviewer is presented with a dynamic display including, for example:

1. required items (including the form numbers and revision dates) relevant to the specific file being reviewed in the Lender/Investor prescribed order;
2. the required number of originals, duplicate originals, copies, certified copies, etc. of each item; and
3. a checkbox indicating completion for each item.

Transmittals are Lender/Investor/Program specific and can be easily custom created for each Lender/Investor/Program. It would be possible to associate more than one type of transmittal with a file, for example, if a Post-Closing Coordinator were required to prepare separate transmittal packages for the Lender and Investor, eSys could display each separately and relieve the reviewer of the mundane and time consuming task of determining which originals, copies, etc. in what quantities go into which transmittal package.

The transmittal contains documents that appear or do not appear depending on a file's parameters. Data input fields throughout the eSys Post-Closing screens determine which documents appear in the transmittal listing. For example:
1. if a file is a purchase, documents used only for refinances will not appear in the list;
2. if a file is non-escrow, documents applicable only when there is an escrow will not appear;
3. if a file is a fixed conventional in NY the Note 3233 1/01 and Mortgage 3033 1/01 would appear; and
4. appropriate riders will appear based on the program and property type; matching notes will also appear based on program.

It should be noted that:
1. most of the determining fields are data that would be automatically captured for files where pre-closing processing occurred in eSys or could be automatically captured where pre-closing processing occurred in other systems if some level of data exchange is implemented; and
2. the transmittal display is based on eSys intelligent agent document package rules and logic, and is tied to eSys document production and third party document production package requests.

As the Post-Closing Coordinator reviews the file against the transmittal, commitment and title conditions and Post-Closing data is entered into the screens, eSys Post-Closing status and status actions are triggered and combine with Intelligent Agent Business Rules to feed auto-alerts, auto-notifications, tracking and reporting. For example, when recordation information and/or Original Recorded Documents are received form the County Clerk, the reviewer would select the Recordation icon 4020 and enter information into the Recordation screen of FIG. 40, which will determine file recordation statuses and may trigger auto-notifications and/or alerts in eSys or in eSys reports as prescribed per the client profile.

Figure 40:
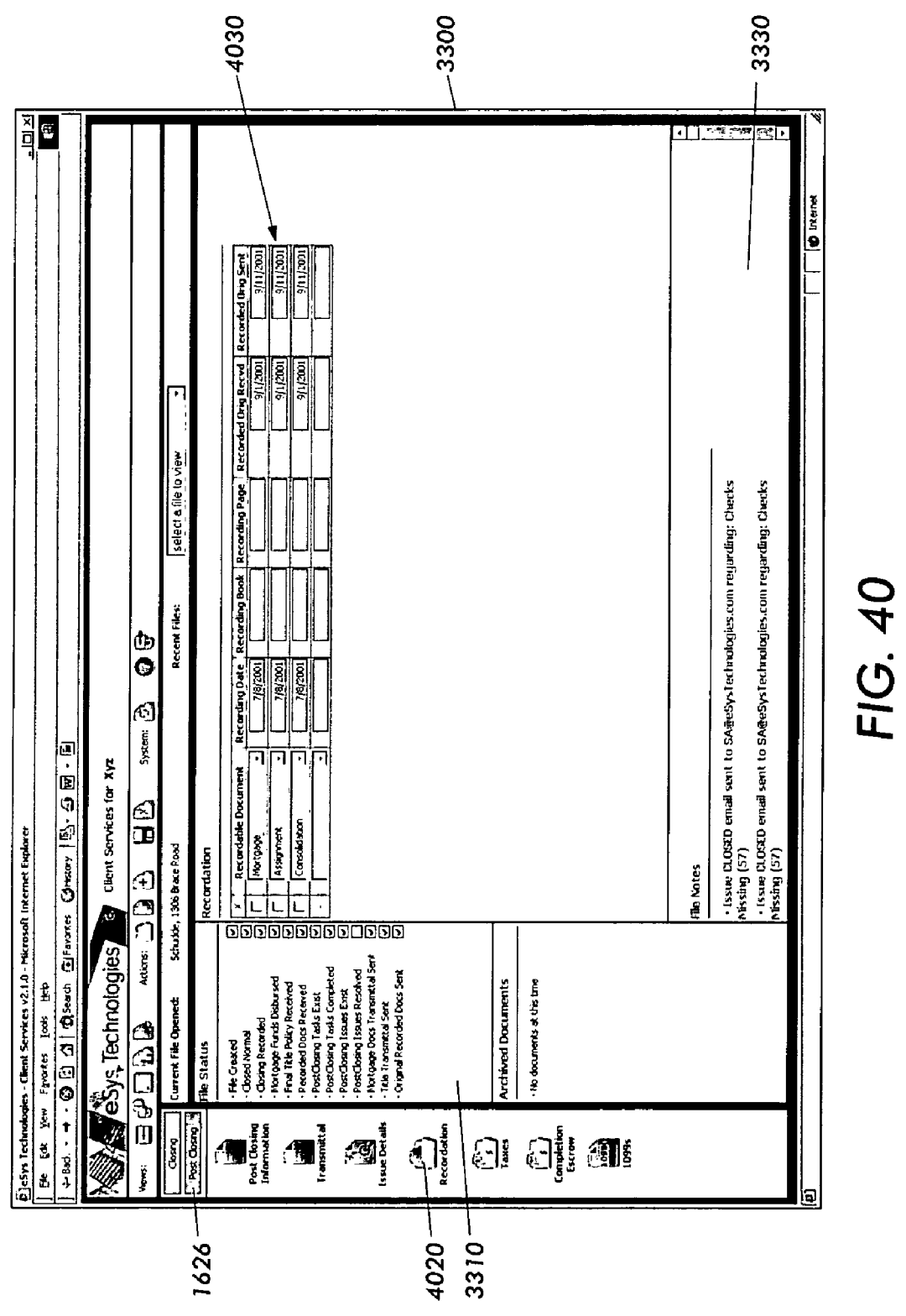

FIG. 40 illustrates an exemplary web interface screen 3300, with the Recordation information in a grid presentation format 4030 supporting an unlimited number of recordable documents. The documents displayed are selected from a lookup table customizable per the stored client profile and can easily encompass original as well as correction versions of recordable documents. The data gathered may include the recording date, book, and page as well as the date the recorded original was received from the County Clerk and the date it was sent to the Lender/Investor. The grid can be automatically populated with the recordable documents which would normally be required for a specific transaction, based on the same rules and logic which govern the dynamic transmittal and allow for additional recordable documents and data to be entered by the reviewer or be left to the reviewer to manually enter all recordable documents and data. If a recordable document is entered into the grid and the On Record date has been entered, the Post-Closing status "Closing Recorded" flag is set. The status of the flag is indicated by a checkbox displayed adjacent the status field in region 3310. If a subsequent recordable document is entered into the grid and no On Record date is entered, the Post-Closing status "Closing Recorded" flag or indicator is cleared. Similarly, if a recordable document Recorded Original Received date is entered, the Post-Closing status "Recorded Docs Received" flag is set. And, if a subsequent recordable document Recorded Original Received date is not entered, the Post-Closing status "Recorded Docs Received" flag is cleared. This provides the reviewer with an at a glance determination as to whether or not the closing is on record or if there are any outstanding recordation issues.

Figure 41:
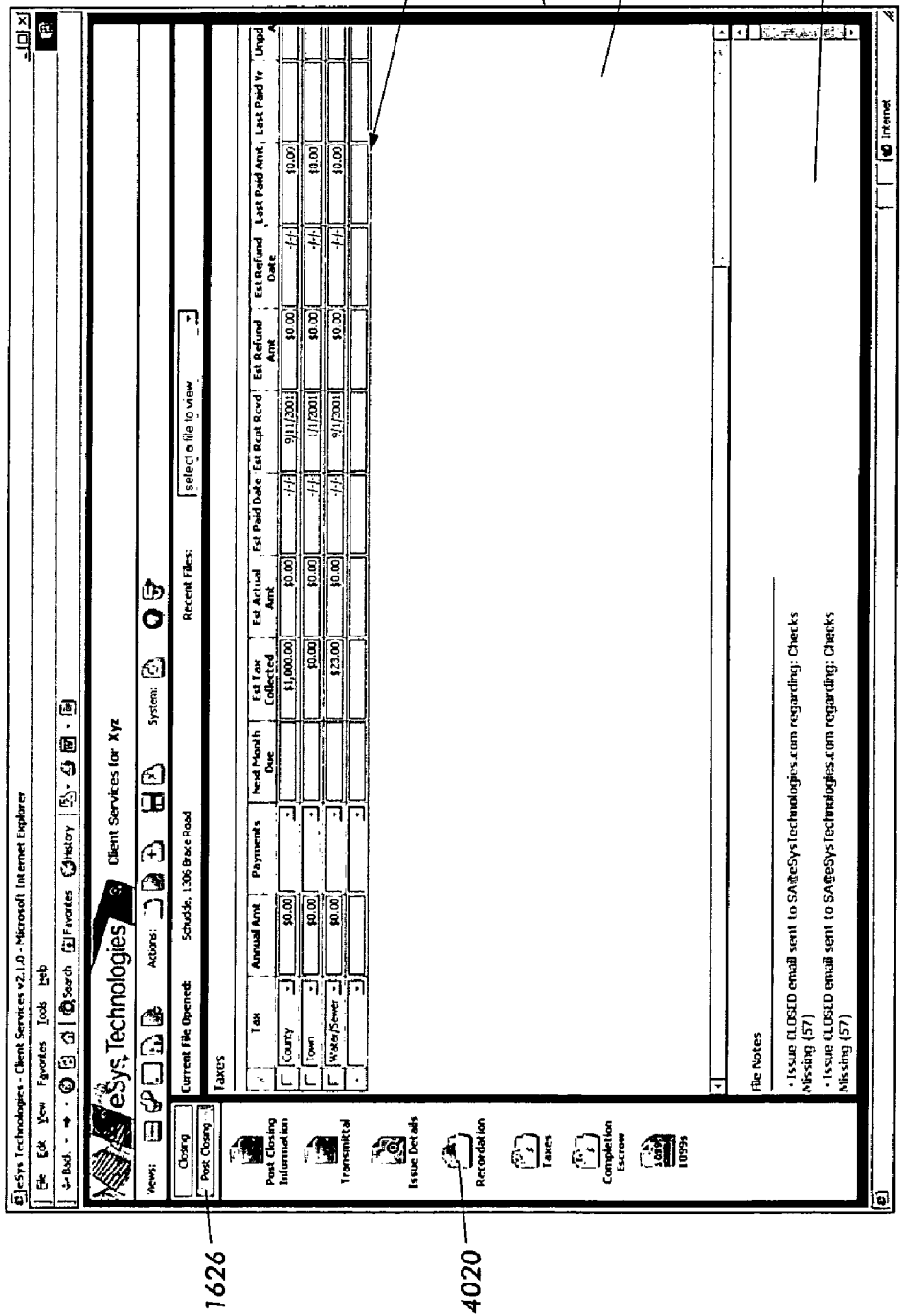

The reviewer may also be expected to monitor and track Post-Closing tax payment issues and activities. Referring briefly to FIG. 41, the Post-Closing Taxes screen is illustrated. Screen 3300 includes a grid 4130 in window region 4132, that supports an unlimited number of potential tax types selected from a lookup table customizable per the client profile. Grid 4130 can be auto-populated based on eSys municipality based rules and the transaction's parameters or it can be left open for manual entry by the reviewer. The data fields captured may include whatever amounts, due dates and payment method information the client desires to track and can trigger eSys Post-Closing status and status actions. For example, in one implementation Estimated Taxes Collected information is entered. If an Estimated Tax Amount Collected is entered into the grid and the Estimated Tax Receipt Received Date is not entered, this contributes to the criteria to set the Post-Closing Tasks Exist status flag (see e.g., FIG. 40, region 3310). If that were the only Post-Closing Task existing on the file and the reviewer were to enter the Estimated Tax Receipt Received Date into the grid, the Post-Closing Tasks Completed status would be set. Subsequently, if another Estimated Tax Amount Collected were entered into the grid with no Estimated Tax Receipt Received Date, the Post-Closing Tasks Completed status would be cleared.

During review of the file the Post-Closing Coordinator may discover Post-Closing issues or be notified of Post-Closing issues by other parties. The Issue Details screen illustrated in FIG. 42 includes another grid presentation 4230 in response to a user selection of Issue Details icon 4210. Again, the grid display 4230, in scrollable window 4220, supports an unlimited number of potential issues, selected from a client profile customized lookup. Post-Closing Issue data might include the Correction, Instructions, Resolve By Date, ReSent Date, Received Date and Issue Closed Date. When an Issue is entered into the grid, the system would automatically enter the Issue Open Date. Once an issue is entered into the grid it might be set up so that it cannot be deleted, but may be flagged Not Applicable. If an issue exists in the grid with no Issue Closed Date, the Post-Closing status Post-Closing Issues Exist is set. When all issues in the grid have an Issue Closed Date, the Post-Closing status Issues Resolved is set. Subsequently, if another issue is entered into the grid with no Issue Closed Date, the Post-Closing status Issues Resolved is cleared. Whenever an issue is entered or edited, an auto-notification may go out to appropriate parties per the client profile, for example, to the Settlement Agent, detailing the Issue, the actions required, the resolve by date and status of that issue.

Figure 43:
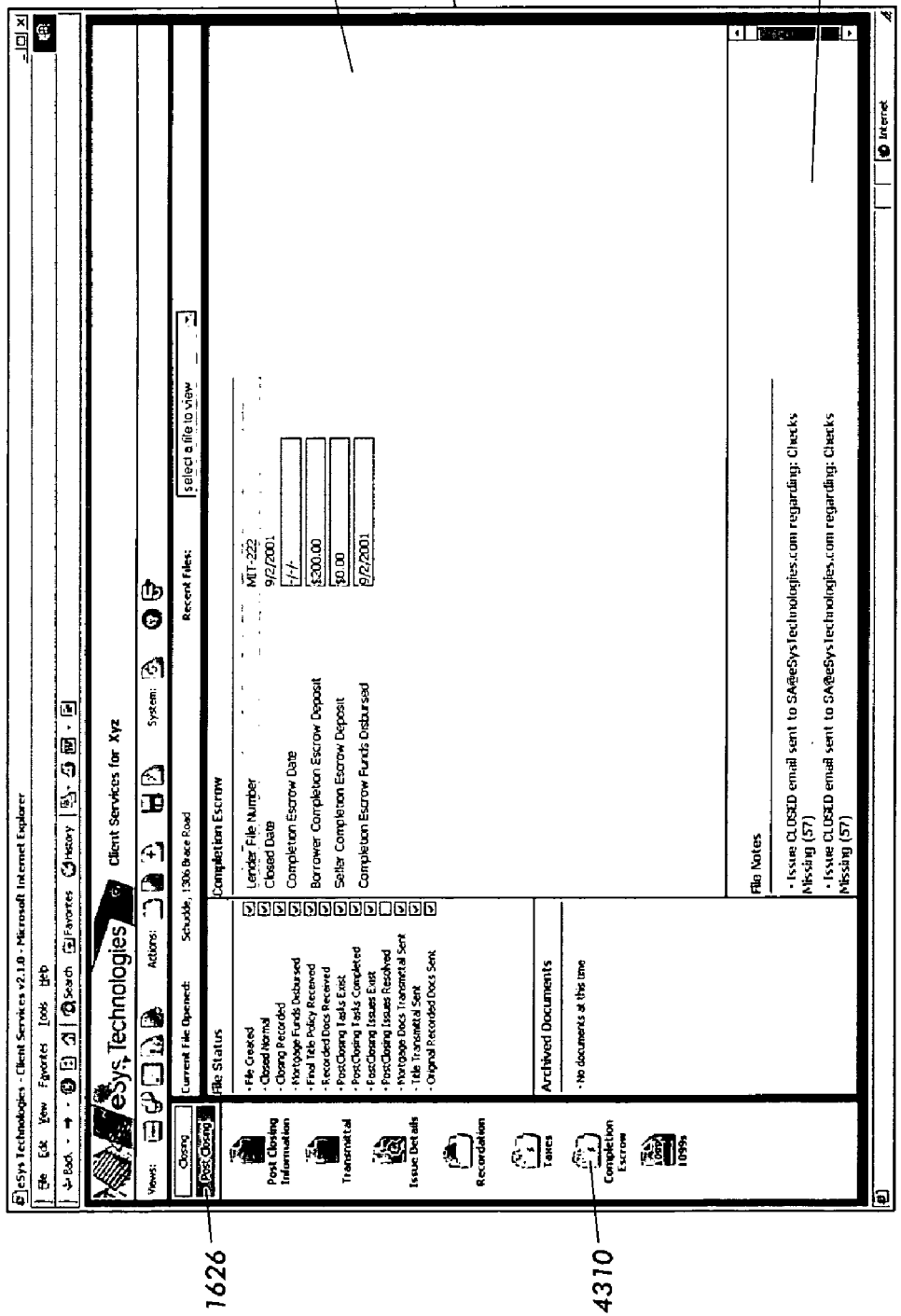
Figure 44:
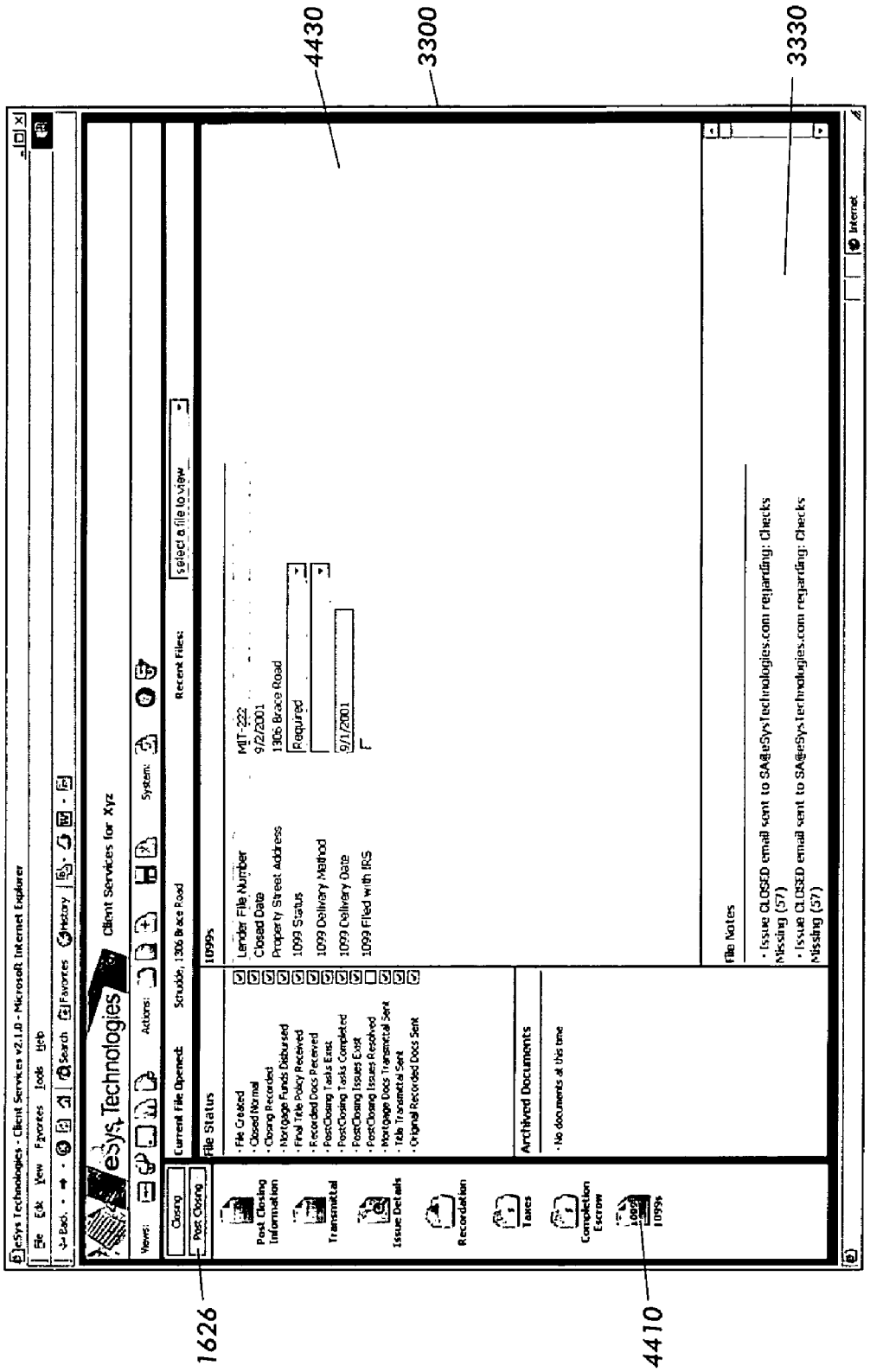
Figure 45:
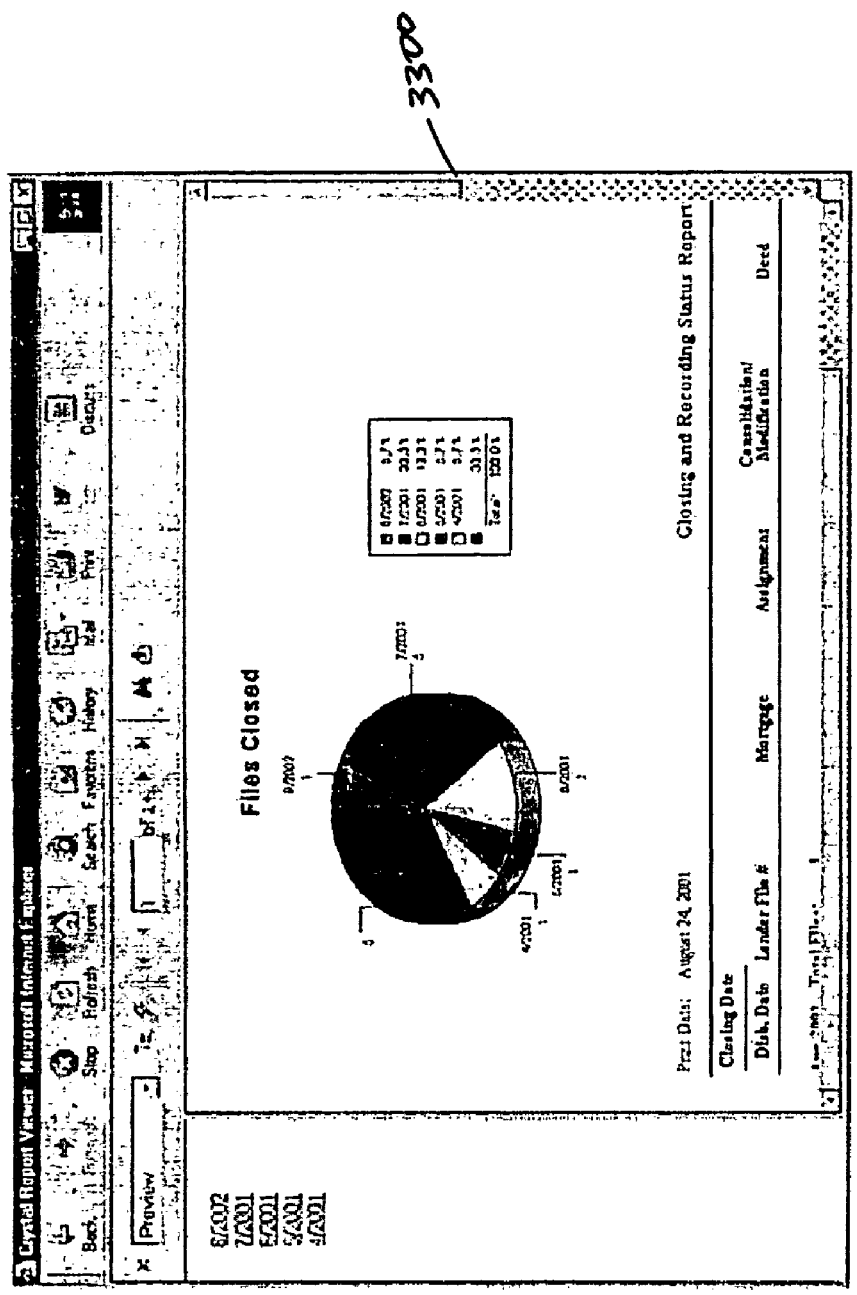
Figure 49:
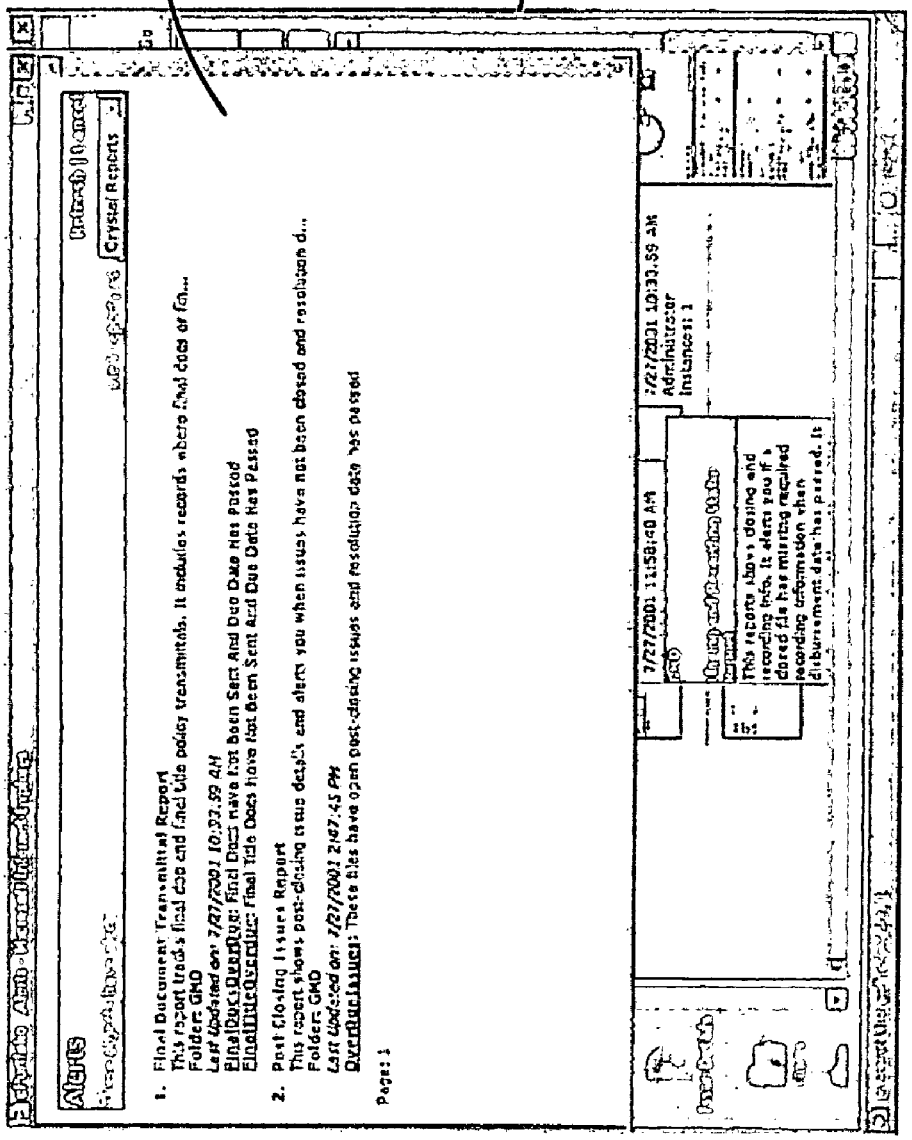

Additional Post-Closing tasks the Coordinator may be expected to monitor or perform may involve Completion Escrows or 1099s. Examples of screens supporting data, tracking and history of these types of Post-Closing tasks are represented by FIGS. 43 and 44. These and similar Post-Closing task screens are customizable per client profile and contribute to the Post-Closing Tasks Exist and Tasks Completed statuses and status actions as well as eSys alerts and reporting. For example, by selecting the Completion Escrow icon 4310, the Post-Closing processor is able to track Completion Escrow disbursement deadlines, as seen in FIG. 43, from information displayed in region 4330. The information displayed is based on eSys auto-notification reports and either verifies that work and disbursements are or will be completed by deadline (if completion escrow funds are being held by Closing Agent) or notifies Lender that Completion Escrow deadlines are imminent.

eSys Post-Closing status, as depicted for example in FIG. 38, provides the reviewer with the status of Post-Closing processing on a per file basis at a glance. eSys real time web reporting provides a means to address Post-Closing tasks across multiple files. For example, a report could show all files where estimated taxes were collected but not paid and alert the reviewer as deadlines approach or pass, for example an alerts screen 4900 as depicted in FIG. 49. Similarly, a report could reflect the number of files closed over a given period of time. Such a report could be done using Crystal Reports, as depicted in FIG. 45. Furthermore, each file listed in one of the reports could have a built in hyperlink, for example, the LenderFileNumber, which would take the reviewer back to eSys Post-Closing, to that specific file, and directly to the Taxes screen where data could be edited and then return to the report to work through the list of files requiring Post-Closing Tax processing. This would enable high volume processing based on Task type or Tasks versus Issues instead of single transaction based processing.

The Post-Closing Coordinator continues to identify, receive, monitor and act on Post-Closing tasks and issues until all have been completed or resolved, all funds have been disbursed, and all transmittals have been sent and accepted. eSys Post-Closing activities, whether manually or automatically logged into the transaction Notes, become part of the transaction's Virtual File Folder™ along with any Pre-Closing transaction data and history that may have been part of the transaction. The Virtual File Folder™ could be available beyond the immediate Post-Closing period, for example, through the life of the loan, and has the potential to be utilized during sale to the secondary market and by secondary market participants.

Figure 46:
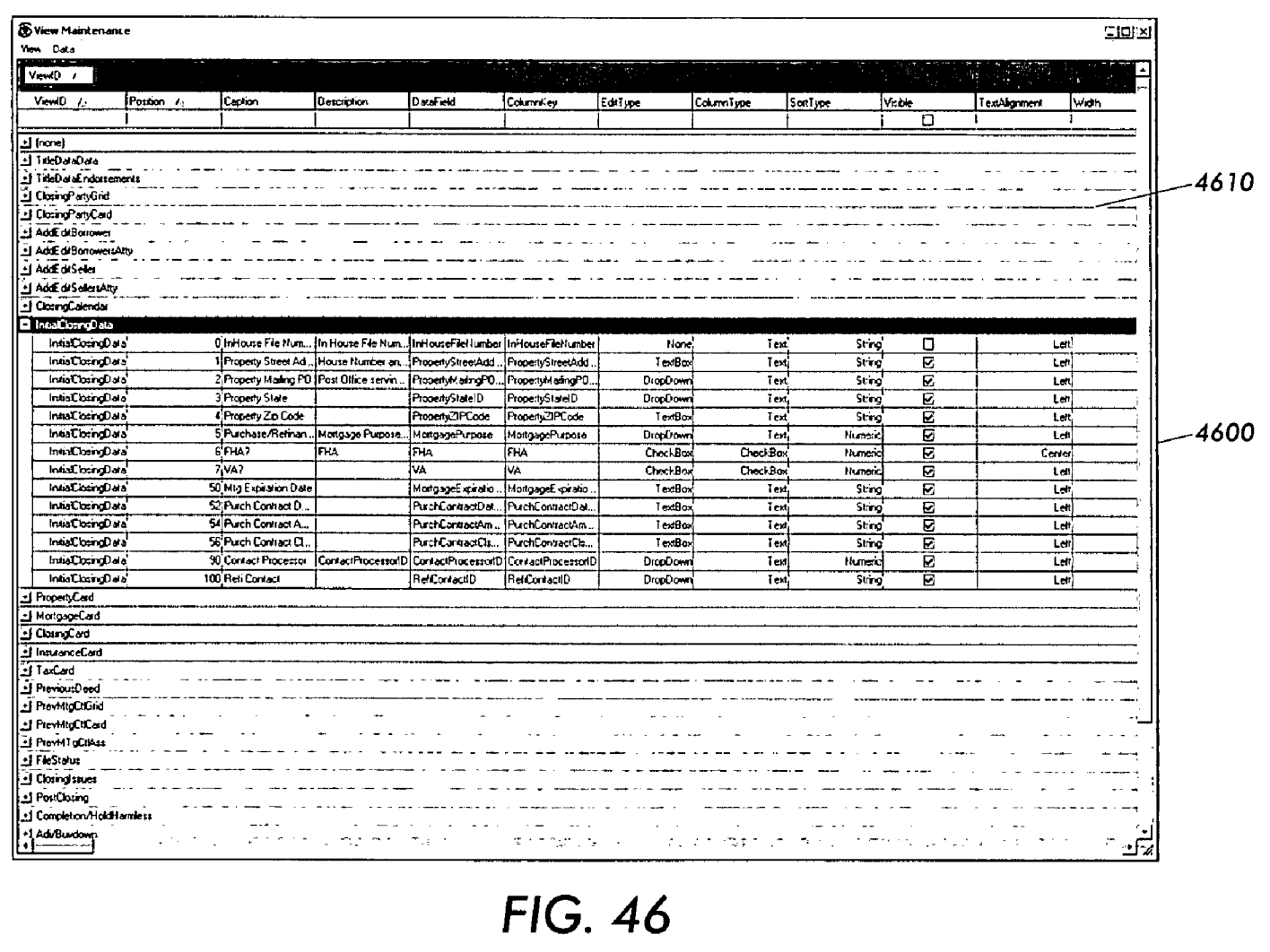

View maintenance screens, as depicted for example in FIG. 46, illustrates a user interface screen 4600, including database table 4610 that is employed to update or modify the information provided in the various screens previously described herein. This screen includes the various instructions that dictate how the cards described herein will appear. The instructions include captions, field ordering, card layout, etc. The table may also include help caption information or other details that are displayed at a user's request. Screen 4600 also includes data formatting relative to user input to control, for example, the format of information being input via tables (e.g., data in MM/DD/YYYY format).

Figure 47:
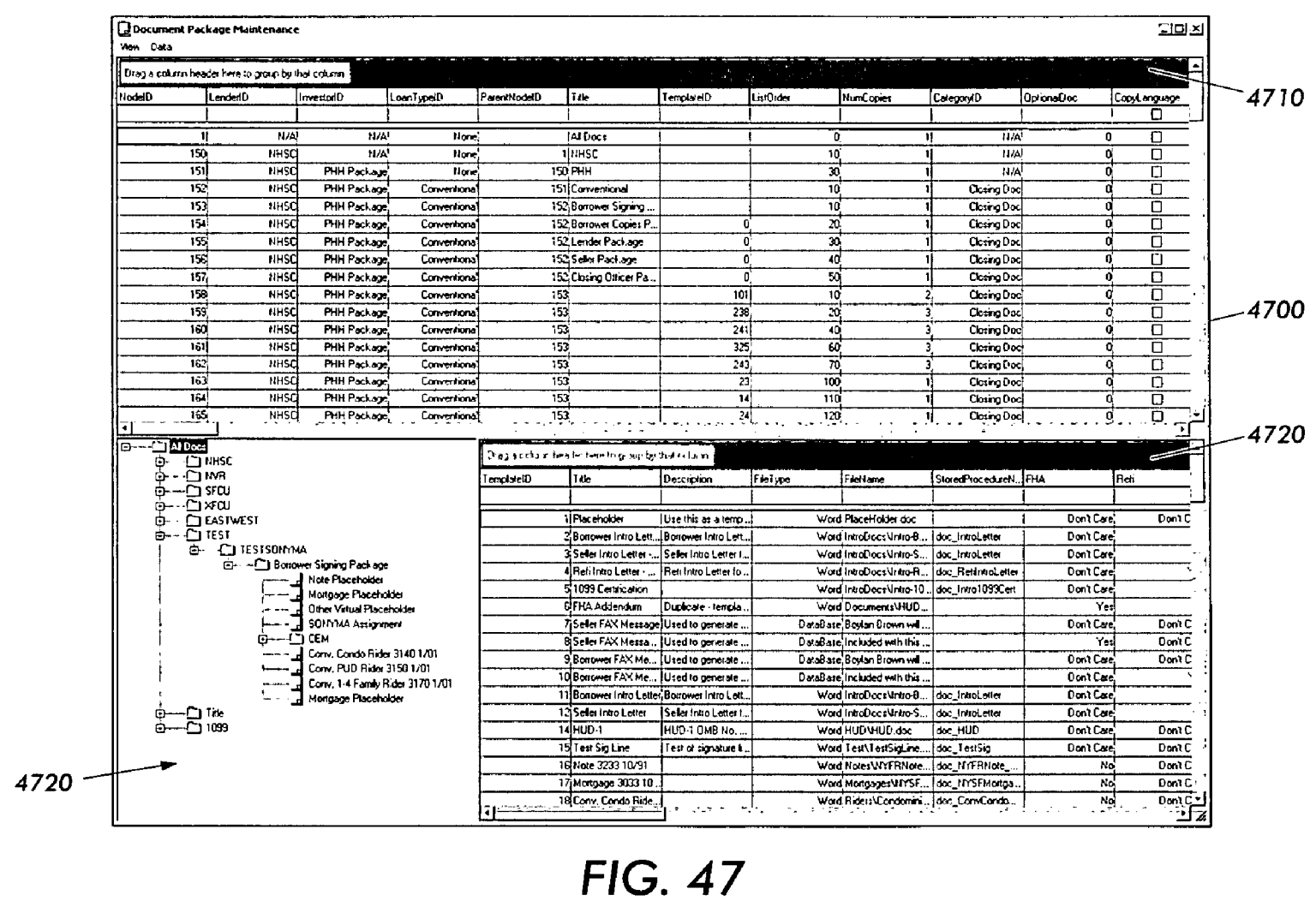

Similarly, FIG. 47 illustrates the maintenance screen 4700 for the document package, where the documents associated with a particular loan package are indicated. The data maintained within the tables depicted by screen 4700 are what is used to build the document trees 4730, on a loan-offering basis.

Features & Functionality

The following is a list of features and functionality found in the eSys Mortgage Centerware™ system, the real estate transaction embodiment of the present invention:

Intelligent Transactions—system knows about Lenders, Investors, Loan Types and Programs and will modify itself accordingly.

The system is divided into Process Areas commensurate with the legal or other services being provided. For example, in a real estate closing system, the process areas might include Initial, Closing, Title and Post-Closing as previously described; with process area specific data groups, entry screens and document trees to facilitate processing, yet tight integration amongst all areas.

The preferred system architecture employs Intelligent Document Trees that are customized and/or self-modifying based on Process Area and file specifics: Lenders, Investors, Loan Types and Programs, thereby adding and removing documents and packages appropriately.

The system has Document Packages within the document trees that automatically create the correct documents in the correct order for the Lender/Investor/Program, with the appropriate number of copies. For example, in the Closing Process Area, the document tree is broken down into the following packages: Borrower Signing, Borrower Copies, Seller, Lender and Closing Officer. The document tree structure, branches and nodes, is fully customizable as required and is implemented via database tables such as Document-Package (810 in FIG. 8) in conjunction with Templates (812 in FIG. 8). Each package is preceded with a descriptive banner on printing. Packages may be printed together or separately. Individual documents may also be printed.

As briefly described herein, the system may include on-screen, color-coded data entry. For example, the color blue has been used to indicate those HUD form numbers that were calculated by the system and green indicates those entries that are changeable. It will, however, be appreciated that alternative color schemes may be employed to distinguish between system calculated, user-changeable information or other characteristics of the data displayed.

Figure 48:
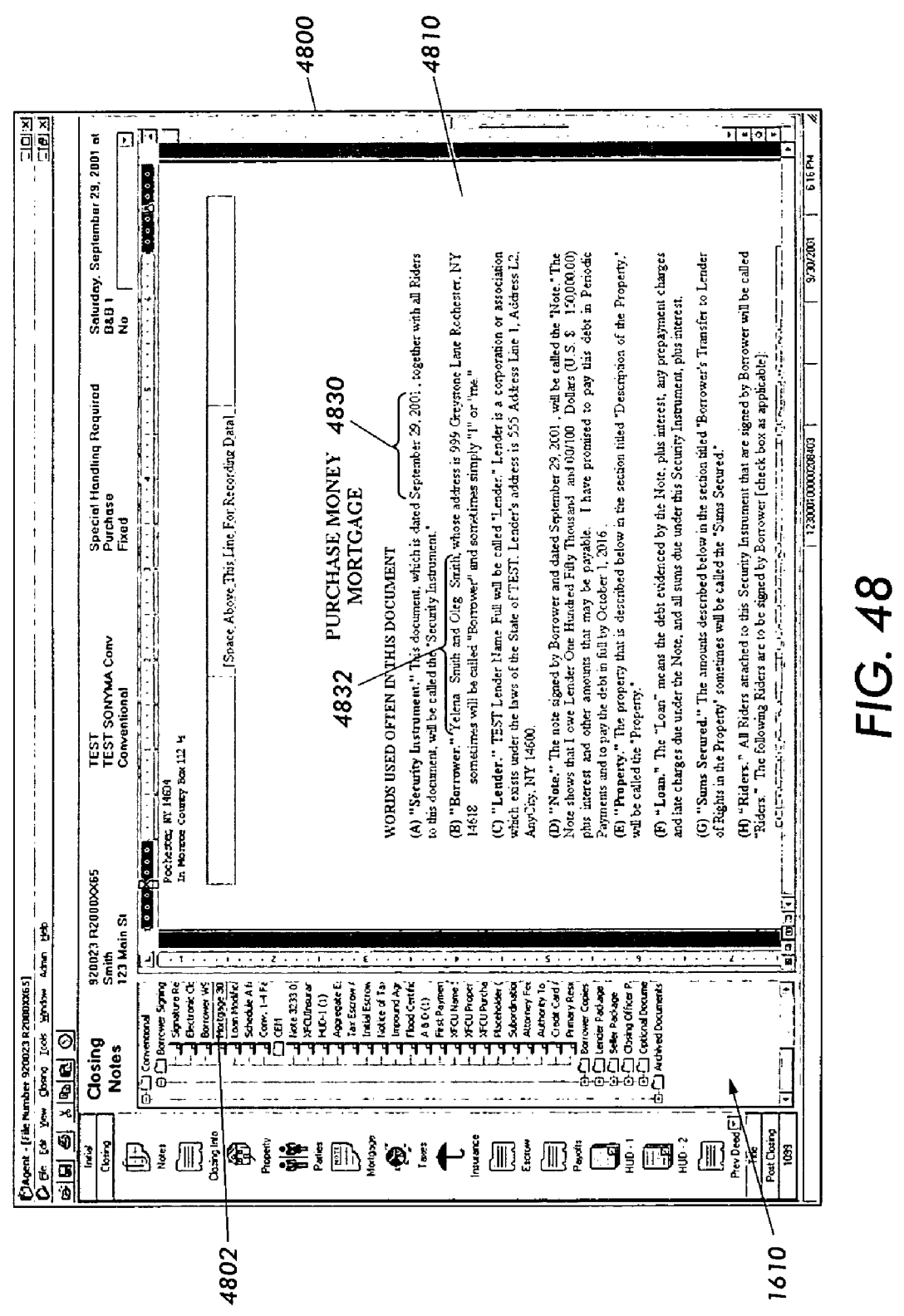

The system further includes on screen color coded merged document viewing as illustrated, for example, in FIG. 48. Documents are created by merging document data fields with data derived from an associated document stored procedure along with bookmark replacement by code algorithms; variable document phrases are selected by database data sensitive embedded macros. The result, as depicted in FIG. 48, is a user-interface screen 4800 that depicts a merged Mortgage document 4810 in response to a user's selection of the mortgage document from the document tree 1610. In document 4810, certain regions such as regions 4830 and 4832 are inserted as merged data, and may be color coded to distinguish the inserted data from the template.

A system as described above may also be integrated with network faxing. Currently you fax directly out of the application and all Party fax information is automatically made available to you. Histories of outgoing faxes are automatically captured in the Notes section corresponding to a particular client file. Similarly, the system is integrated with e-mail capability in order to provide auto-notifications and auto-reporting to the various personnel or users associated with the real estate transaction. Accordingly, the system has event driven all Party auto-communication via e-mail or fax.

As described in detail herein, the system is preferably integrated with Title processes and shares data between the Process Areas so as to avoid the need to enter redundant information. Residential and Commercial Title can also be done independently from Lender Residential files.

In the document generation features of the present invention, the system intelligently places the appropriate party signature lines with party names on documents based on Borrower (those who are actually borrowing the money) vs. Mortgagor (those who are going to be in title).

It will be further appreciated that numerous improvements and modifications may be made to the system described herein, and that such improvements may also include:

Receiving fax directly into Virtual File Folder™ for archive;

Checking documents into archive automatically from application;

Integration with Accounting, with a ledger per file;

Cutting checks out of the eSys system;

Electronic Signatures;

Total Transaction Access. From the Lender origination screens to the Lender commitment through the entire closing and title data collection and processing, the on-line review and electronic signing of documents and beyond to recordation, sale to secondary market and reporting;

Transactive Status. Instant and interactive controlled access to the entire process status across all phases of the transaction from origination and processing agent introductory notifications through processing, closing and post closing for all parties; and Total Transaction History. From the interface to each party provided specialty service history to the detailed Intelligent Agent Processing processor and system generated Notes, the entire life of loan history is available to all parties as appropriate.

In addition, while described in terms of a system supporting legal services associated with real estate closings and titles, the Agent Processing Software, which forms the core or base of the present invention, is also believed to have particular application in other legal and non-legal services. For example, legal services in which the present invention would find particular application include corporate work (e.g., commercial transactions), wills, litigation and commercial real estate. In reality, just about any area where there is a process to follow that results, at least in part, in sets of customized documents and reports, and for which efficiency may be improved by tracking, history, scheduling, event driven auto-notifications and communications among all parties is an opportunity for the present invention. Such alternative applications may include general consumer transactions such as auto purchase and financing, and other consumer transactions requiring notice and rescission periods (e.g., home improvement contracts, etc.). The present invention may also be adapted for use in completing required government reports (including IRS, state and municipal tax filings by businesses and individuals), or for management and control of the acquisition of goods by companies (including Bills of Lading and release of funds for such goods). Thus, the system has application in any services that can benefit from a process that is standardized and automated to an appropriate degree so that anyone qualified can accurately produce any given package.

In recapitulation, the present invention is a method and apparatus for a work-flow management and document generation system, and more particularly to a system and method, employing computers, for automating the operation of a legal transaction, including a real estate closing process.

It is, therefore, apparent that there has been provided, in accordance with the present invention, a method and apparatus for a work-flow management system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A system for managing a work-flow during the provision of services to a client, including:
   a network accessible by a plurality of users involved in the provision of the services;
   a database, accessible via said network, said database allowing controlled access by the plurality of users and storing data related to said client, said database further including at least one table having embedded rules wherein the rules define at least a portion of the work-flow executed by the system for the services being provided; and
   a user interface that provides access to said database for said plurality of users, including the ability to obtain documents automatically generated by the system.

2. The system of claim 1, wherein the services provided include legal services.

3. The system of claim 2, wherein the legal services provided are associated with the closing of a real estate transaction, and includes services rendered both prior to and after the closing.

4. The system of claim 2, wherein the legal services provided are associated with the closing of a real estate transaction, and include only services rendered after the closing.

5. The system of claim 2, wherein the legal services provided are associated with the closing of a real estate transaction, and include only services rendered prior to the closing.

6. The system of claim 1, wherein said embedded rules establish interrelationships with other data and tables within the database.

7. The system of claim 1, wherein said database further includes tables having data stored therein that is employed by the system to control the manner in which information is displayed to a user of the system.

8. The system of claim 7, wherein said data is changed for at least one user of the system such that the appearance and operation of the system are tailored to the needs of a party to the services being rendered.

9. The system of claim 1, wherein said user interface includes a displayable screen including:
   a phase navigation bar depicting, in iconic form, the data associated with the services; and
   a document tree depicting, in a hierarchical fashion, the documents automatically generated by the system in relation to the services, wherein selection of an element in the phase navigation bar and document tree presents the user with further detailed information.

10. The system of claim 9, wherein said user interface further includes, in response to a user selection of a document from said document tree, a display of said document.

11. The system of claim 9, wherein said user interface further includes a display enabling a user to edit at least a portion of the data associated with the services.

12. The system of claim 1, wherein the system monitors the ordering of work-flow tasks so as to assure that completion of a required task is accomplished prior to initiation of any subsequent tasks that rely on data generated by the required task.

13. The system of claim 12, wherein the system automatically notifies at least one participant in the services of the completion of required tasks.

14. A method for managing work-flow during the provision of services to a client using a networked system, including:
   providing a network accessible by a plurality of users involved in the provision of the services;
   creating a database, accessible via the network, the database allowing controlled access by the plurality of users and storing data related to the client, the database further including at least one table having rules embedded therein, where the rules define at least a portion of a work-flow executed by the system for the services being provided; and
   providing access to the database for the plurality of users via a user interface, including the ability to obtain documents automatically generated by the system.

15. A method for managing a work-flow during a real estate transaction using a networked system, including:

providing a network accessible by a plurality of users involved in the provision of the services related to the real estate transaction during at least initial, closing, title and post-closing phases of the real estate transaction;

creating a database, accessible via the network, the database allowing controlled access by the plurality of users and storing data related to the client, the database further including at least one table having rules embedded therein, where the rules define at least a portion of a work-flow for the services related to the real estate transaction being provided, and at least one record having information pertaining to a real estate transaction where the information was entered by a user in the initial phase; and providing access to the database for the plurality of users via a user interface, including the ability to obtain documents automatically generated by the system, wherein said documents facilitate the real estate transaction.

16. The method of claim 15, wherein the services related to the real estate transaction include services rendered both prior to and after a closing.

17. The method of claim 15, wherein the services related to the real estate transaction include only services rendered after a closing.

18. The method of claim 15, wherein the services related to the real estate transaction include only services rendered prior to a closing.

19. The method of claim 15, wherein said embedded rules establish interrelationships with other data and tables within the database.

20. The method of claim 15, wherein said database further includes tables having data stored therein that is employed by the system to control the manner in which information is displayed to a user of the system.

21. The method of claim 20, further including changing data for at least one user of the system such that the appearance and operation of the system is tailored to the needs of a party to the services related to the real estate transaction being rendered.

22. The method of claim 15, further including:

displaying a phase navigation bar depicting, in iconic form, the data associated with the real estate transaction; and displaying a document tree depicting, in a hierarchical fashion, the documents automatically generated by the system in relation to the real estate transaction, wherein selection of an element in the phase navigation bar and document tree presents the user with further detailed information.

23. The method of claim 22, further including, responding to a user selection of a document from said document tree by updating the user interface to display said document.

24. The method of claim 22, further including enabling the user to edit at least a portion of the data associated with the real estate transaction.

25. The method of claim 15, further including monitoring the order of work-flow tasks so as to assure that completion of a required task is accomplished prior to initiation of any subsequent tasks that rely on data generated by the required task.

26. The method of claim 25, further including automatically notifying at least one participant in the real estate transaction of the completion of required tasks.

* * * * *